(12) United States Patent
George

(10) Patent No.: US 10,929,850 B2
(45) Date of Patent: Feb. 23, 2021

(54) SYSTEM FOR MANAGING PERSONAL IDENTIFIERS AND FINANCIAL INSTRUMENT USE

(71) Applicant: Marc George, Pasadena, MD (US)

(72) Inventor: Marc George, Pasadena, MD (US)

( * ) Notice: Subject to any disclaimer, the term of this patent is extended or adjusted under 35 U.S.C. 154(b) by 74 days.

(21) Appl. No.: 16/421,863

(22) Filed: May 24, 2019

(65) Prior Publication Data

US 2019/0325450 A1 Oct. 24, 2019

Related U.S. Application Data

(62) Division of application No. 14/288,282, filed on May 27, 2014, now Pat. No. 10,373,166.

(60) Provisional application No. 61/827,233, filed on May 24, 2013.

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01); *G06Q 20/40* (2013.01); *G06Q 20/401* (2013.01); *G06Q 20/405* (2013.01)

(58) Field of Classification Search
CPC .......... G06Q 20/4016; G06Q 20/3224; G06Q 20/40; G06Q 20/401; G06Q 20/405
See application file for complete search history.

(56) References Cited

U.S. PATENT DOCUMENTS

2012/0158593 A1* 6/2012 Garfinkle ............... G06Q 20/40
705/64

* cited by examiner

*Primary Examiner* — Russell S Glass
(74) *Attorney, Agent, or Firm* — Royal W. Craig; Gordon Feinblatt LLC

(57) ABSTRACT

A method for the secure use of a personal identifier and/or financial instrument that may take place simultaneously with traditional methods of authorization for credit card, check, funds withdraw/transfer or purchase. Authorization according to the present invention may take place as follows: A) the Owner provides a pre-approval of authorization if the request meets an array of Owner-defined parameters; B) an authorization may be granted based on proximity of the Owner to the point of use; or C) the Owner provides a real time approval by smart device. In each case the invention subjects the request for authentication to a sequential verification procedure in which the request is tested against one or more pre-defined verification protocols, the deployed authentication protocol being pre-determined by the Owner and pre-selected in accordance with a user profile that was pre-programmed by the Owner.

8 Claims, 59 Drawing Sheets

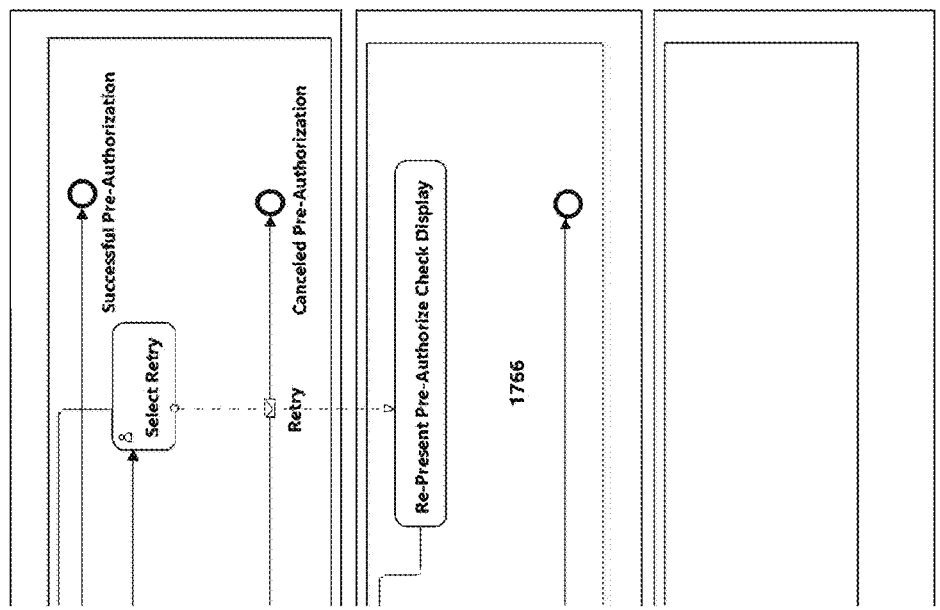

FIG. 16 - Initial Setup

FIG. 19 Device Relationships & Communications

SYSTEM FOR MANAGING PERSONAL IDENTIFIERS AND FINANCIAL INSTRUMENT USE

CROSS-REFERENCE TO RELATED APPLICATION(S)

The present application is a division of U.S. application Ser. No. 14/288,282 filed 27 May 2014 which in turn derives priority from U.S. provisional application Ser. No. 61/827,233 filed 24 May 2013.

BACKGROUND OF THE INVENTION

1. Field of the Invention

The present invention relates to the managed protection of personal identifiers (i.e. Social Security Numbers, User IDs and account numbers) and financial instruments (i.e. credit cards and checks) used by their owner through the use of communication networks and a variety of devices, both mobile and wired, to verify their proper use either interactively or by pre-approval by their owner.

2. Description of the Background

The primary reported criminal activity of concern in the world today is "Identity Theft" involving financial instruments, government issued identification numbers and other forms of identification. The media is full of stories regarding "Computer Hackers" breaking into computer systems to steal the information that would enable them to subsequently steal the assets associated with them.

Since the inception of representational transactions, e.g. non-cash transactions, absolutely identifying the originator of the transaction has always been an issue, the failure to do so resulting in misappropriated checks and credit cards. With the advent of the Internet and online transactions in which the owner is not even physically present, this misappropriation has accelerated and has evolved to include other transaction types, i.e. "wire transfers". The use of government issued identifiers has complicated this because these identifiers are often the primary constraints to allowing "owner" access to the accounts associated with those checks and credit cards as well as to other financial account types, i.e. tax, savings and investment accounts. The addition of other identification elements, i.e. answers to security questions like "Mothers maiden name?" has not entirely succeeded in preventing misappropriation because these additional elements can also be stolen or discovered. This has left every individual engaging in non-cash transactions vulnerable to theft and associated complications for which there may not be any relief.

What is needed is a system and method for managing the use of personal identifiers and financial instruments that facilitates an array of options for proactive and/or interactive management of same through authorization by their owner.

SUMMARY OF THE INVENTION

Accordingly, the present invention's method of managing the use of personal identifiers and financial instruments is based on the proactive and/or interactive engagement of the owner, e.g. individual or business entity or government entity, of those identifiers and/or instruments (Owner). That engagement incorporates a variety of sub-methods to either proactively and/or interactively manage the authorization of the use of a personal identifier and/or financial instrument.

This method incorporates both sequential processing and parallel branching processing, incorporating authorization by a second entity with subsequent merge of business processes in which the use of a personal identifier and/or financial instrument are involved, in order to reduce the impact of the additional processing of this management method, although it is not a requirement. These processes separate the currently used authentication processes from the instant invention's process of Owner managed authorization of identifier/instrument use. Subsequently, at receipt of responses, the authorization processes are required to provide positive approval in order for the overall business process (action/transaction, etc.) to successfully complete. If the dual authorization processes are sequentially performed, the results of both are analyzed upon completion with the same conditions applied.

The new branch of the business process representing the instant inventive method has numerous sub-methods to accommodate the various scenarios in which the use of a personal identifier and/or a financial instrument may occur and the types of automated interactions between the originators of the business processes (Originators) and the Owners that are employed. These sub-methods provide a variety of approaches to initiate the verification of authorization, to either inform the owner of the current use of their personal identification and/or financial instrument and solicit authorization of its use, or allow the owner to initiate pre-authorization of its use. They employ the use of a variety of communication devices, e.g. telephones, cell phones, smart phones and other computing devices to interact with the Owners after initiation via a web service or Internet site by the Originators. It is this second solicitation and authorization of use of the personal identifier and/or financial instrument which is not currently employed during business processes or transact ions, and which forms the basis for the instant invention.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 6A-6D are a diagram, titled "Pre-Authorize Check Use", of a subset of the process steps within the overall generic business process which enables the pre-authorization of the use of a check financial instrument.

DETAILED DESCRIPTION OF THE PREFERRED EMBODIMENTS

Figure 1:
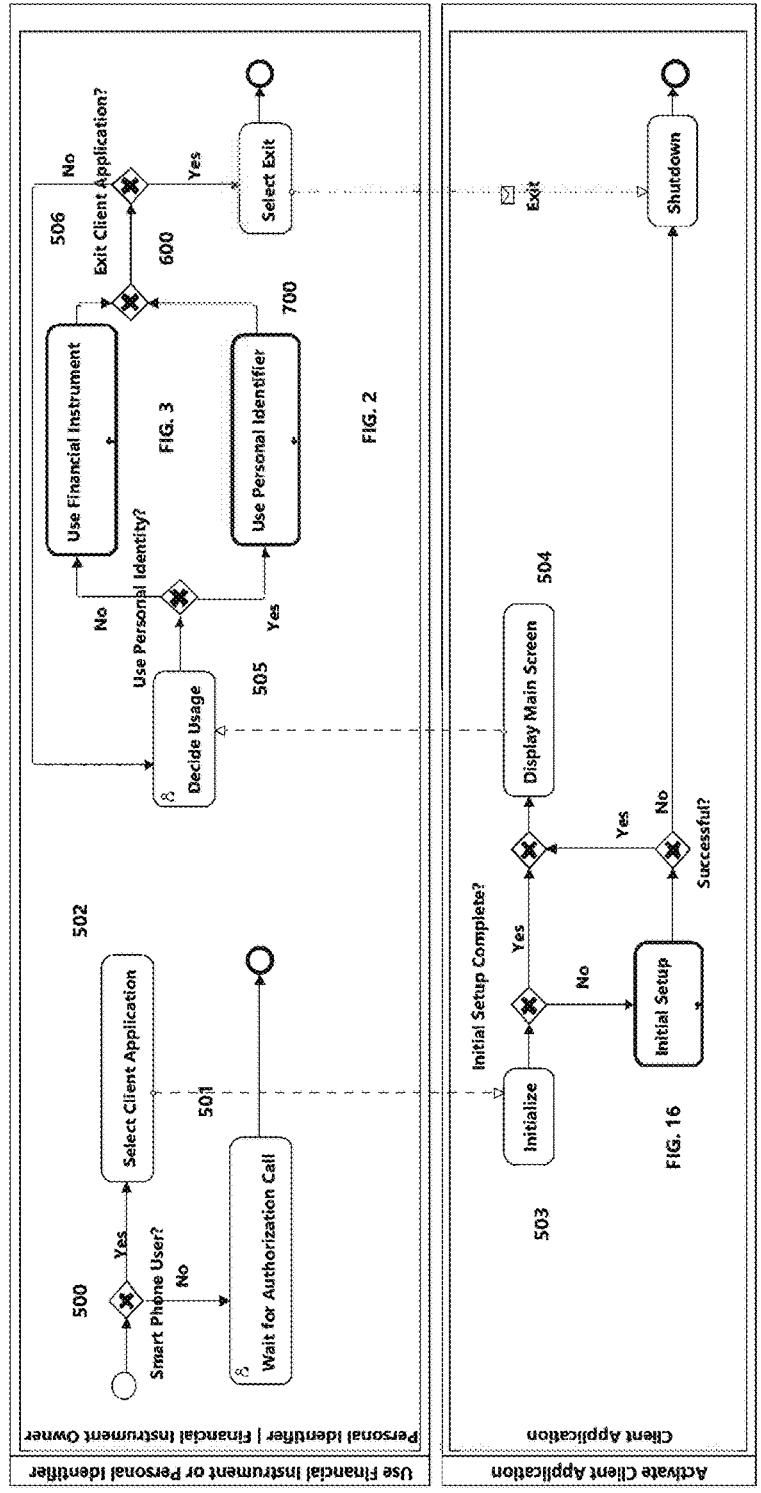
FIG. 1 is a diagram, titled "Use Personal Identifier or Financial Instrument", of the initial process tasks of a BPMN (Business Process Modeling Notation) model within a set of BPMN models detailing a generic business process in which either personal identification or a financial instrument is used.

The present invention is a method for proactive and interactive Owner management of personal identifiers to prevent unauthorized use by third parties via a direct authoritative confirmation of each usage of those objects and financial instruments to prevent unauthorized use by third parties via a parallel authoritative confirmation of each usage of those objects. It combines the management of personal identifiers and financial instruments use as a service which is available to organizations needing to fully verify their use and owners desiring and demanding absolute control of their use via a client application or a telephone call if that capability is not available.

The present method preferably includes Owner use of a mobile communication smart device, e.g. smartphone, although alternatives are provided for other devices, especially when lost or forgotten; a third party's use of a web-enabled device, i.e. point-of-sale device other device; and an Identity Management Services Provider's (IMSP) "personal identity and financial instrument management system".

The Owner's communications enabled smart device includes a software application called the "client application" (discussed in greater detail below) that permits the Owner to manage authorization preferences for use of personal identification and payment instruments and/or directly authorize a given usage transaction. The smart device can be a smartphone or other wireless communication device. Other smart devices can be a desktop computer, laptop computer, handheld computer device, or any other suitable device configured to receive user input and provide output. The third party may be anyone involved in transaction with the Owner and seeking to authenticate the Owner's usage of a personal identifier, credit card, check, withdrawal slip, transfer slip or any other financial instrument. This may be, for example, a "Business or Government Entity" seeking to authenticate the usage of a credit card, a lender seeking to authenticate the usage of a social security number, etc. The present invention provides real time or queueable notice of any such transaction to the Owner and seeks any of an array of user-selectable confirmation options from the Owner for each transaction, this additional level of transactional confirmation protecting the Owner against the impacts of lost or stolen credit cards, checks or other impacts of identity theft resulting in the fraudulent use of identities or financial instruments. The present invention also provides either a real time authentication or a queued authentication to a business or government entity seeking authentication via an authentication request device. A queued authentication is herein defined as any authentication placed in a queue for non-real-time but delayed authentication of any such transaction to the business or government entity. The authentication request device can be a desktop computer, laptop computer, specialized point-of-sale terminal with display, hand-held computer device, or any other suitable device configured to receive user input and provide output. The personal identity and financial instrument management system may be a third-party operated web-enabled computer server. One skilled in the art will understand that the present invention contemplates lost or stolen hand-held mobile devices, as well as the possibility of non-connectivity, and so not every use scenario described below requires the Owner to use a hand-held mobile device, nor the business or government entity to use a point-of-sale device.

The following description of the software method presents the invention within the context of Business Process Model Notation (BPMN) model diagrams, FIGS. 1 thru 18. In a short synopsis, those figures of the present method begin with a decision as to the type of identity or financial instrument usage transaction type that is to be processed as represented in FIG. 1. Base on that decision, the system verifies one of two basic Owner transaction types: 1) the Owner's use of a personal identifier (PI) (e.g., Social Security Number, government issued identifier, user id or any other personal identifier to authorize any action) as documented in FIG. 2; 2) the Owner's use of a financial instrument (FI) to perform a) a credit card transaction; b) a check transaction c) a funds withdrawal transaction c) a funds transfer transaction d) or other financial instrument as illustrated in FIG. 3.

Figure 4A:
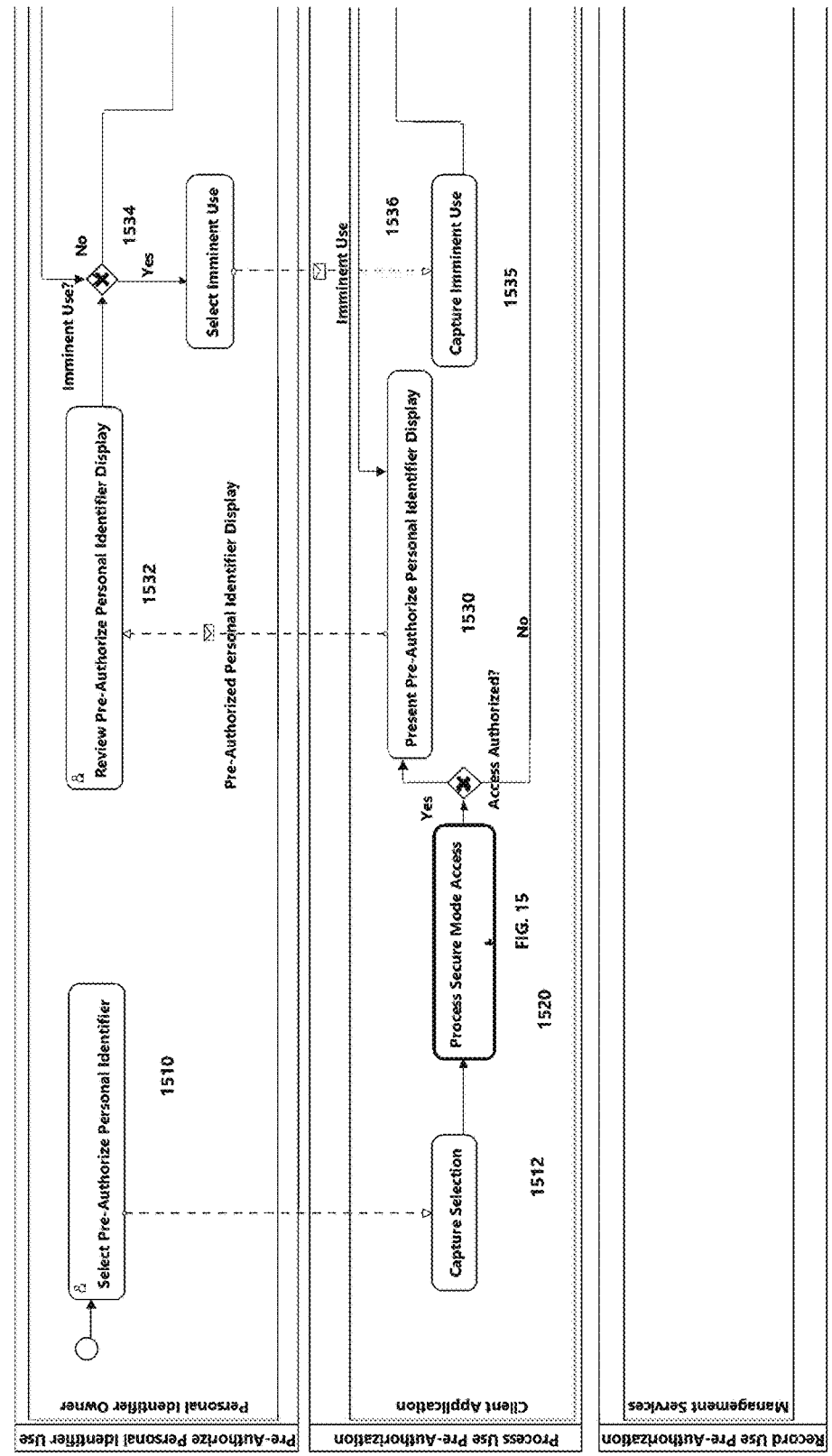
FIG. 4A-B are a diagram, titled "Pre-Authorize Personal Identifier Use", of a subset of the process steps within the overall generic business process which enables the pre-authorization of the use of a personal identifier.
Figure 4B:
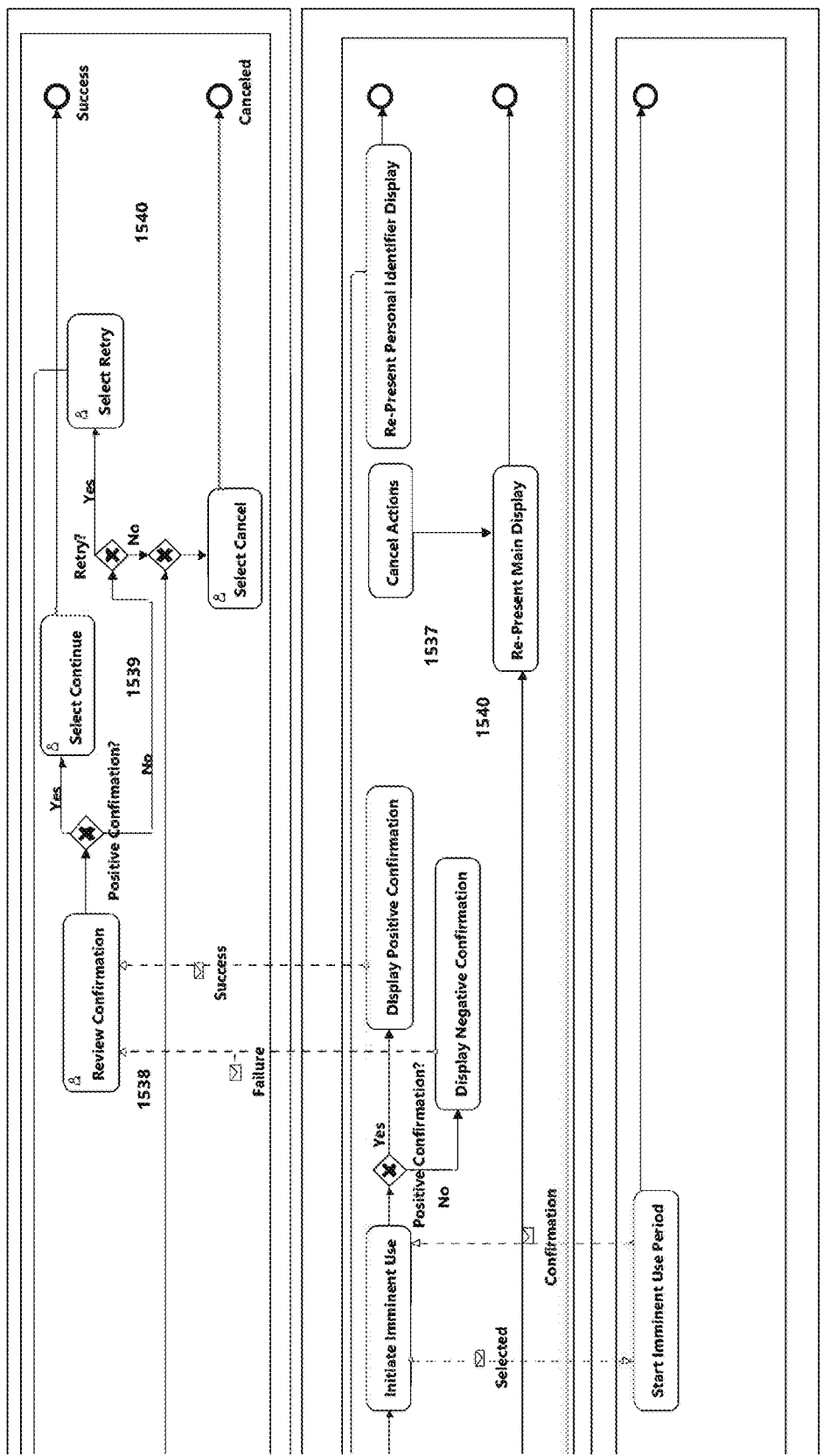
Figure 5A:
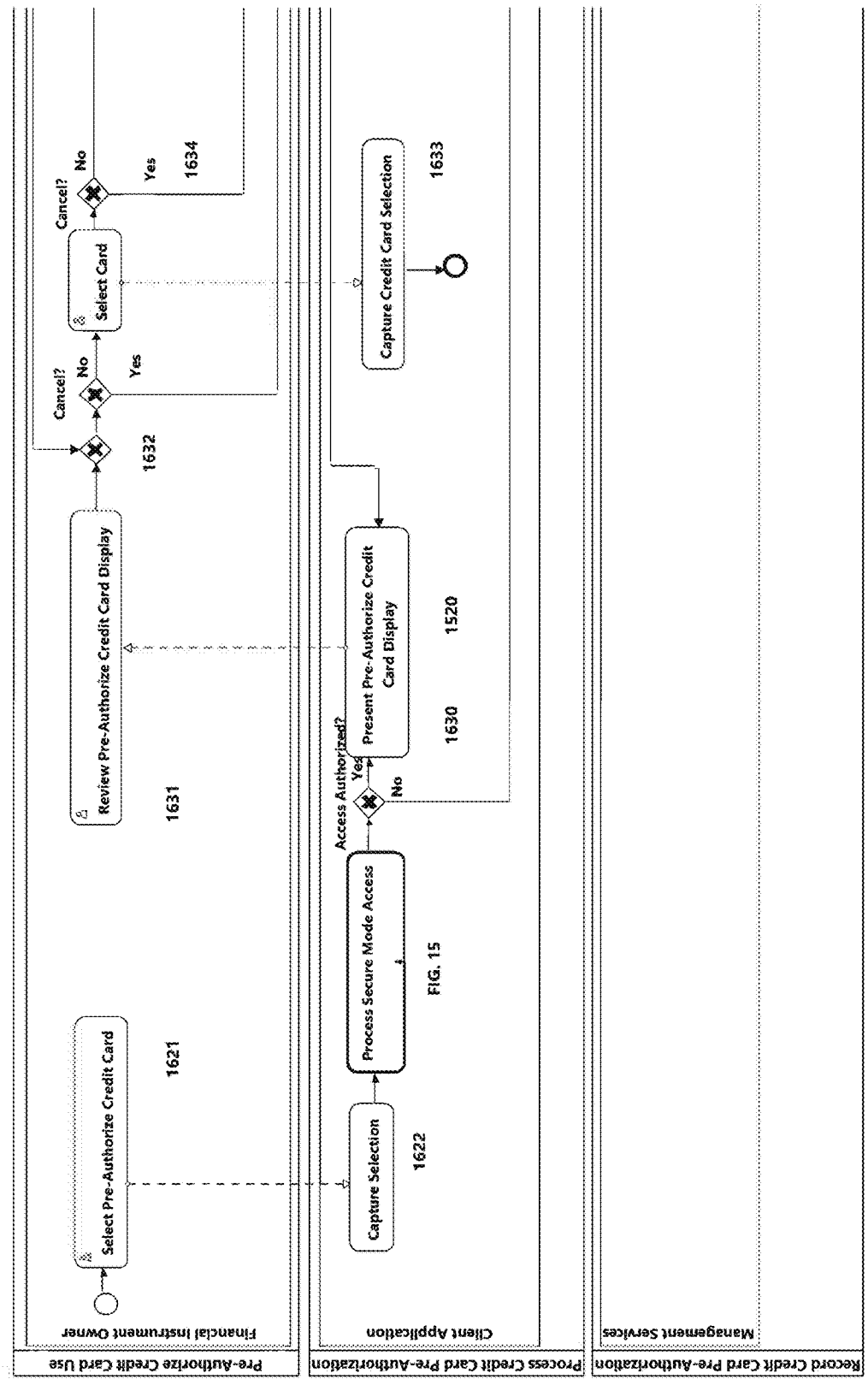
FIG. 5A-D are a diagram, titled "Pre-Authorize Credit Card Use", of a subset of the process steps within the overall generic business process which enables the pre-authorization of the use of a credit card financial instrument.
Figure 5B:
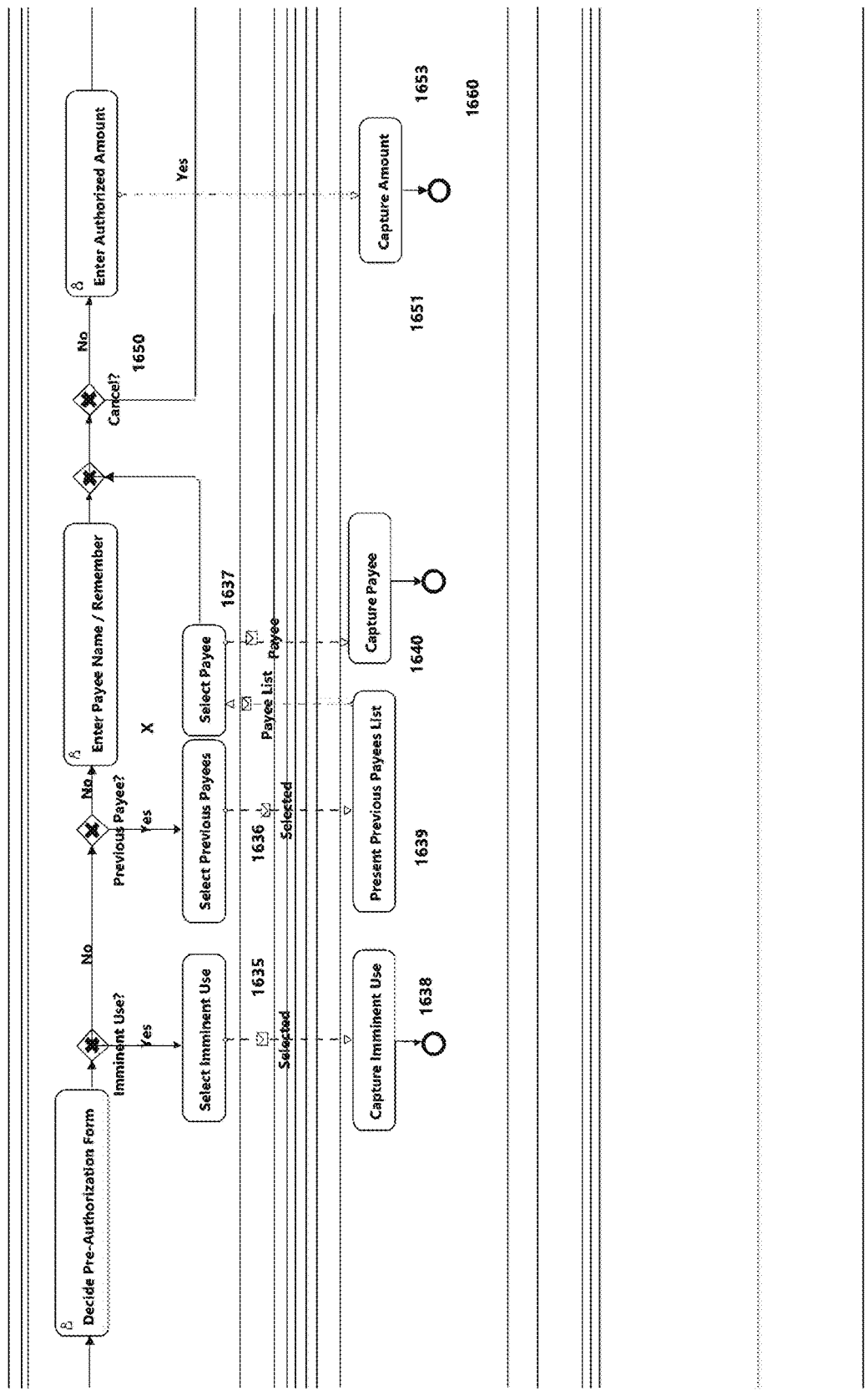
Figure 5C:
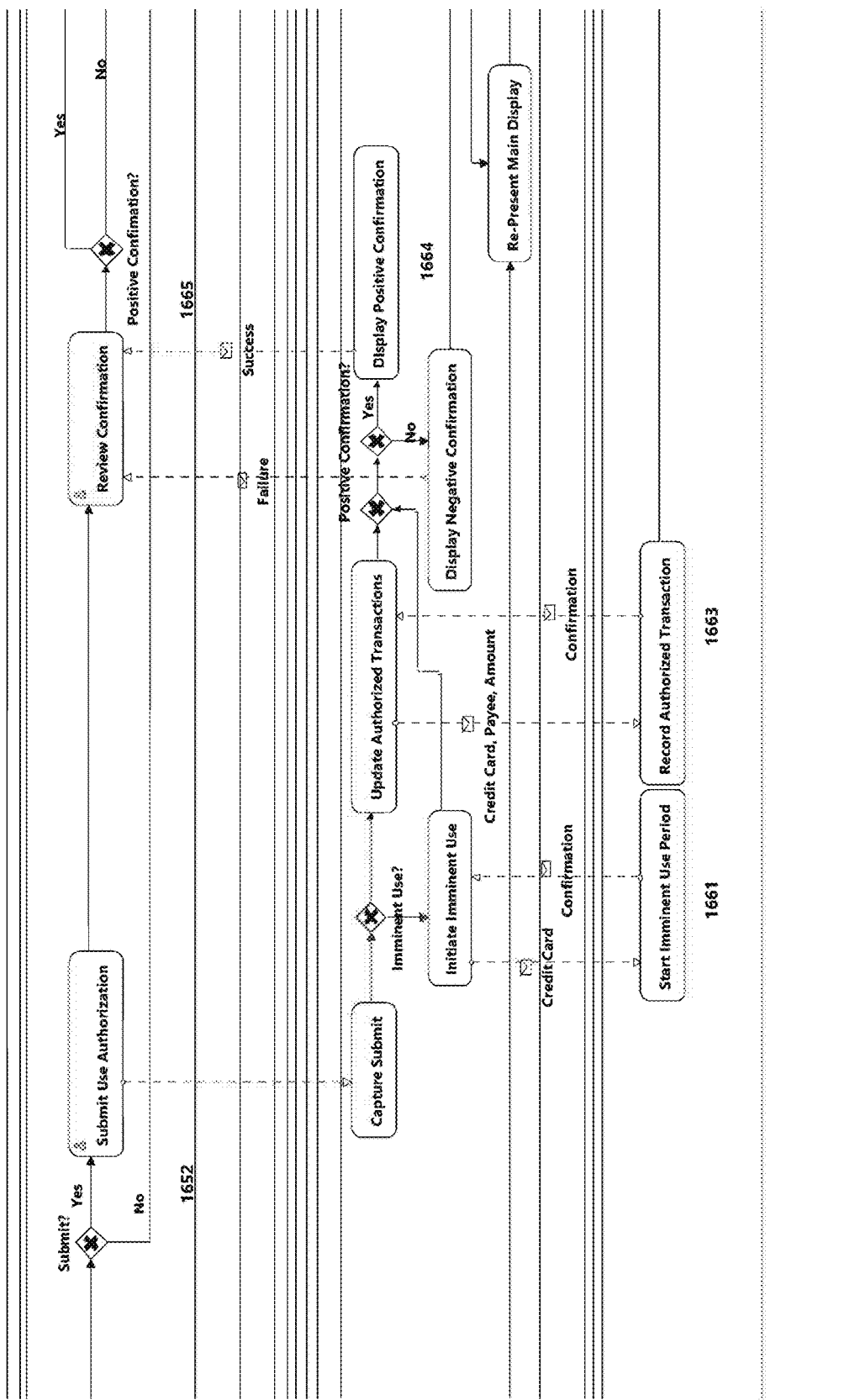
Figure 5D:
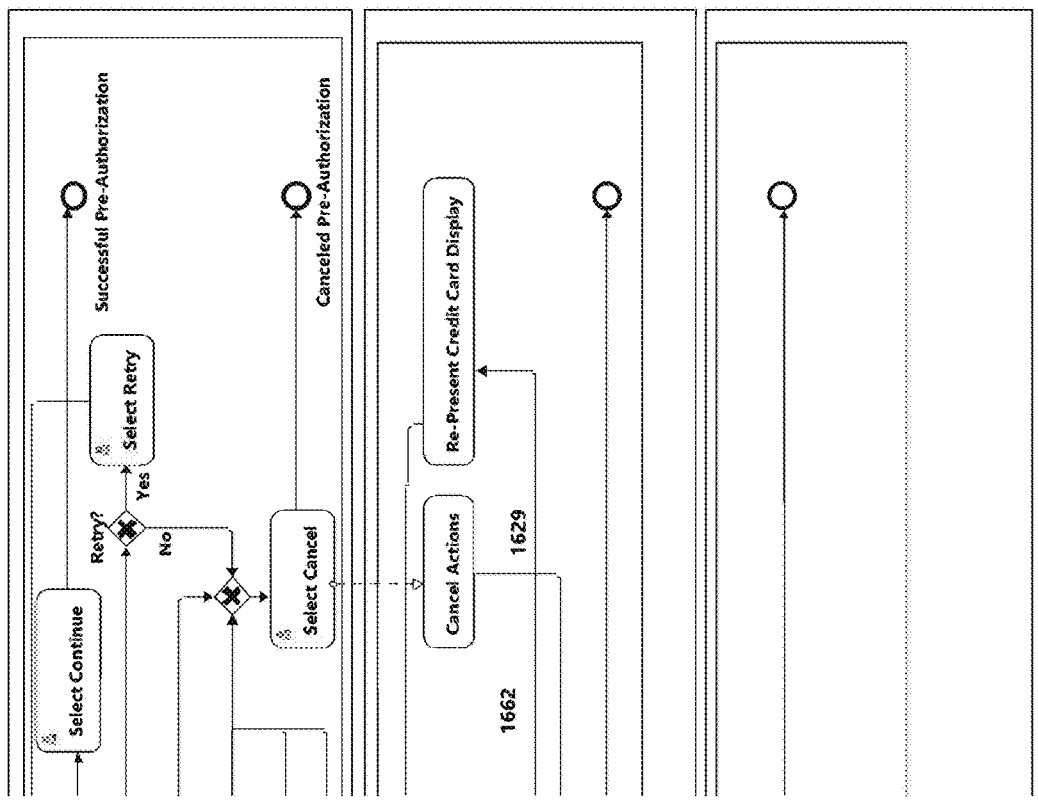
Figure 6A:
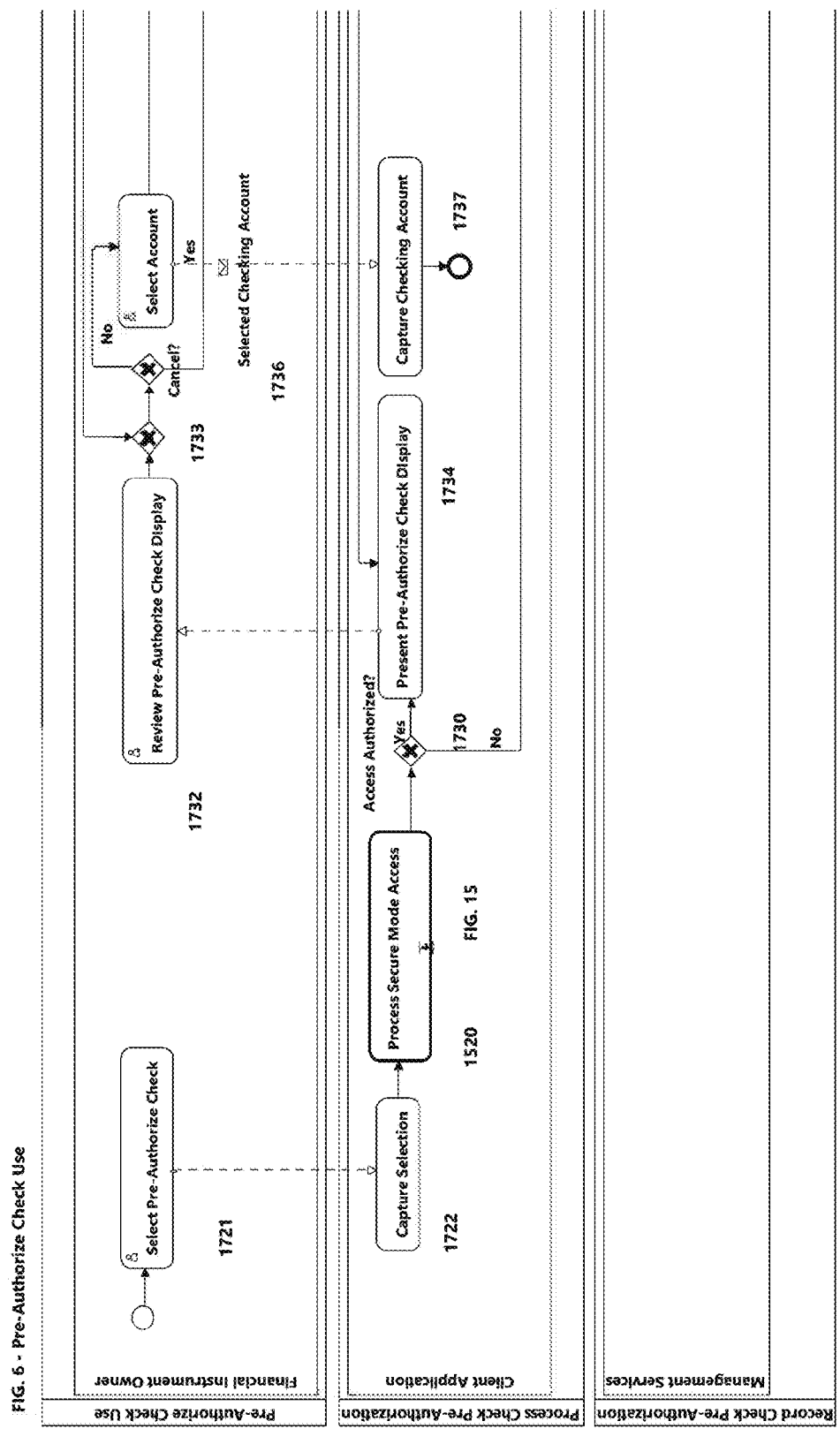
Figure 6B:
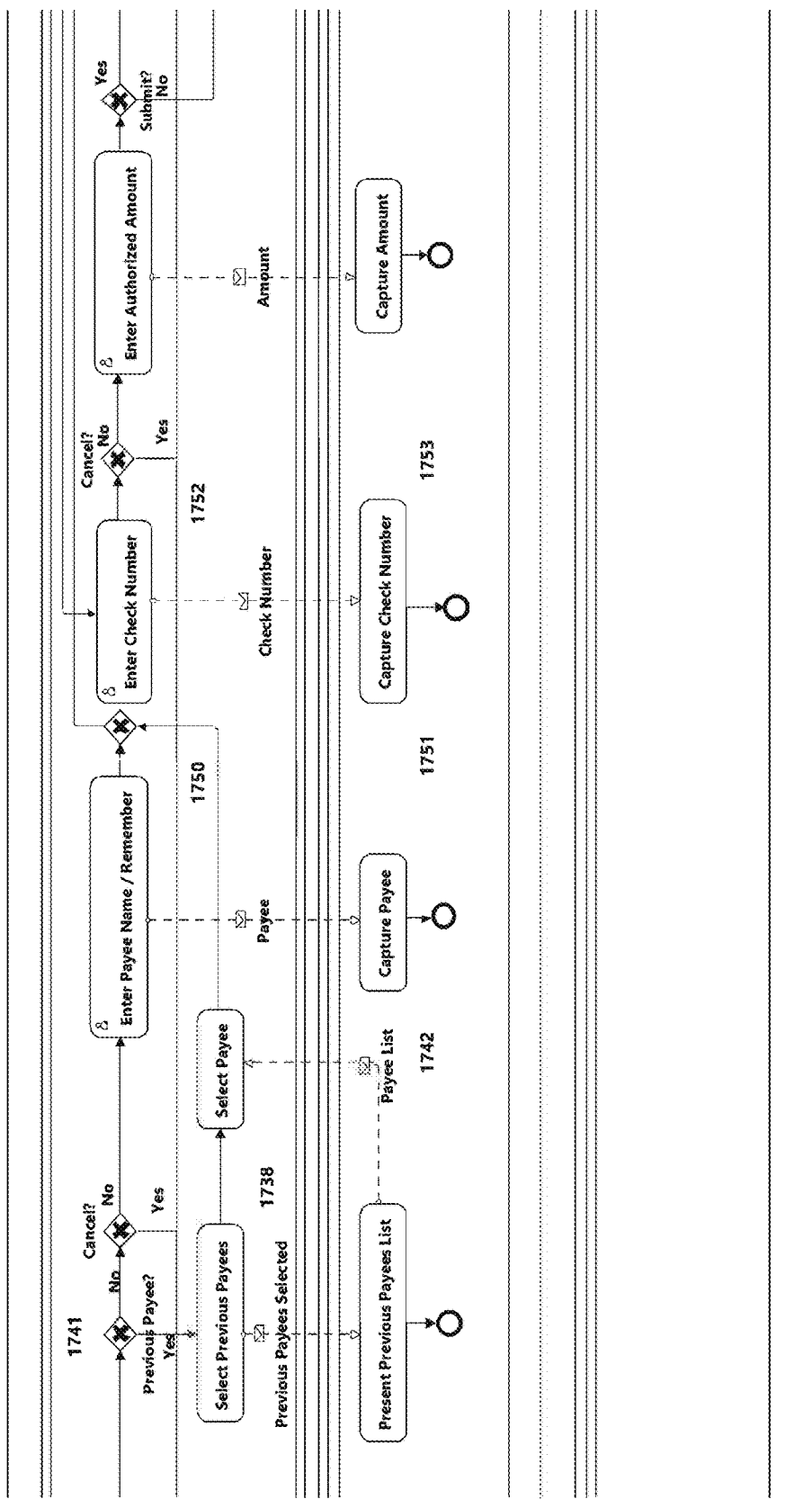
Figure 6C:
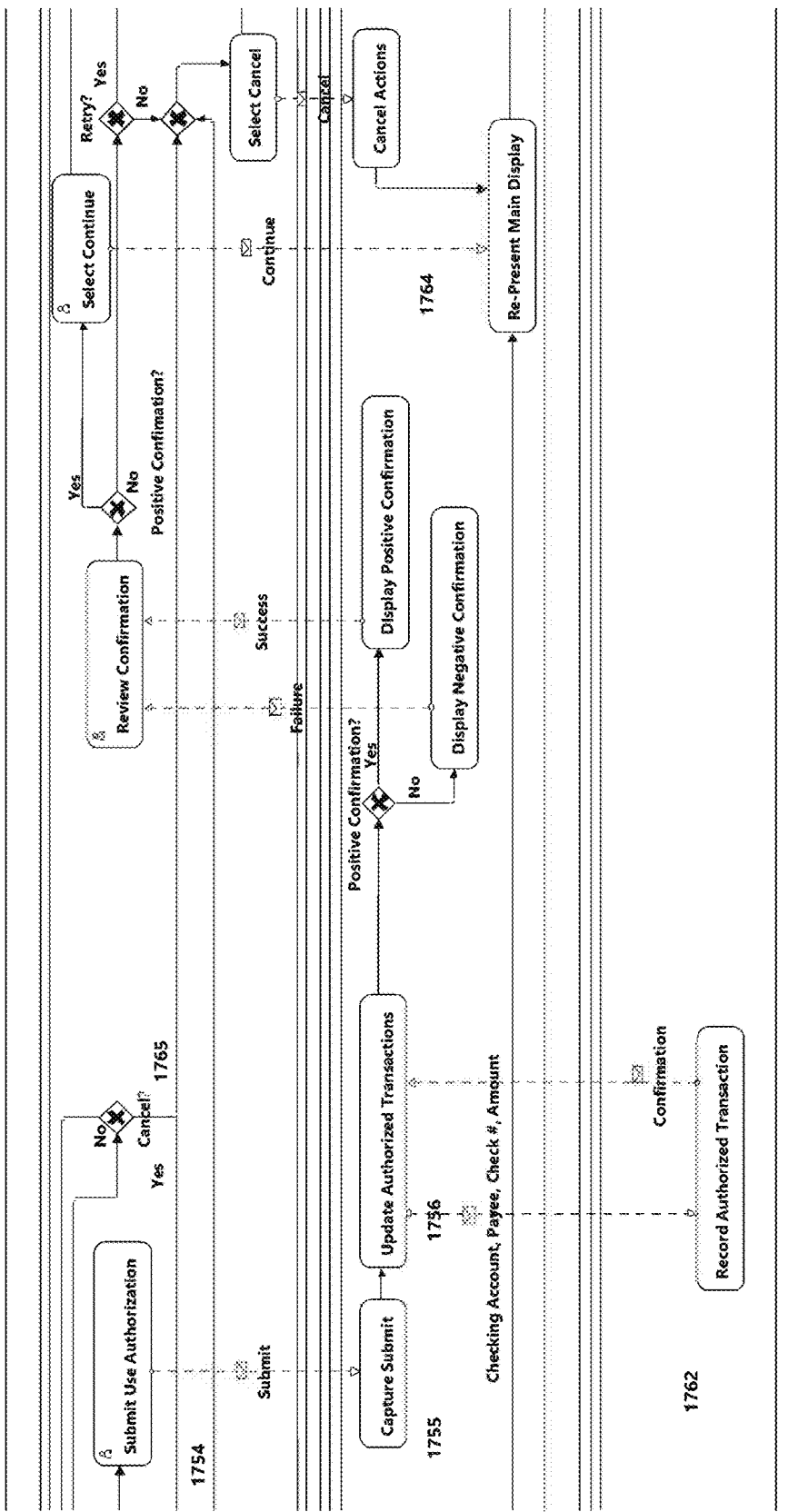
Figure 10A:
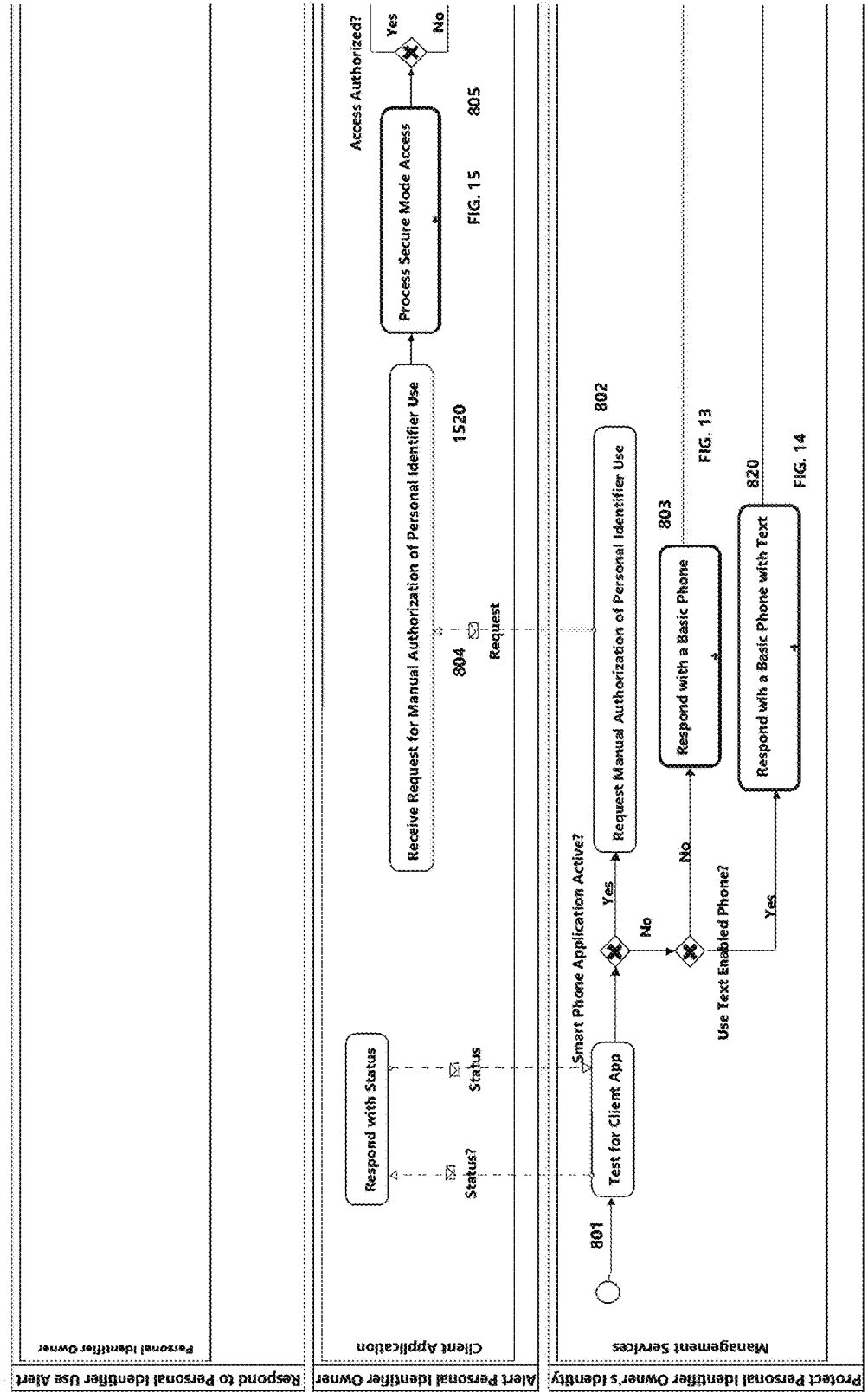
FIGS. 10A-10B are a diagram, titled "Respond to Personal Identifier Use Alert", of a subset of the process steps within the overall generic business process which solicits authorization of the use of a personal identifier using a smart device.
Figure 10B:
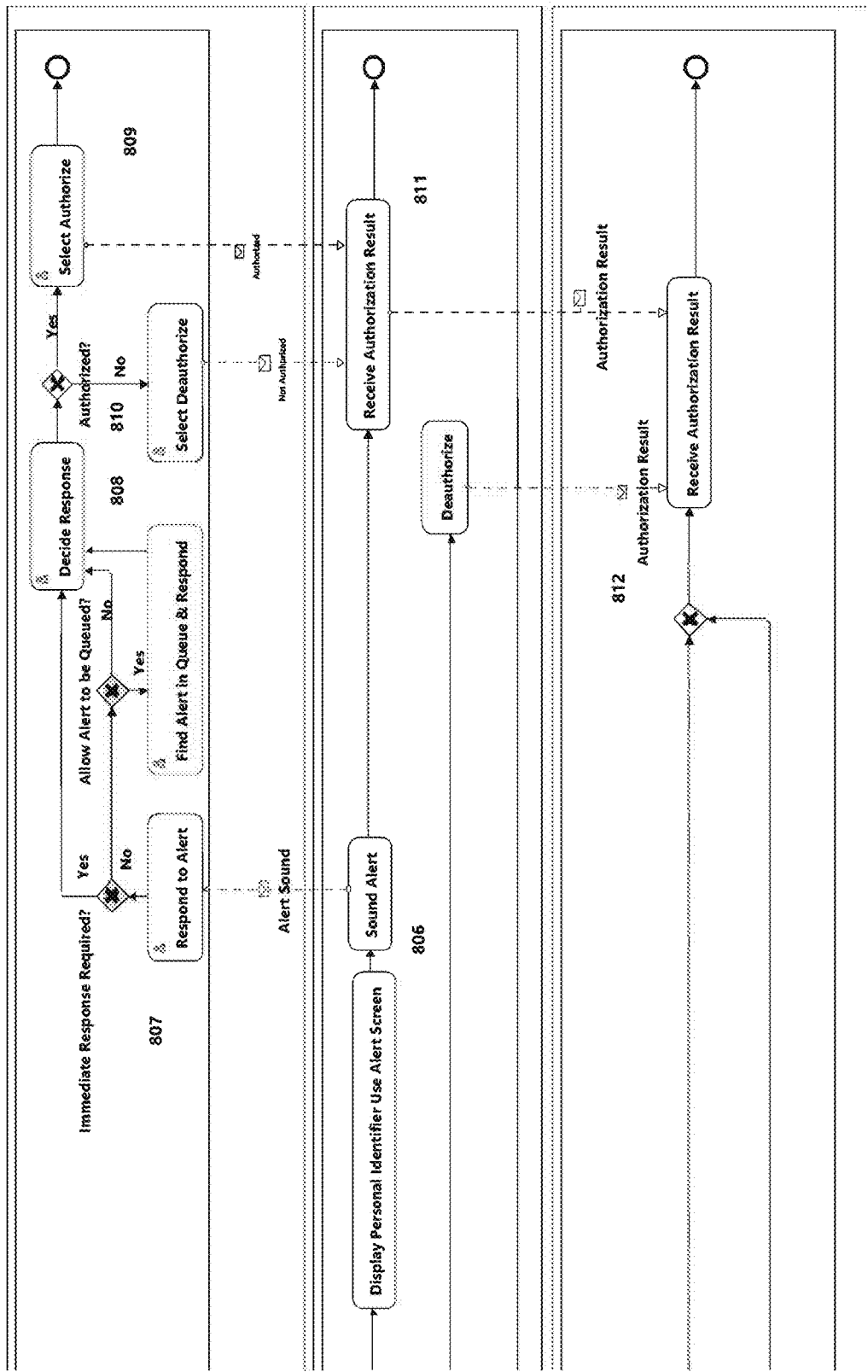
Figure 11A:
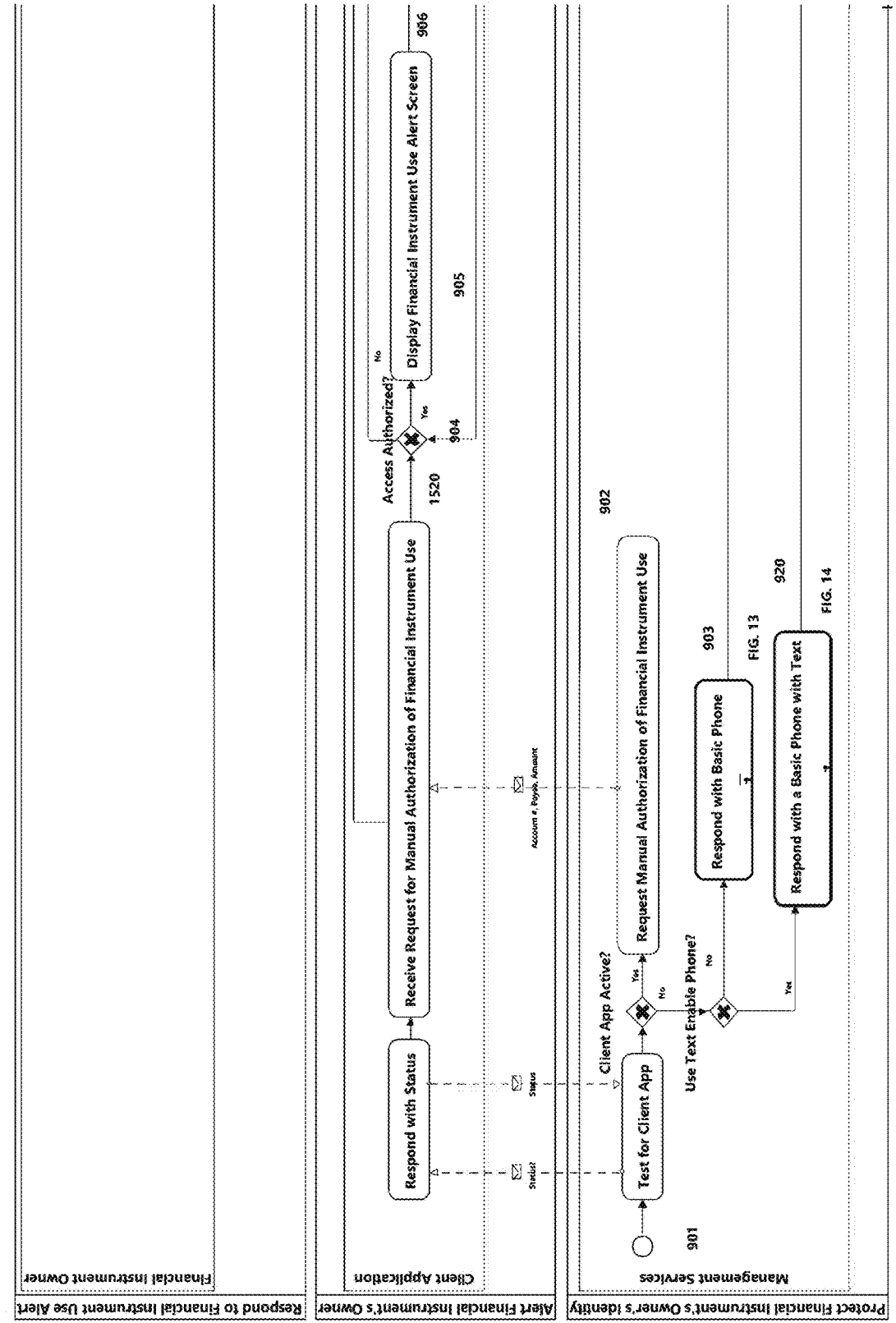
FIGS. 11A-11B are a diagram, titled "Respond to Financial Instrument Use Alert", of a subset of the process steps within the overall generic business process which solicits authorization of the use of a financial instrument using a smart device.
Figure 11B:
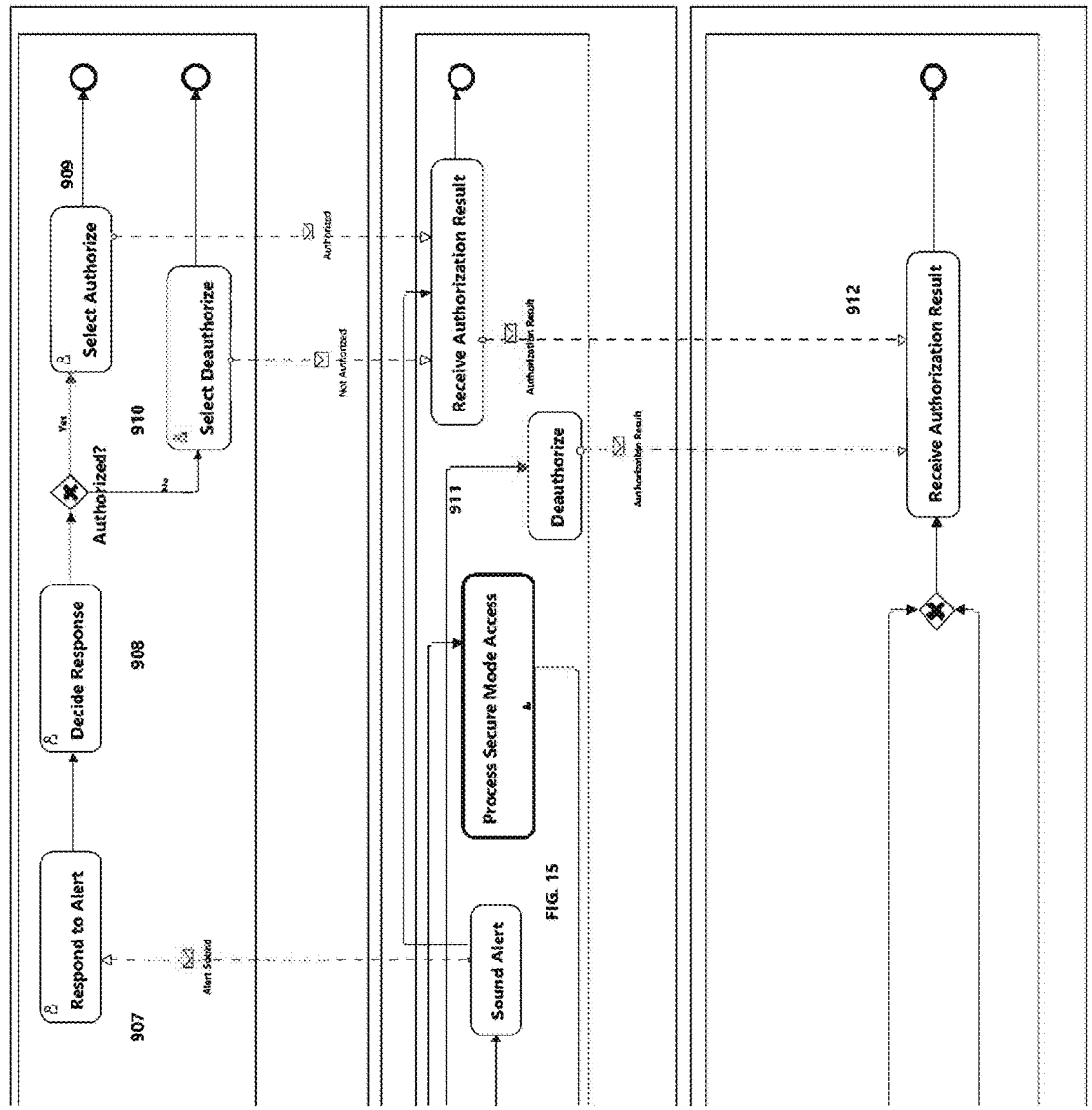
Figure 12A:
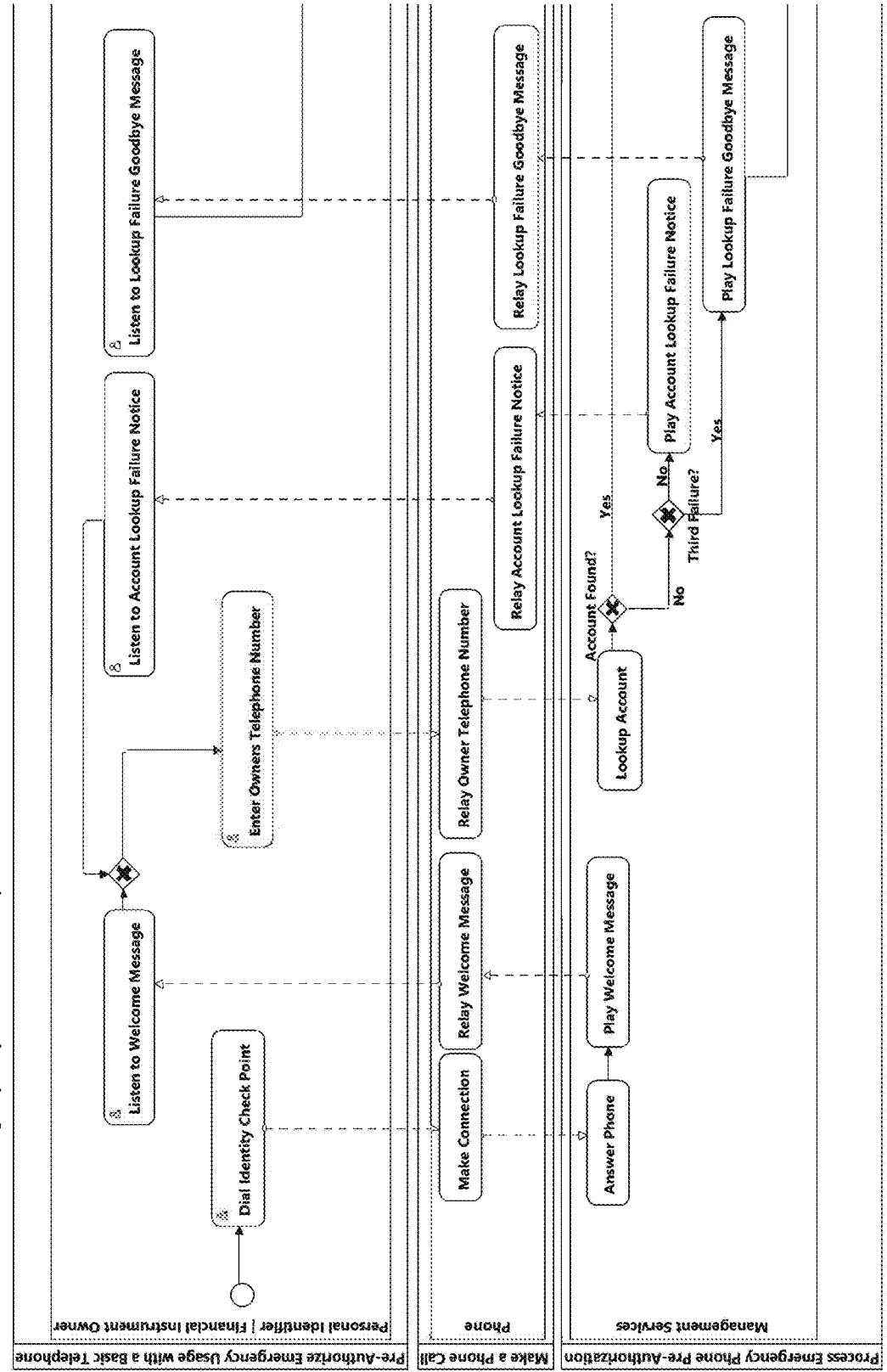
FIGS. 12A-12D are a diagram, titled "Pre-Authorize Emergency Usage with a Basic Phone", of a subset of the process steps within the overall generic business process which enables the pre-authorization of the use of either a personal identifier or financial instrument when a smart device is not available using a non-smart device, e.g. either a traditional telephone or basic cell phone.
Figure 12B:
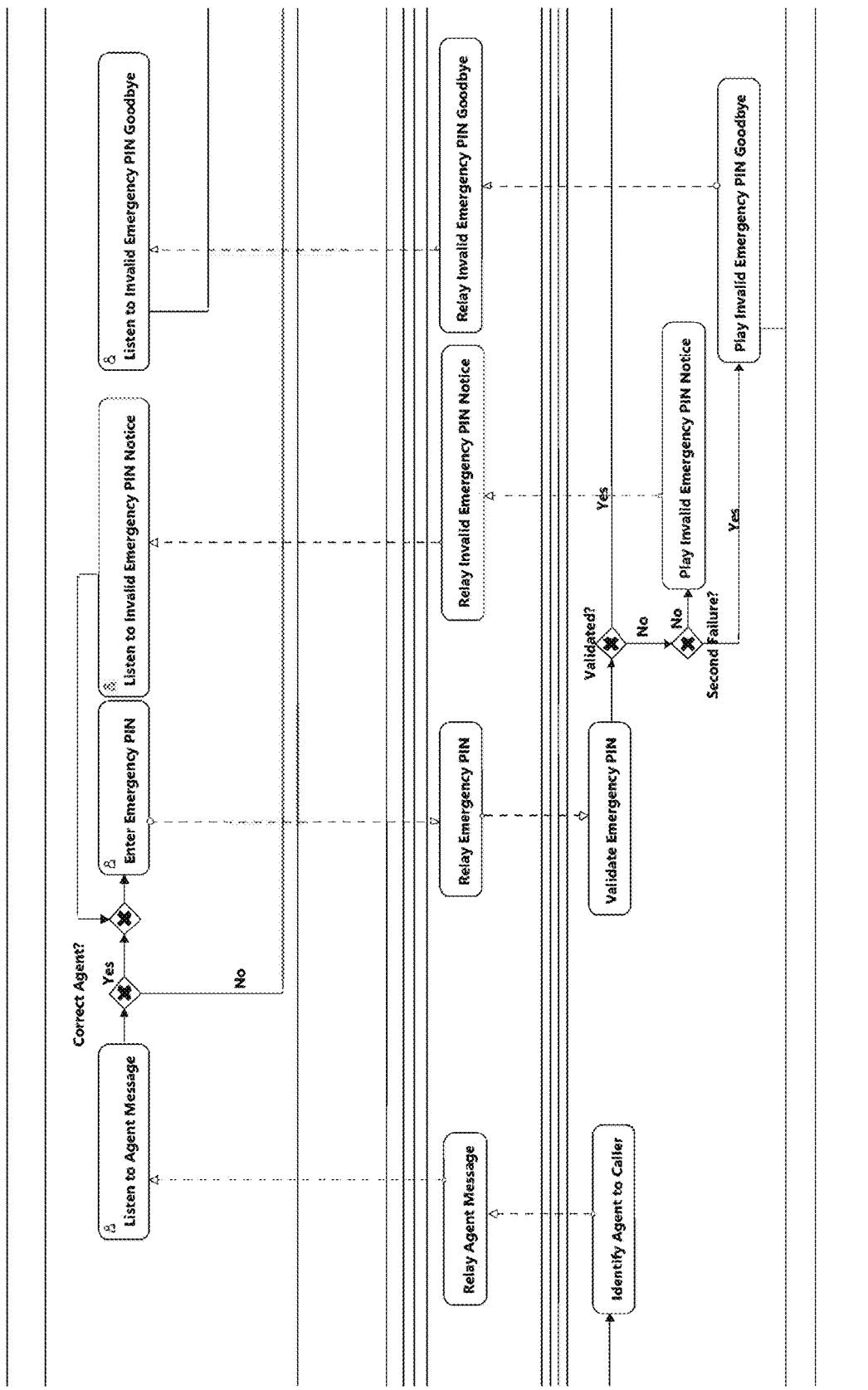
Figure 12C:
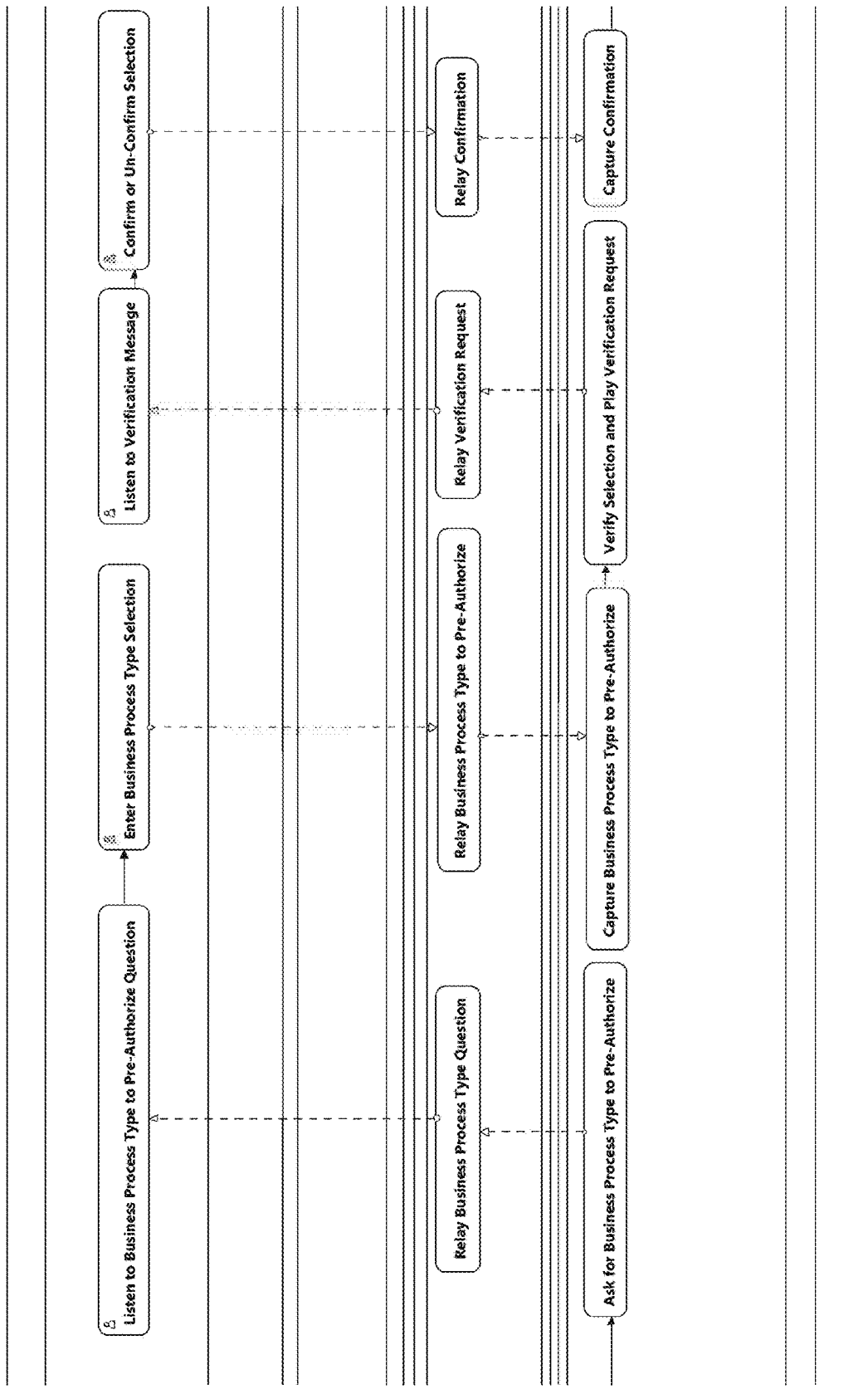
Figure 12D:
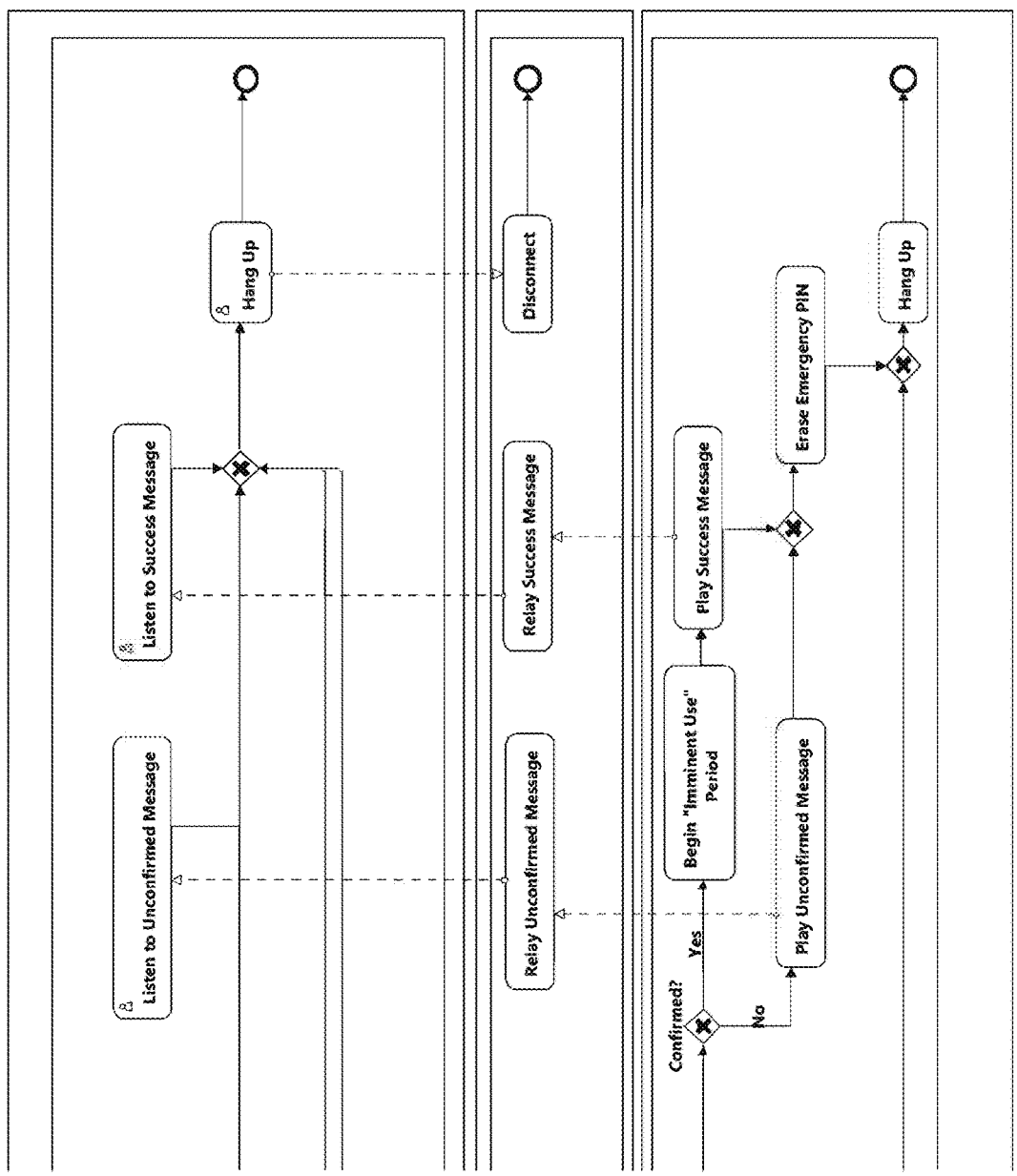

The present method authenticates the Owner's use of a PI or a FI by independent verification of the trusted IMSP, and secures authorization of their use from the Owner by subjecting each third party's request for the same to Owner approval. The Owner may A) provide a pre-approval of authorization if the request meets an array of Owner-defined parameters as depicted in FIG. 4, FIG. 5, and FIG. 6., or B) respond to a real time approval request by a business or government entity as documented in FIG. 7, FIG. 8 or FIG. 9, by using the appropriate authorization response method as represented by FIG. 10 or FIG. 11, or C) enable an authorization to be granted based on proximity of the Owner to the point of use as illustrated in FIG. 8, or D) provide a delayed response to a request placed in a queue for not real-time but delayed approval as depicted in FIG. 10. In each case, the IMSP subjects the request for authentication to a sequential verification procedure in which the request is tested against one or more pre-defined verification protocols, the deployed authentication protocol being pre-determined by the Owner and pre-selected in accordance with a user profile that was pre-programmed by the Owner.

Figure 13A:
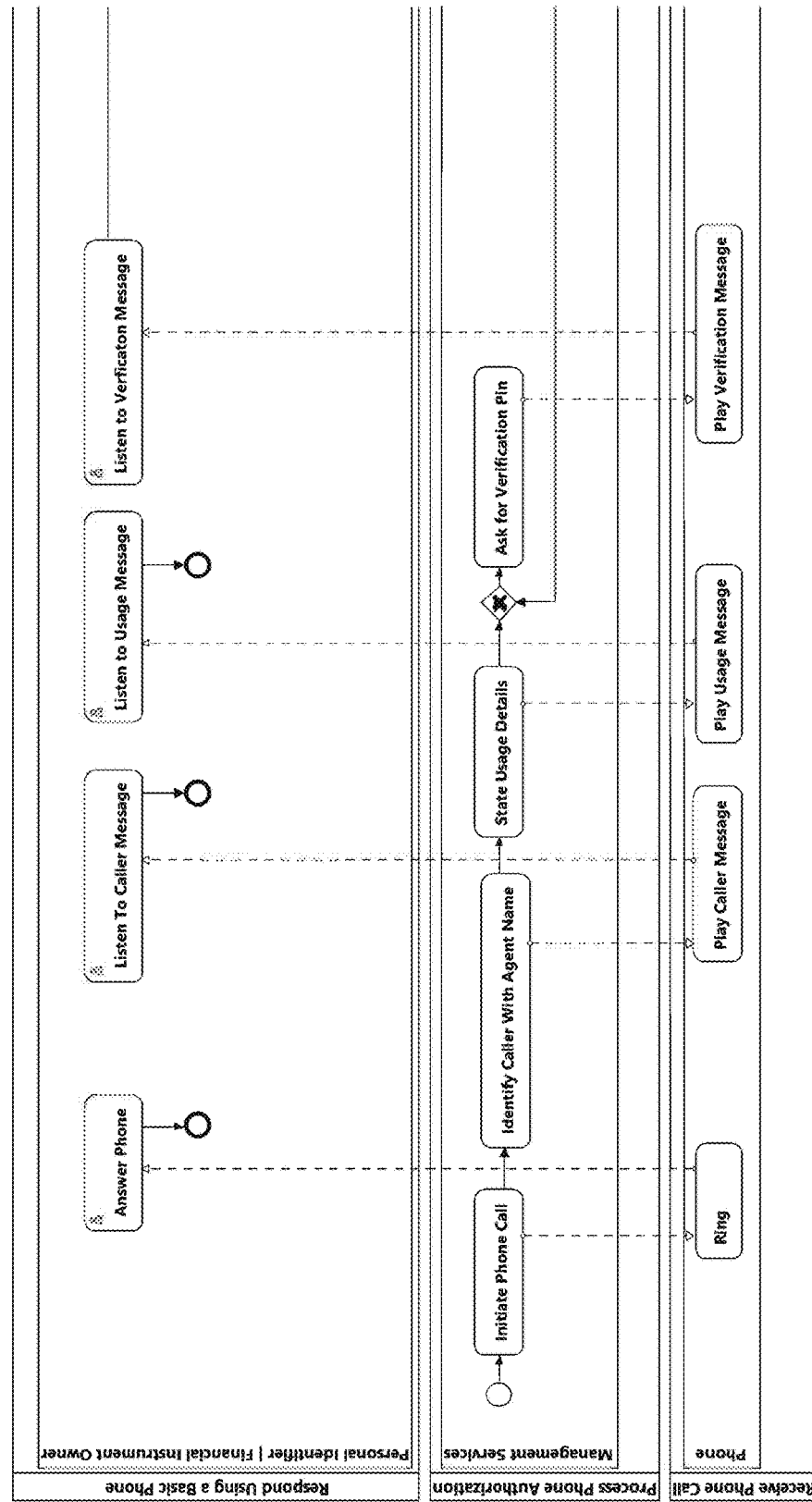
FIGS. 13A-13C are a diagram, titled "Respond with a Basic Phone", of a subset of the process steps within the overall generic business process which solicits authorization of the use of a personal identifier or financial instrument using a non-smart device, e.g. either a traditional telephone or basic cell phone.
Figure 13B:
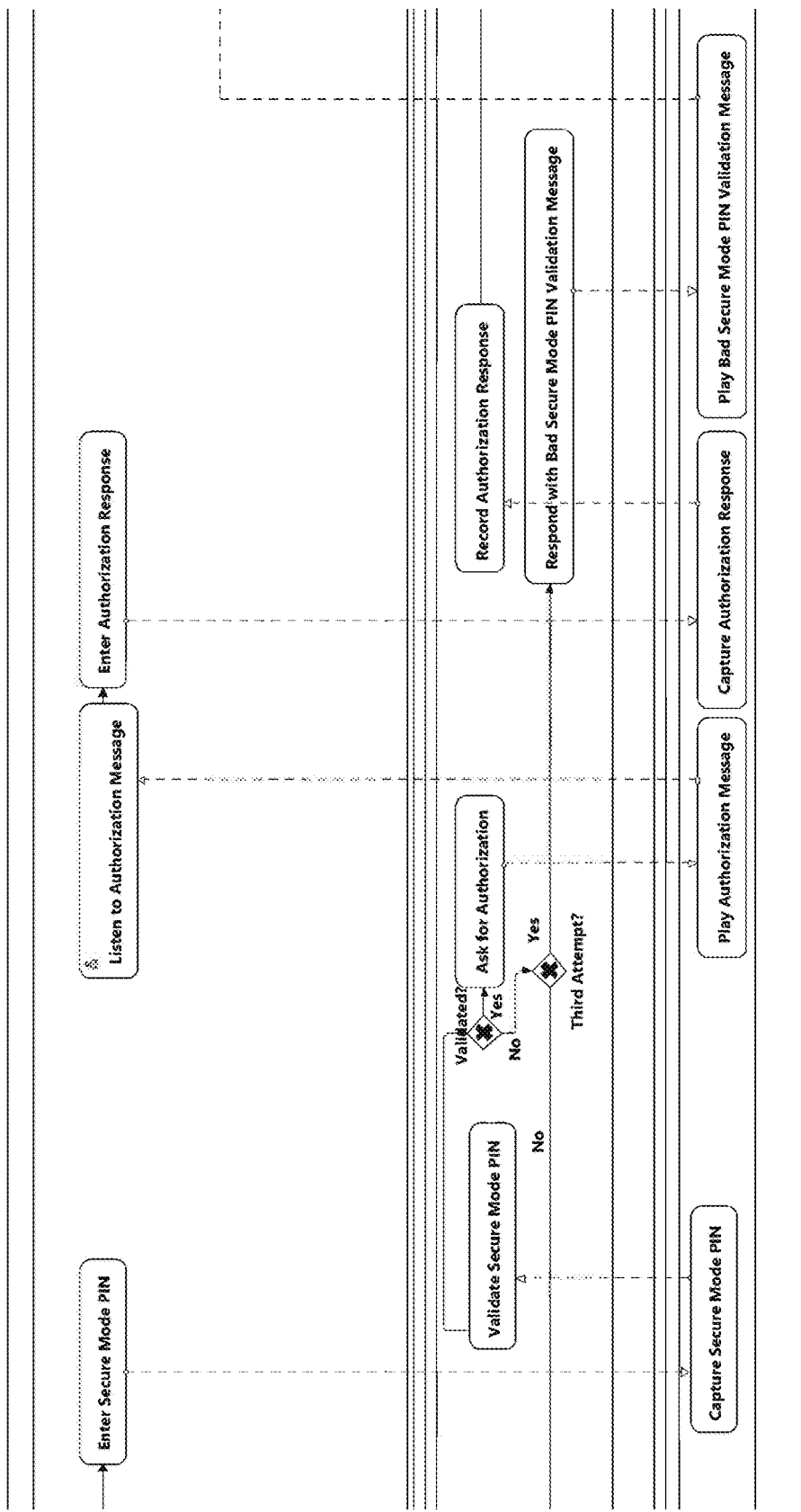
Figure 13C:
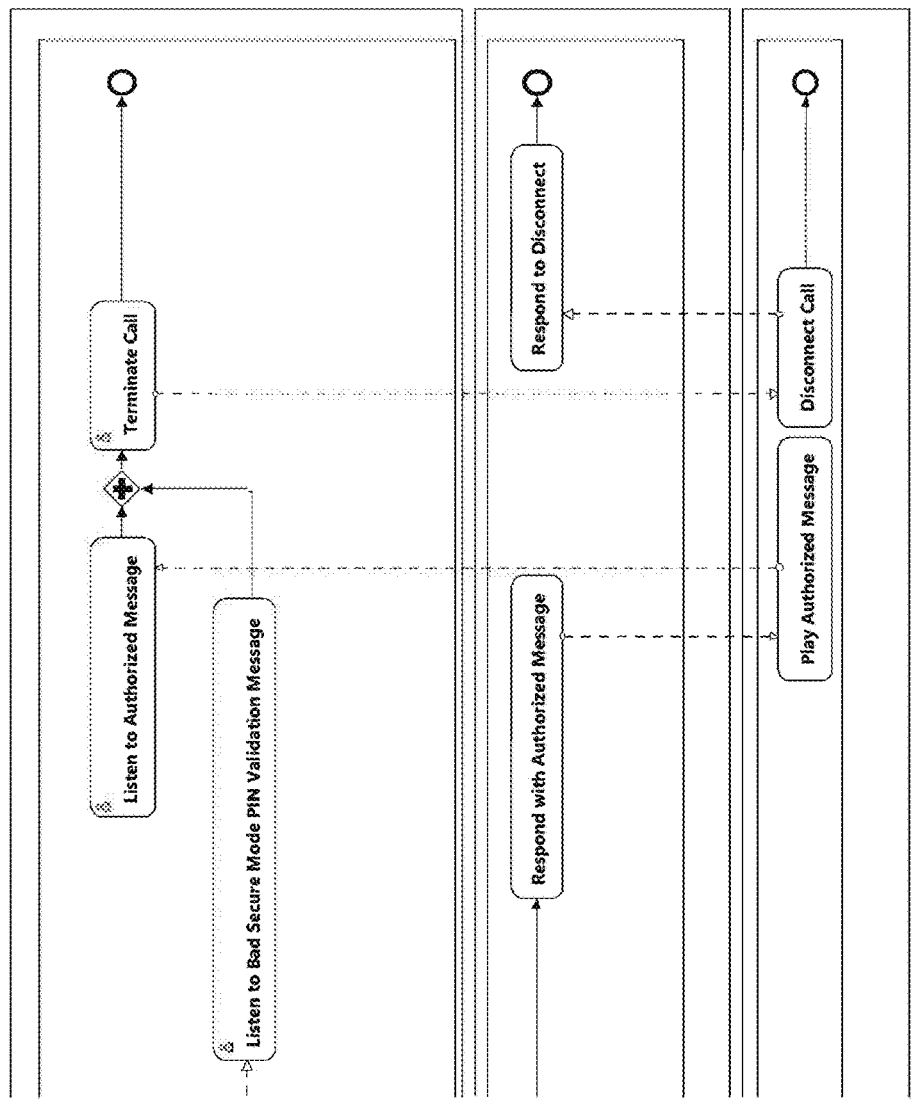

The present method envisions the possibility of the need to pre-authorize or respond when the presence of a smart device does not exist. Emergency pre-authorization can be accomplished via a basic telephone as illustrated in FIG. 12. The present method also presents processes to authorize with a basic phone, as represented in FIG. 13, and to authorize using a phone with text messaging, as documented in FIG. 14. To prevent un-authorized use of a public, insecure or stolen device, a secure mode capability is provided for and is documented in FIG. 15.

Figure 18:
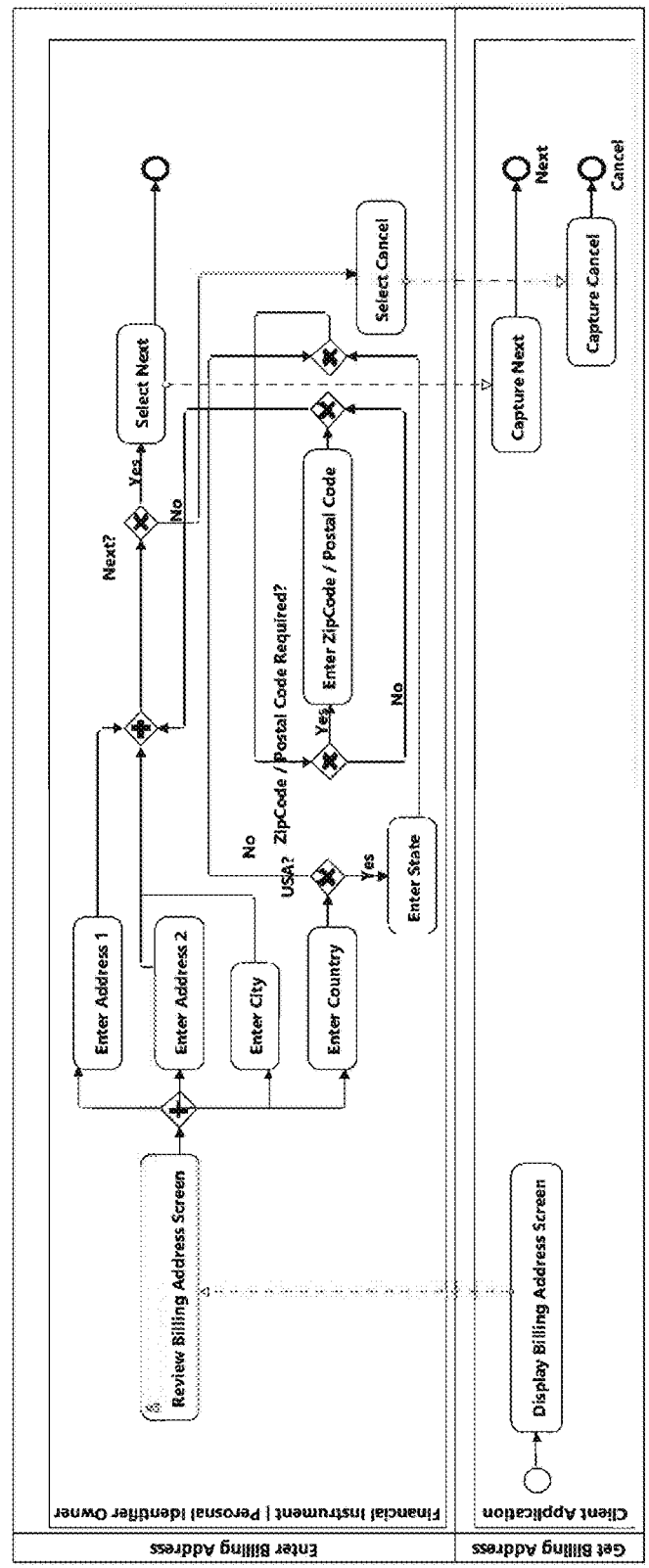
FIG. 18 is a diagram, titled "Get Billing Address", of a subset of the process steps within the overall generic business process which documents the setup or maintenance of billing addresses used by the process.
Figure 19:
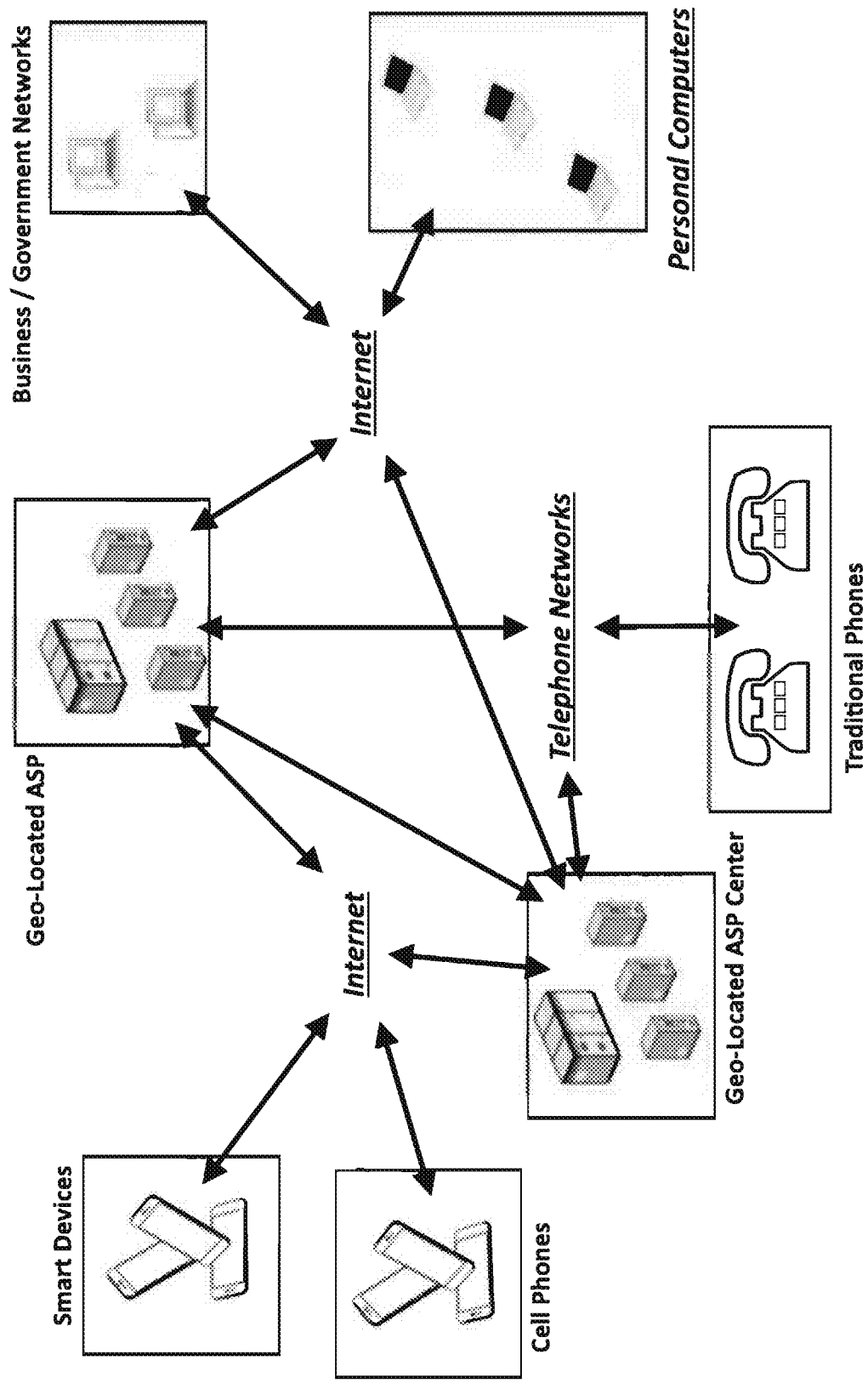
FIG. 19 is a diagram which illustrates the relationships of the devices used by these processes utilizing the Internet and telephone networks as the communications mechanism.

FIG. 16 represents the initial setup of the client application while FIG. 17 documents the continuing maintenance and setup of the client application during its lifetime. Finally, FIG. 18 presents a subroutine for acquiring the billing address of the user during the previous setup scenarios.

Figure 7A:
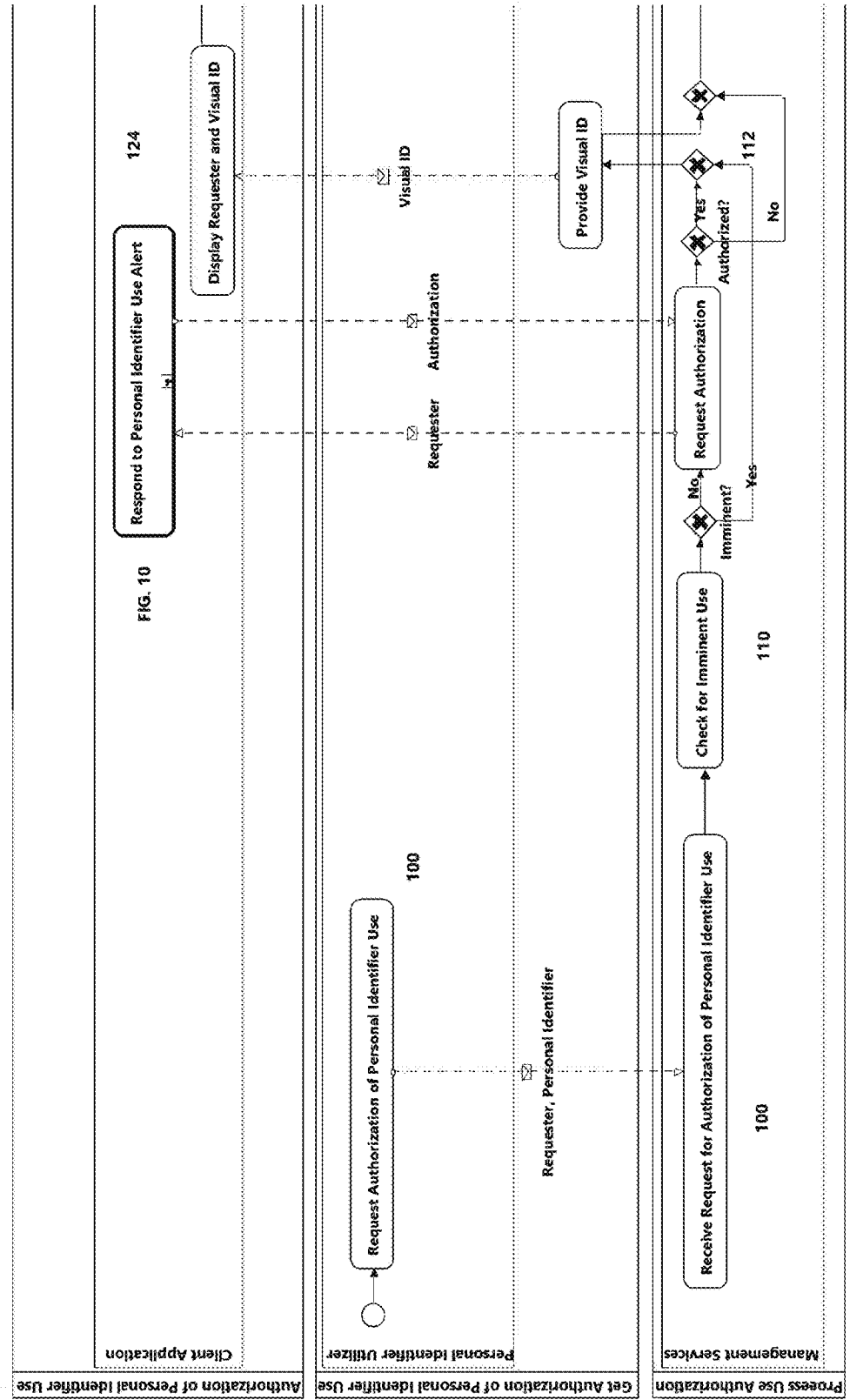
FIG. 7A-7B are a diagram, titled "Verify Personal Identifier Use", of a subset of the process steps within the overall generic business process which verifies authorization of the use of a personal identifier.
Figure 7B:
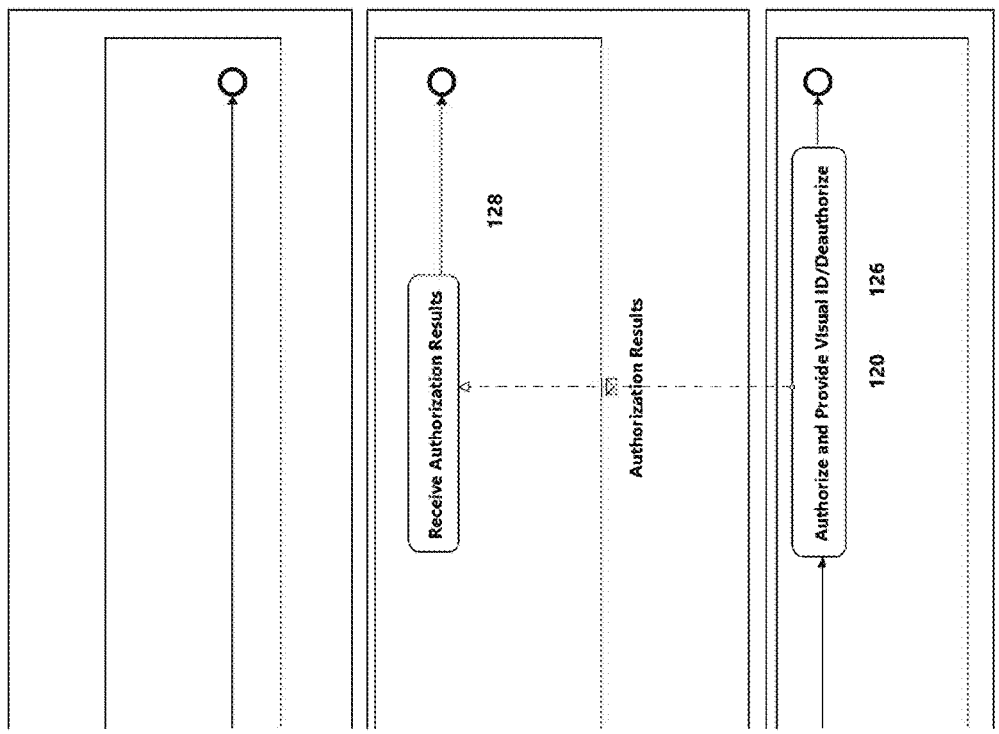
Figure 8A:
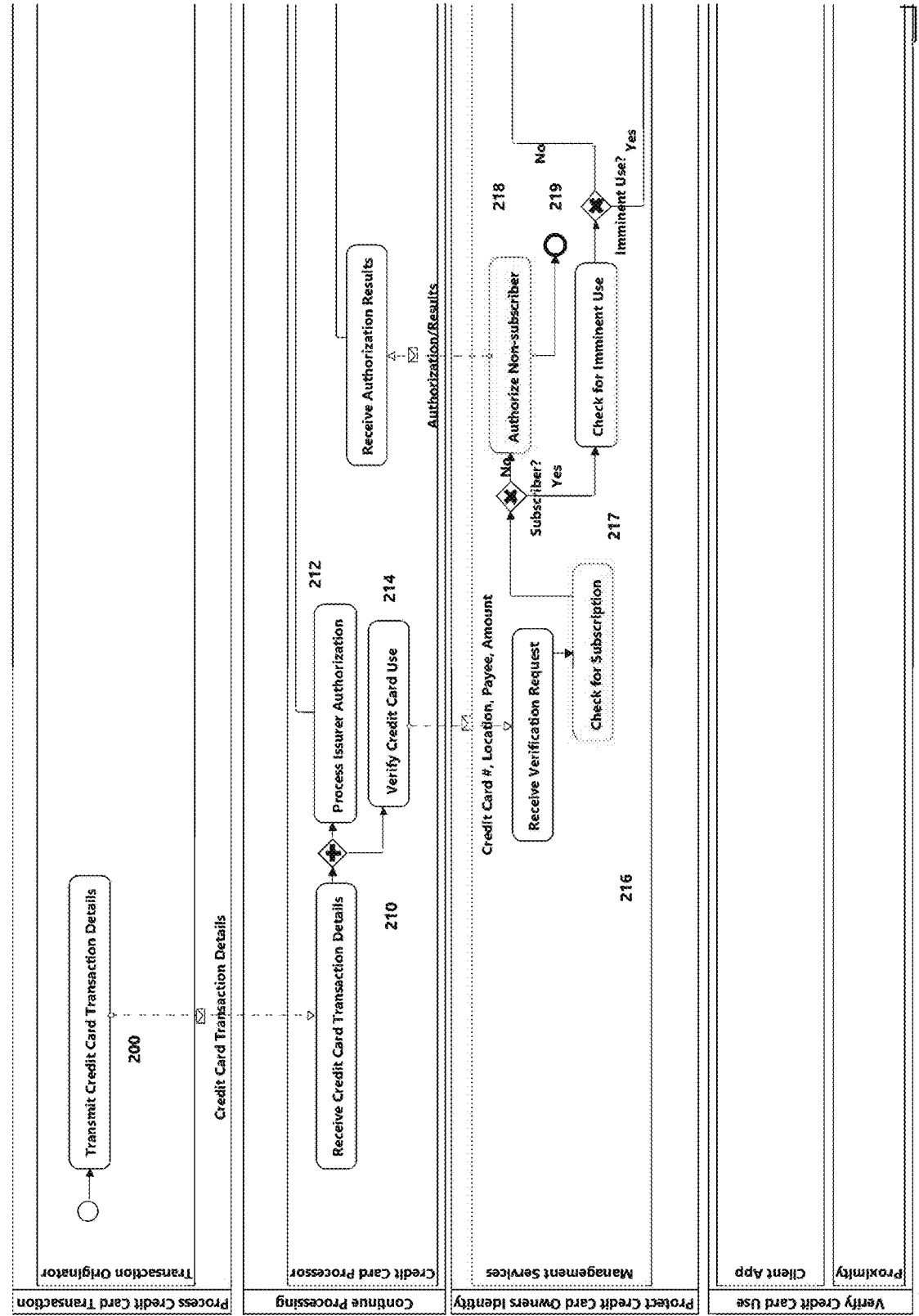
FIGS. 8A-8D are a diagram, titled "Process Credit Card Transaction", of a subset of the process steps within the overall generic business process which verifies authorization of the use of a credit card financial instrument.
Figure 8B:
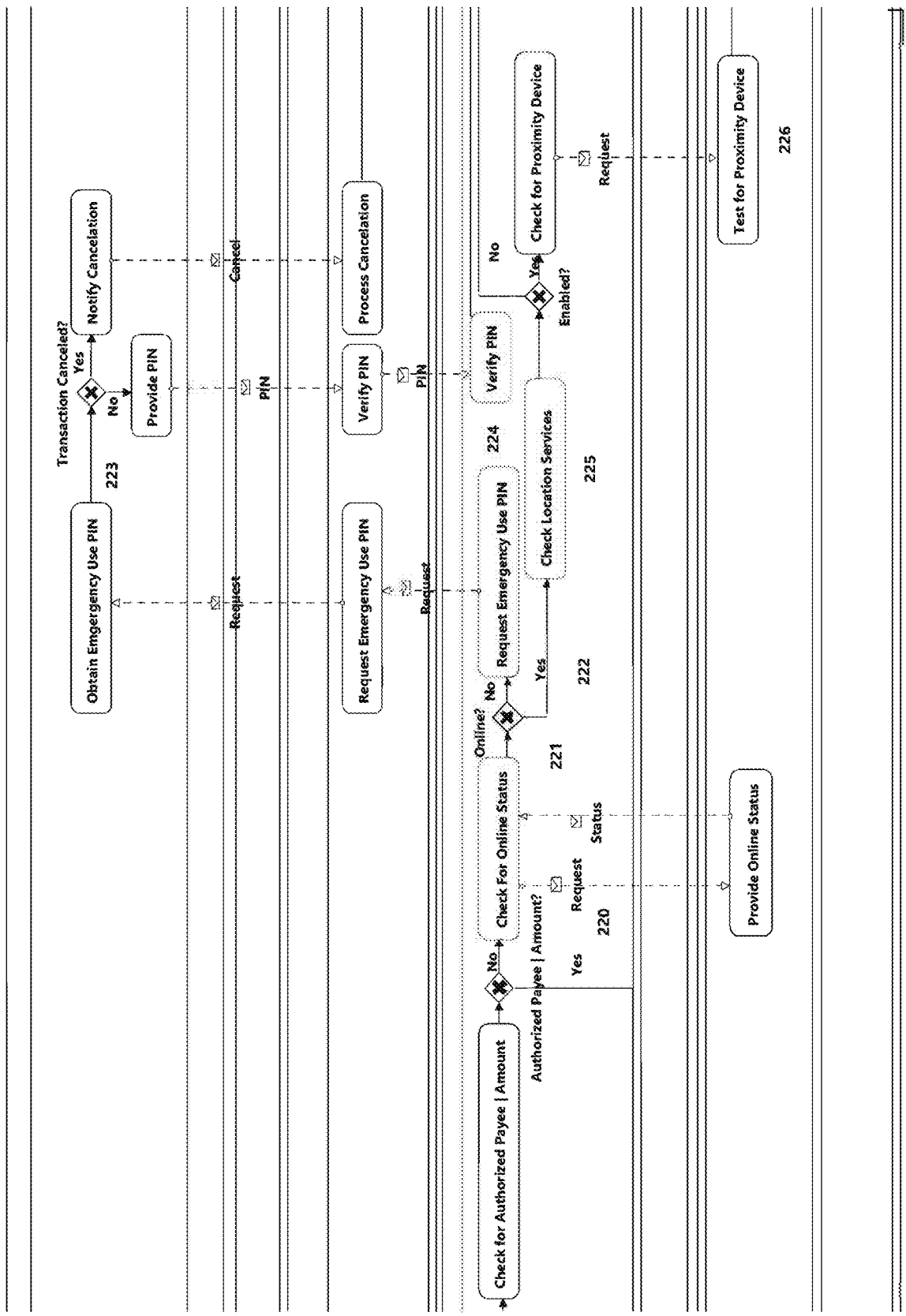
Figure 8C:
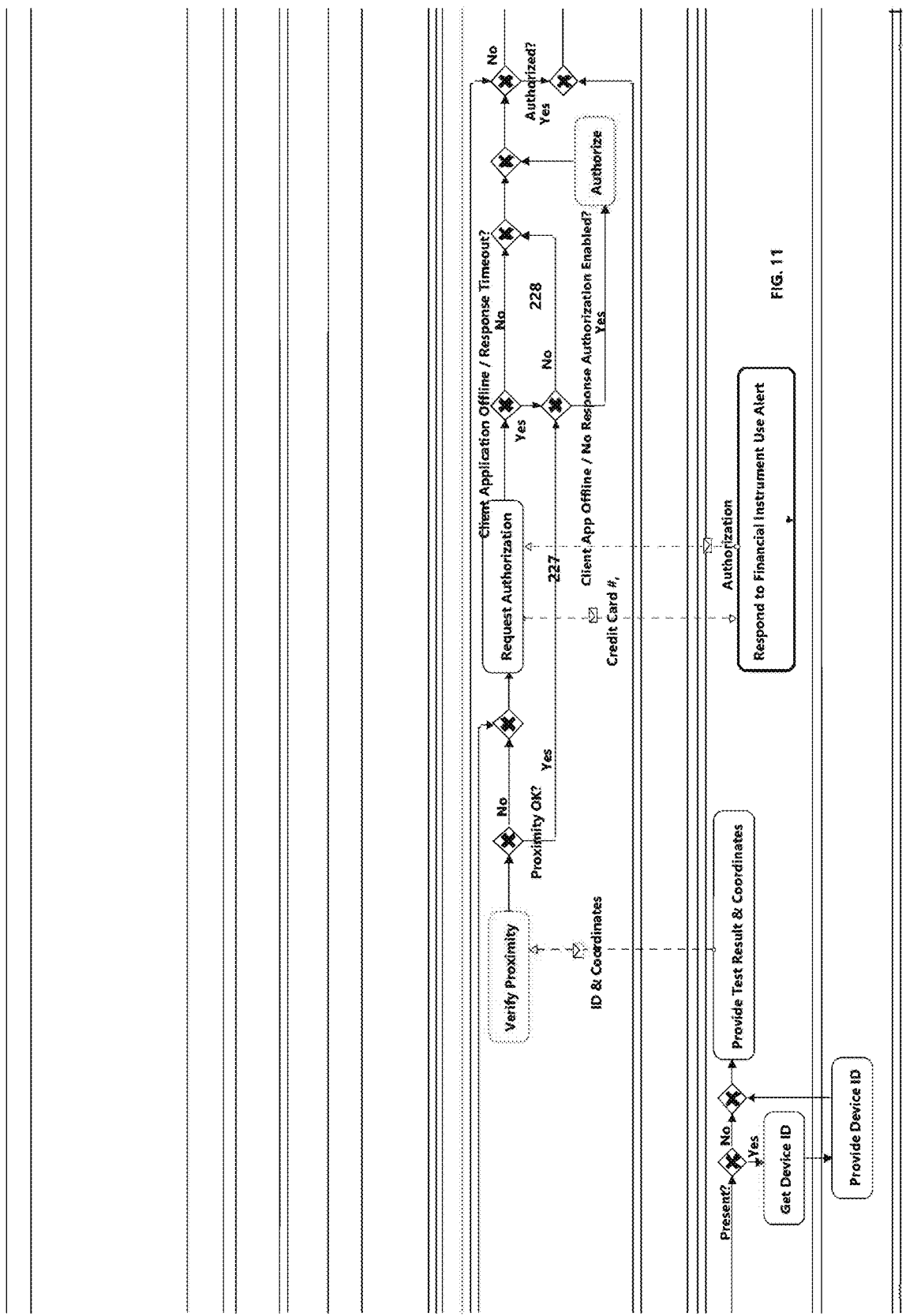
Figure 8D:
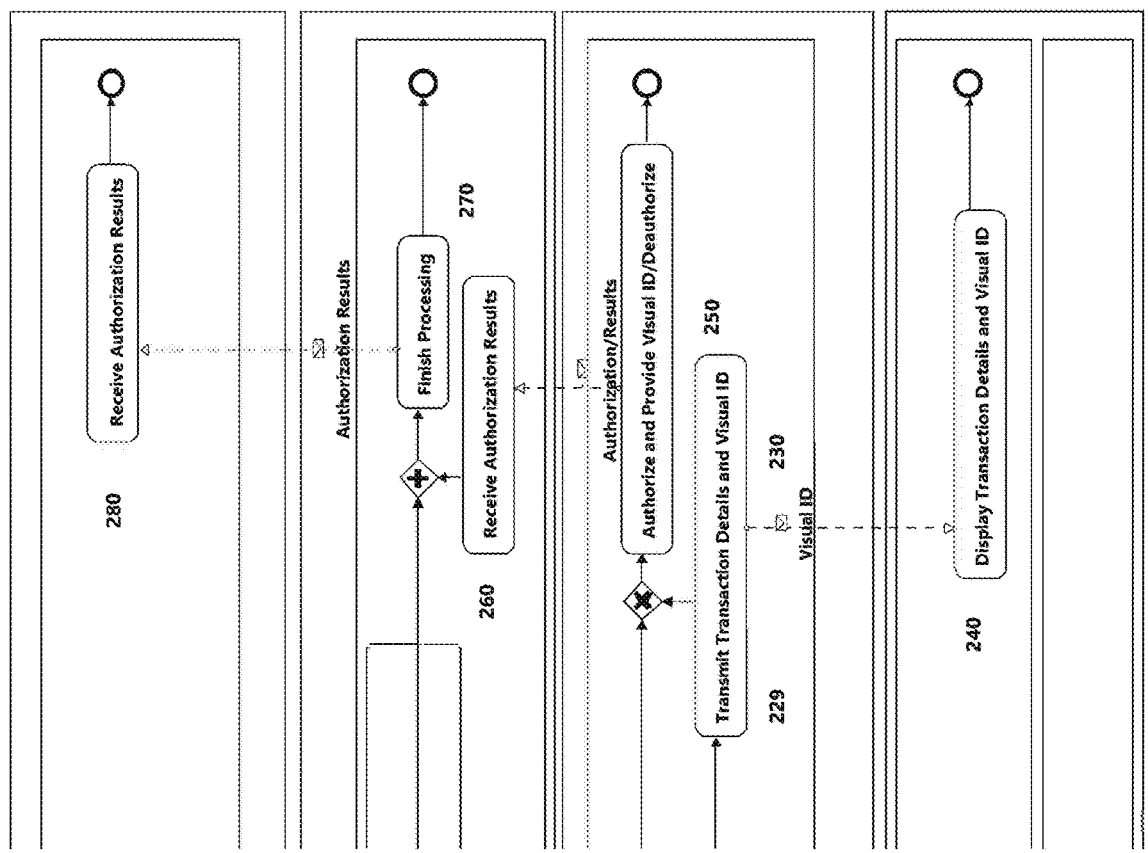

With the decision as to the type of transaction type to be processed as being a Personal Identifier (PI) in FIG. 1, FIG. 7 is a diagram of the Owner's response to the first transaction type, titled "Verify Personal Identifier Use", which illustrates the final software process steps within the overall generic business process which authenticates the use of a personal identifier. This can be, for example, an ATM or web-based transaction requiring use of a PI or any form of transaction requiring an Owner-provided PI. For example, if the Owner seeks to open a checking account at a bank and the bank solicits the Owner's social security number, the present process verifies the SSN directly from a trusted authenticator (the IMSP) and secures the process on the Owner's behalf, avoiding identity fraud. The process steps are divided into separate horizontal pathways running left-to-right depending on which participant is performing that step, with Owner steps at top, business or government entity in the middle, and the IMSP (shown as UML Pools named "Management Services" in all diagrams) at bottom.

At step 100 the third-party business or government entity (e.g., a bank) requests authorization of personal identifier use. The request may be submitted via a dedicated business or government entity access website made available by the IMSP. At step 105 the IMSP receives the request for authorization of use of the PI and begins to process the request. Upon receipt, the IMSP verifies if the PI belongs to a subscriber of the IMSP's service. If not, the IMSP bypasses the following verification procedures and responds by notifying the requester that the PI is not controlled by the IMSP. Otherwise, beginning at step 110 the IMSP subjects the request to a sequential verification procedure in which the request is tested against several verification protocols, each protocol being determined in accordance with a pre-programmed Owner profile.

At step 110 the IMSP checks the Owner profile and determines if the Owner has pre-programmed an "imminent use" authorization. As described below, the Owner may provide a one-time pre-authorization of use of the PI which stays in effect for a specified time period. If an "imminent use" authorization was provided and the business or government entity request conforms to Owner-programmed parameters the process proceeds to step 120 and the IMSP will display the results of the authorization, e.g. "Authorized" or "Not Authorized" along with a pre-stored photo of the Owner, with the requested personal identifier use. If the Owner has not provided a one-time "imminent use" pre-authorization, then at step 112 the process reaches out to the Owner by seeking authorization to use the PI. This is done by sending an authorization request to the client application resident on the Owner's smart device, to which the Owner responds as per the subroutine of FIG. 10 (described below). If Owner authorization is/is not obtained at step 126 the process authorizes or deauthorizes the transaction, and the results are forwarded to the business or government entity at step 128.

Figure 9A:
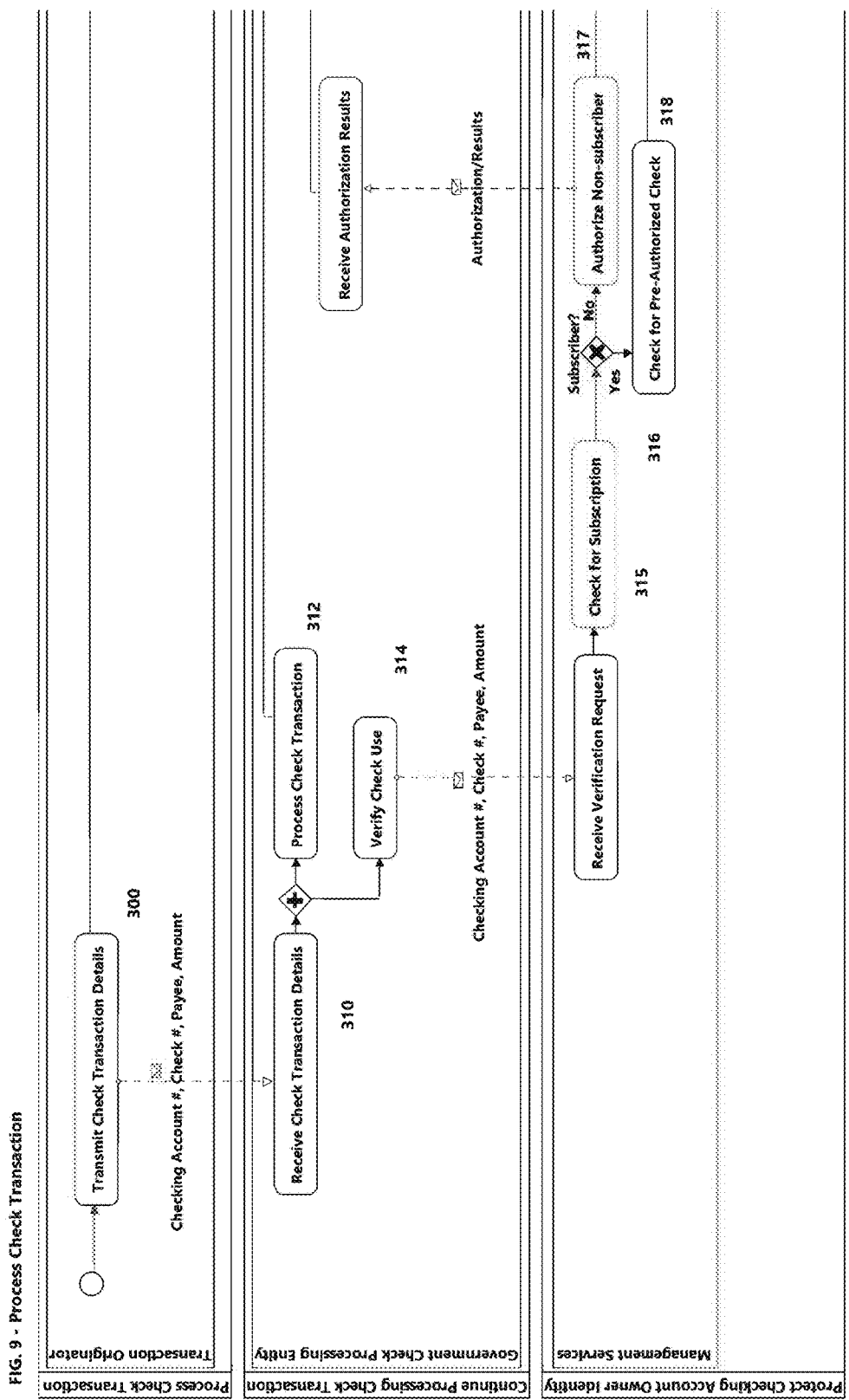
FIGS. 9A-9B are a diagram, titled "Process Check Transaction", of a subset of the process steps within the overall generic business process which verifies authorization of the use of a check financial instrument.
Figure 9B:
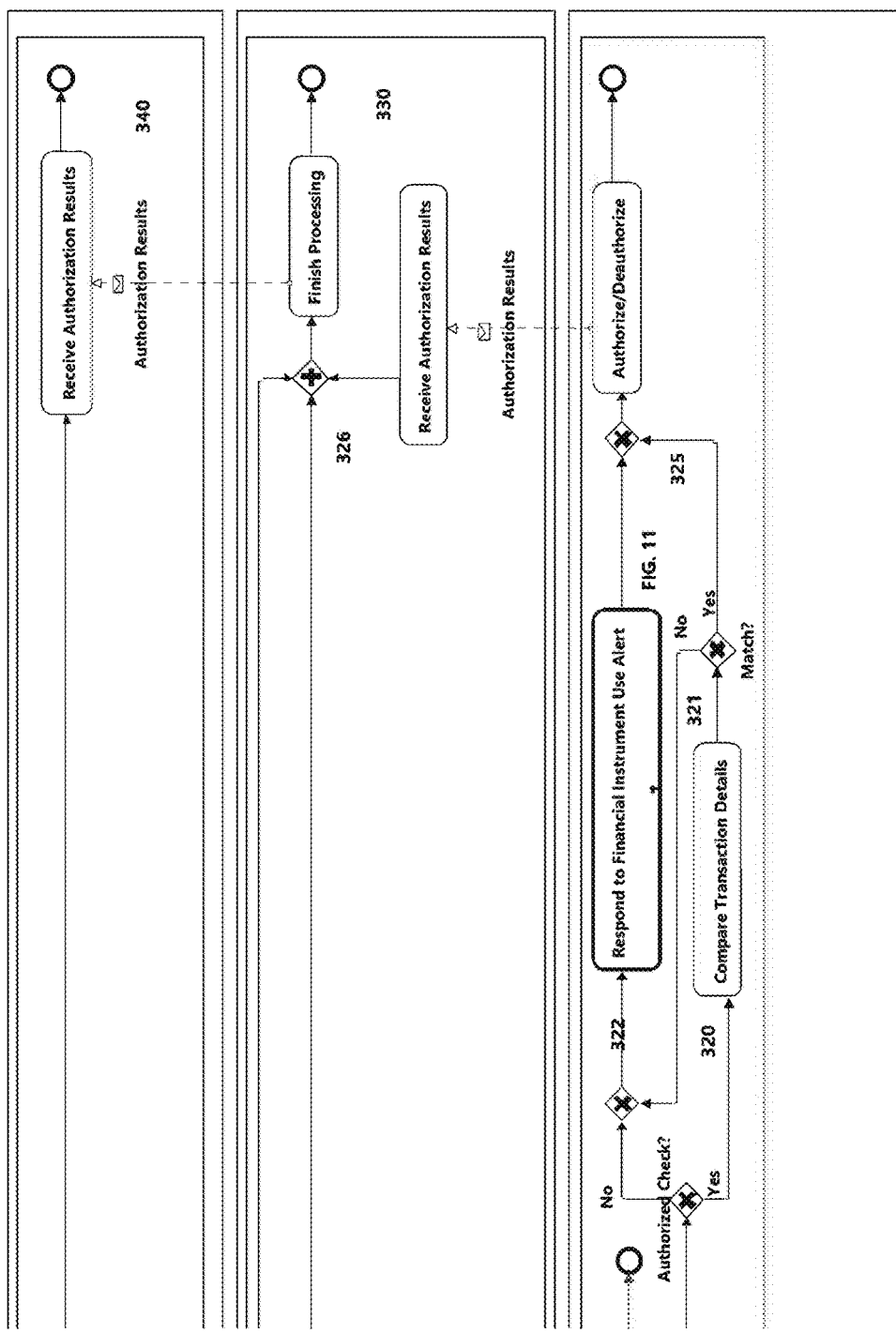

As opposed to a PI, FIGS. 8-9 describe verification of a FI use. In both FIG. 8, "Process Credit Card Transaction" and FIG. 9, "Process Check Transaction", Originators continue to use the traditional transaction networks i.e. VISA, MasterCard, Discover, American Express and the Federal Reserve). Both business or government entities with the transactional networks will have access to a web service to obtain authorization of use and a photograph of the financial instrument owner. This verification involves a response from the Owner which may have been pre-authorized or interactively obtained as defined by FIG. 11, "Respond to Financial Instrument Use Alert" if a smart device is used.

FIG. 8 is a BPMN diagram of the first form of financial instrument use, titled "Process Credit Card Transaction", which illustrates the process steps to verify authorization of the use of a credit card. Credit card transactions additionally involve a credit card processor, and so these process steps are divided into four separate horizontal pathways running left-to-right depending on which participant is performing that step, with business or government entity at top, credit card processor second, the IMSP third, and the Owner with the client application at bottom.

At step 200 a business or government entity submits a credit card transaction and at step 210 the request details are received by the credit card processor. At this point, two parallel paths begin. In the first path, at step 212, the transaction is processed in the conventional manner though the credit card issuer, i.e. bank. In the second path, at step 214, the credit card processor requests verification of the credit card's use from the IMSP. At step 216 the request details have been forwarded to the IMSP. Upon receiving the request, at step 217, the IMSP checks to see if the cardholder is subscribed to the personal identifier/financial instrument service. If not, the following verification processes are bypassed and the transaction is authorized in step 218. Otherwise, the IMSP subjects the request to a sequential verification procedure in which the request is tested against several verification protocols, each protocol being determined in accordance with a pre-programmed Owner profile. At step 219 the IMSP checks the Owner profile and determines if the Owner has pre-programmed an "imminent use" authorization. As described below, the Owner may provide a one-time pre-authorization which stays in effect for a specified time period. If an "imminent use" authorization was provided and the credit card processor request conforms to Owner-programmed parameters, the process proceeds to step 230 and the credit transaction is authorized. At step 240 the transaction details and Owner's photo can be used/ displayed to the business or government entity as a form of ID (in place of a driver's license). At step 250 the IMSP authorizes or deauthorizes the transaction, provides the results to the credit card processor at step 260. Just before step 270, the two paths merge. Using the results from both paths, the processor finishes processing at step 270 and conveys the results to the business or government entity at step 280. Importantly, both paths must result in granted authorization for the transaction to succeed.

As described below, the Owner may provide a durable pre-authorization for credit transactions to certain payees. If in step 220 a durable pre-authorization for credit transactions was provided and the processor request conforms to the Owner-programmed durable parameters the process proceeds to step 230 and as above the credit transaction is authorized or not.

The remaining alternative steps are dependent on the Owner's device being online. At step 221, the IMSP tests for that condition and if the device is not found to be online, the IMSP in step 222 informs the Credit Card Processor that an Emergency Use PIN needs to be obtained via the Transaction Originator. At step 223, the Transaction Originator either returns the obtained Emergency Use PIN or cancels the transaction. Based on the validation of the Emergency Use PIN by the IMSP in step 224, the transaction is either authorized or not authorized. The Emergency Use PIN is deactivated either upon validation or three unsuccessful attempts.

If at step 221, if the Owner's device is found to be online, and if the Owner has not provided a durable pre-authorization, then at step 225 the IMSP checks the Owner profile and determines if the Owner has pre-programmed a "proximity" authorization. As described below, the Owner may provide a pre-authorization to approve credit transactions when the Owner's smart device is Location Services (GPS) enabled and within a defined geographic distance from the requesting business or government entity. If a "proximity" authorization was provided the IMSP polls the Owner's smart device for GPS coordinates. At Step 226, the Owner's smart device tests for the presence of a "Proximity Device", a transponder which will provide a unique ID. If the "Proximity Device" is present and provides the ID associated to the Owner's smart device, then the Owner's smart device obtains the coordinates and returns both the ID and coordinates to the IMSP. If those coordinates are proximate to the location of the requesting business or government entity, the process proceeds to step 230 and the credit transaction is authorized as above. If the Owner's smart device has not provided a proximity-authorization, then at step 227 the process reaches out to the Owner by seeking manual authorization for the transaction. This is done by sending an authorization request to the client application resident on the Owner's smart device, to which the Owner responds as per the subroutine of FIG. 11 (described below). If Owner authorization is/is not obtained the process authorizes or deauthorizes the transaction, and the process proceeds to step 230 as described above and the credit transaction is selectively authorized or not. If there is no response from the client app within a specific time period at step 228 and "Client App Offline/No Response Authorization Enable" has be enabled, the at step 229 authorization is granted. If authorized, then at step 250 the IMSP sends authorization to the credit card processor, which are received at step 260. In addition, at step 250 the IMSP sends a photo ID of the Owner that can be forwarded to the business or government entity, which, when received at step 280, identifies the Owner in addition to the verification of the credit card use.

FIG. 9 is a diagram of the second form of financial instrument use, titled "Process Check Transaction", of a subset of the process steps within the overall generic business process which verifies authorization of the use of a check financial instrument. Check transactions additionally involve the Federal Reserve (or its foreign equivalent), and so these process steps are divided into three separate horizontal pathways running left-to-right depending on which participant is performing that step, with business or government entity at top, Federal Reserve second, and the client application resident on the Owner's device last.

At step 300 a business or government entity submits a check transaction and at step 310 the transaction details are received by the Federal Reserve. At this point the processing is split into two parallel paths. In the first path, at step 312, the transaction is processed in the conventional manner with the issuing bank. In the second path, at step 314, the transaction (inclusive of check #, account #, payee, check amount, etc.) are sent to the IMSP for verification of use.

At step 316 upon receiving the request, the IMSP checks to see if the checking account holder is subscribed to the personal identifier/financial instrument service. If not, the following verification process is bypassed and the transaction is authorized in step 317. Otherwise the IMSP subjects the request to a sequential verification procedure in which the request is tested against several verification protocols, each protocol being determined in accordance with a pre-programmed Owner profile. At step 318 the IMSP checks the Owner profile and determines if the Owner has pre-programmed a specific check authorization. As described below, the Owner may provide a one-time pre-authorization for a specific payee, check no., and/or check amount. If a specific check authorization was provided and the check conforms in step 320 to the Owner-programmed parameters the process proceeds in step 321 and the credit transaction is authorized. If the check is not pre-authorized at step 322 nor compares at step 321, then the check requires manual response which is detailed in FIG. 11, "Respond to Financial Instrument Use Alert". At step 325 the IMSP authorizes or deauthorizes the transaction, and provides the results to the Federal Reserve. At this point the two parallel paths merge. Using the results from both paths, the Federal Reserve finishes processing at step 330 and conveys the results to the business or government entity at step 340. Both paths have to grant authorization for the transaction to succeed.

As described below, each verification process directly requiring Owner participation is preceded with an access control process involving a "Secure Mode PIN" if the smart device client application has been set to "Secure Mode" operation as documented in FIG. 15, "Process Secure Mode Access". This setting and subsequent use provides a safety factor where both the financial instruments and/or personal identifiers are stolen with the smart device and subsequently attempted to be used together.

Either verification process is augmented with backup process if the client application is not active as illustrated in FIG. 13, "Respond with a Basic Phone". The backup process entails the IMSP auto-dialing Owner-specified contact phone numbers and playing recorded voice messages to verify manually. With completion of the previous responses, the respective calling activities complete returning the authorization results to their respective calling activity, e.g. FIG. 2, "Use Personal Identifier or FIG. 3, "Use Financial Instrument" to allow completion of those processes with either an authorization or a de-authorization of use.

Figure 14A:
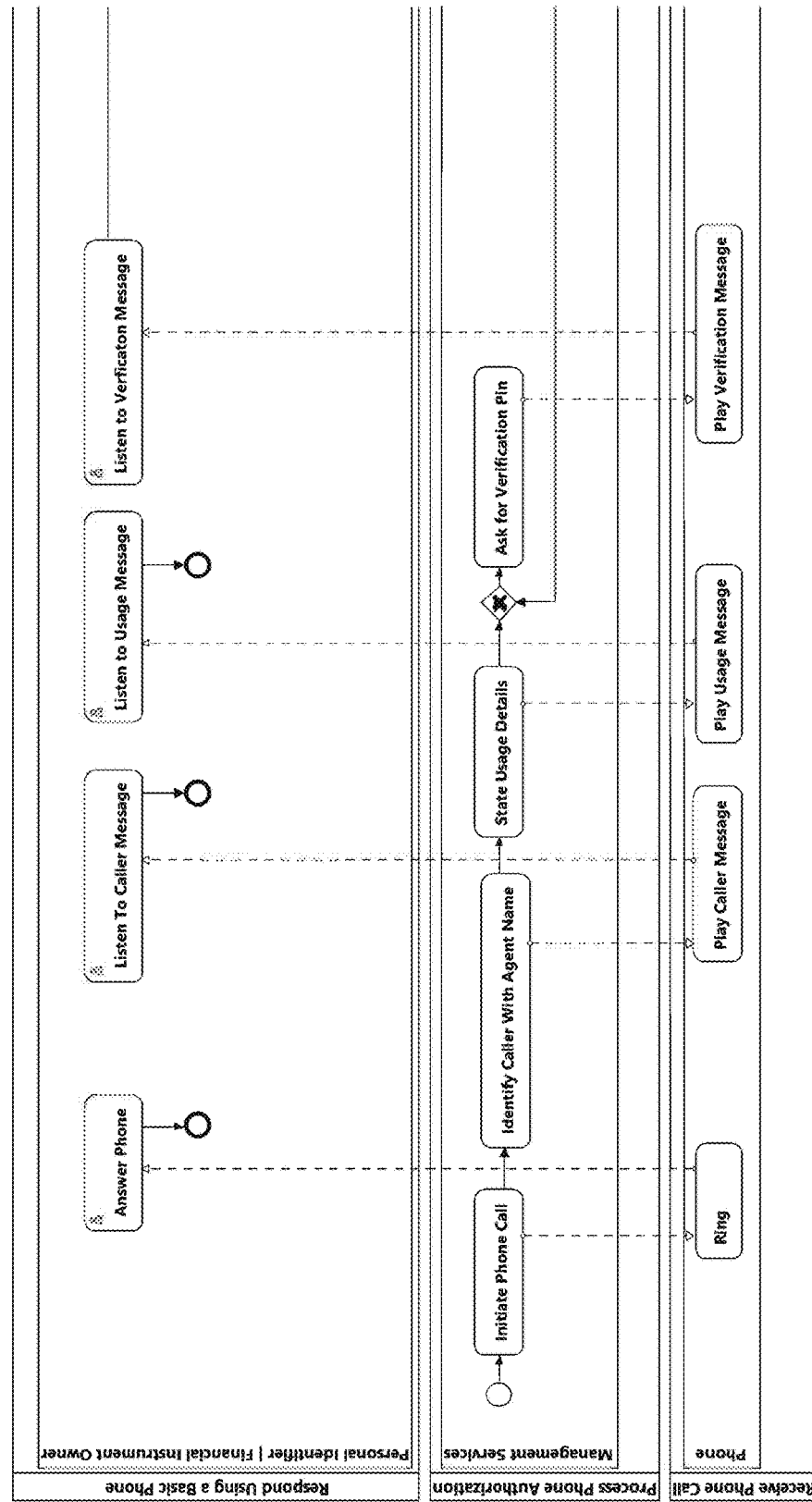
FIGS. 14A-14C are a diagram, titled "Respond with a Basic Phone with Text", of a subset of the process steps within the overall generic business process which solicits authorization of the use of a personal identifier or financial instrument using a non-smart device, e.g. either a traditional telephone or basic cell phone with just texting capability.
Figure 14B:
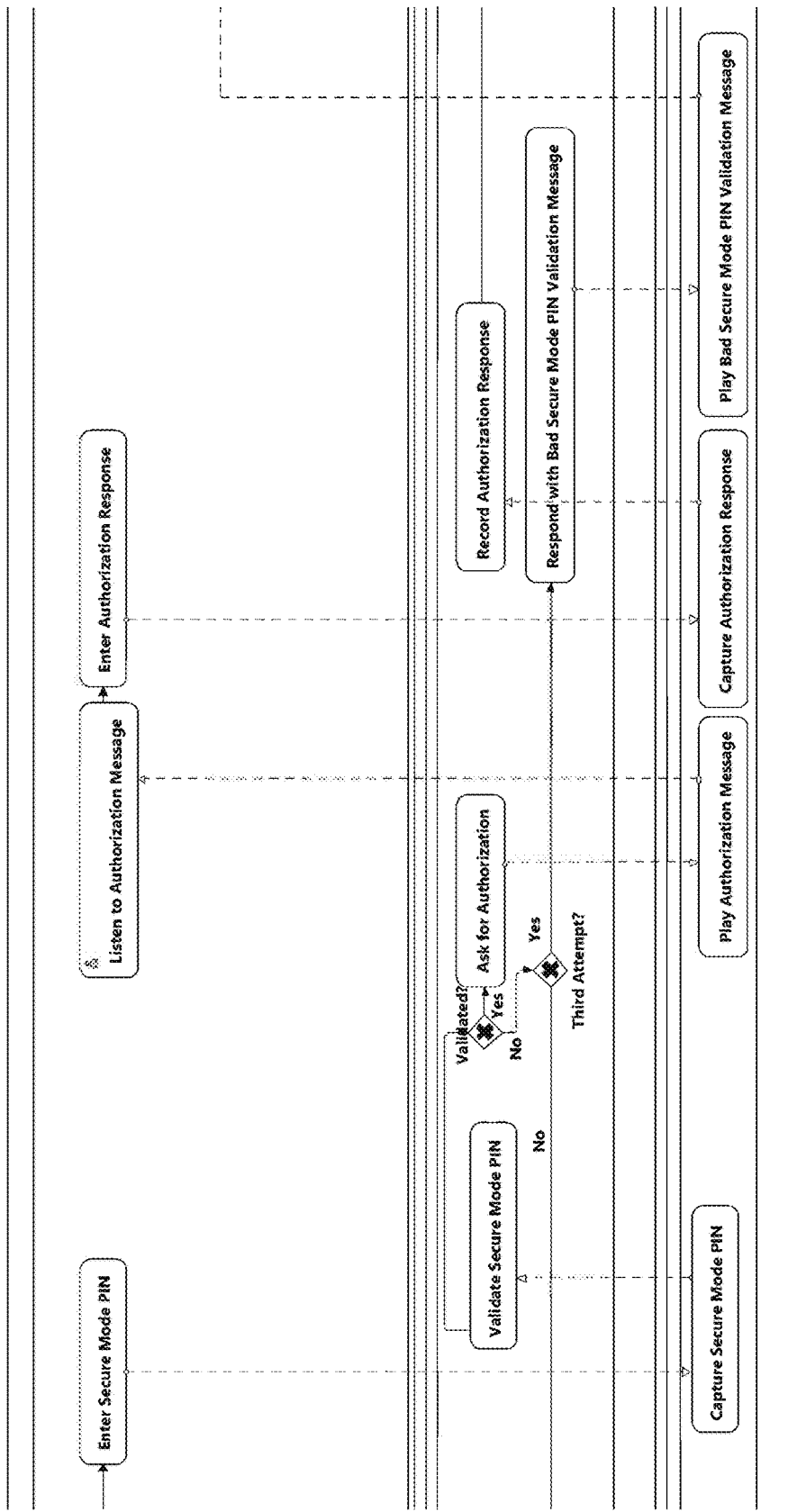
Figure 14C:
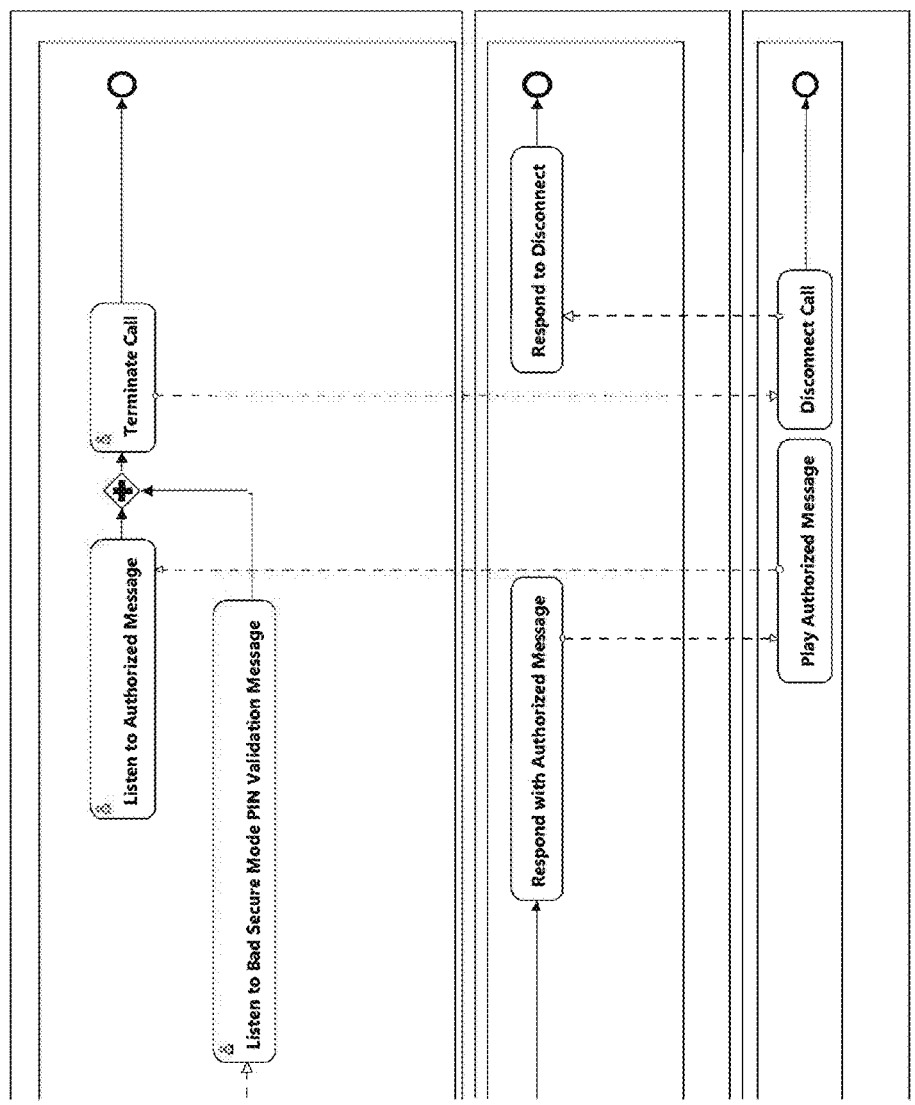

Either verification process is also augmented with backup process if the client application is not active as illustrated in FIG. 14, "Respond with a Basic Phone with Text". The backup process entails the IMSP connecting to Owner-specified contact phone numbers or texting application and using text capabilities to verify authorization manually. The Owner is directed to respond as requested by the business or government entity. The primary response is with completion of the requested response via a response text message, the respective texting activities completed by returning the authorization results to their respective calling activity, e.g. FIG. 2, "Use Personal Identifier or FIG. 3, "Use Financial Instrument" to allow completion of those processes with either an authorization or a de-authorization of use Alternative response processes can be specified by the business or government entity.

To support changes in the constraints defined in the "Initial Setup" process and the addition/deletion of personal identifiers and financial instruments, two additional processes have been defined and are illustrated in FIG. 17, "Setup" and FIG. 18, "Get Billing Address". Access to these processes is limited via entry of a "Secure Mode PIN" if the smart device client application has been set to "Secure Mode" operation as documented in FIG. 15.

Together, these processes force the secondary attainment of authorization of use from the Owner via the IMSP of the personal identifiers and/or financial instruments to complete the business process where that authorization was proactively granted via pre-authorization, interactively granted in real time via contacting the Owner, or granted based on proximity of the owner to the point of use.

To setup the Owner profile, FIG. 16 is a diagram of the Initial Setup. Initial Setup involves the Owner (using any smart device) communicating with the IMSP though the client software, and so these process steps are divided into four separate horizontal pathways running left-to-right with Owner at top, IMSP Representative in the middle, the smart device as the third lane and finally Identity Management Services at bottom. [MWG3]

At step 400 the setup screen is displayed on the smart device, and at step 402 the user may agree with it (step 403) or at step 404 may disagree. If the Owner disagrees the setup process is cancelled. If the Owner agrees with it at step 406, the Owner has the ability to enter a Secure Mode PIN at steps 410.

With PINs entered, the Owner may at step 420 view and pre-program his/her access control parameters. At step 422 access parameters includes username, Emergency Access PIN at step 424, Secure Mode selection at step 426, and Secure Mode PIN at step 428. Once these parameters are entered the basic user information is displayed as indicated at steps 430.

With basic user info entered, the IMSP Representative reviews the information entered and then enters their Representative ID and PIN as indicated at steps 435 to verify that the basic user information is consistent with the identification credentials provided. This step locks the device to individual and Identity Management Services returns a reference number for use in the next step.

At Step 436, the client application checks for the presence of a camera. If found, in step 437, the IMSP Representative uses the camera to take a photo of the Owner, otherwise they use an alternative camera. In either case, the photo is forwarded in step 438 to Identity Management Services using the reference number provided above. Upon receipt, Identity Management Services forwards the photo as part of a receipt notice to the Owner's device which displays it. At Step 439, the IMSP Representative compares the photo to the Owner and enters their Photo Match PIN to confirm the match. Three failed entries cancels the setup. A successful validation at step 440 of the Photo Match PIN results in the photo being activated and related to the owner.

The Owner then continues the setup, continuing at step 441 to view and pre-program his/her contact information including address and phone numbers. The Owner specifies the basic contact information as indicated at steps 442. With basic contact info entered, the Owner views and specifies billing information as indicated at steps 445, entering either credit card or checking account details. The contact information is used as the billing address.

There are also maintenance procedures used for changing any of the information gathered in the Initial Setup of FIG. 16. FIG. 17 illustrates these maintenance setup procedures.

The Owner has the ability to edit the Secure Mode PIN at steps 1410. At step 1415 a main maintenance screen is displayed which allow the owner to cycle through maintenance screens for the Initial Setup information of FIG. 16, including Basic Info (step 1430), credit cards (step 1432), checking accounts (step 1434), access control parameters (step 1436), agent and PI info (steps 1424-1428), checking accounts at steps 1440, credit cards at steps 1450, enabling client application offline/no response credit card processing at step 1451, basic user info at steps 1460, basic contact info at steps 1470, billing info at steps 1480, and payment selections at steps 1490.

FIG. 18 is a breakout diagram illustrating an exemplary detailed implementation of the "Get Billing Address" process, step 1485, shown generally in FIG. 17.

In order for the Owner to pre-authorize use of a PI, FIG. 4 is a diagram of the Pre-Authorize Personal Identifier Use. Initial Setup involves the Owner (using any smart device) communicating with the IMSP though the client application, and so these process steps are divided into three separate horizontal pathways running left-to-right with Owner at top, and the client application at bottom.

At step 1510, the Owner selects "Pre-Authorize Personal Identifier Use" from the client application running on their smart device. At step 1512, the client application captures the selection. At step 1520, the client application processes a Secure Mode PIN access subroutine (detailed in FIG. 15 described below). Secure Mode is an optional elevated security mode that requires the Owner to enter a specialized alphanumeric PIN chosen in the initial Setup Screen (described above) in order to gain access to a software feature.

Figure 15A:
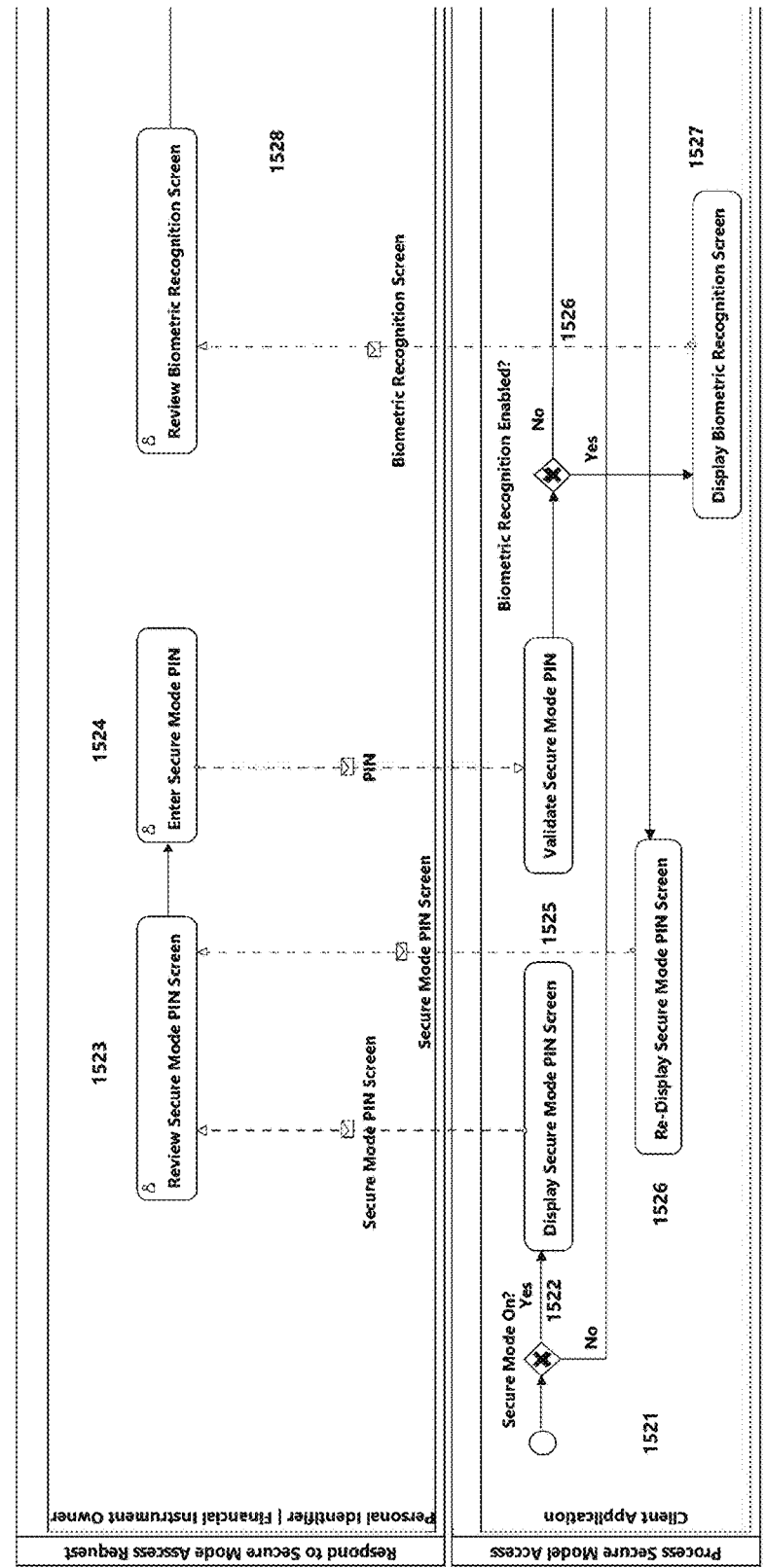
FIGS. 15A and 15B are a diagram, titled "Process Secure Mode Access", of a subset of the process steps within the overall generic business process which documents the use of a PIN to allow access to the functionality of the application on a smart device.
Figure 15B:
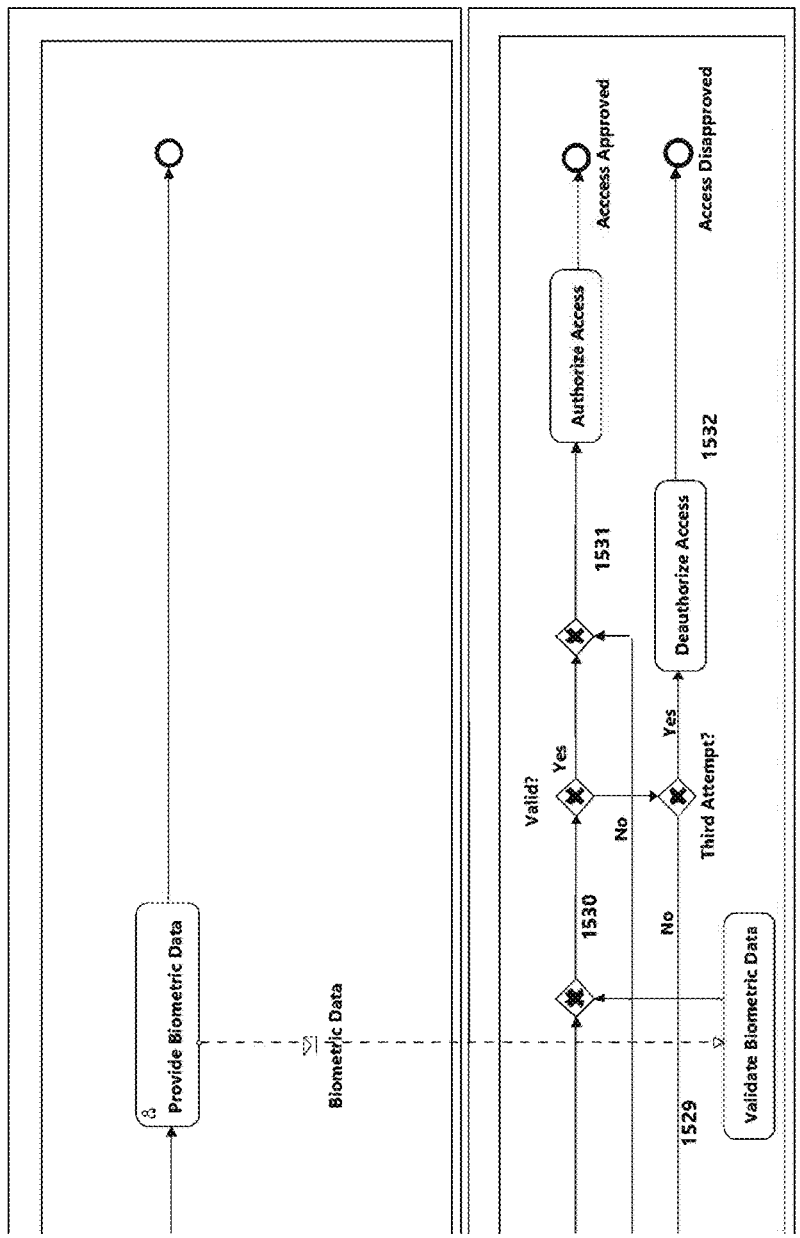
Figure 16A:
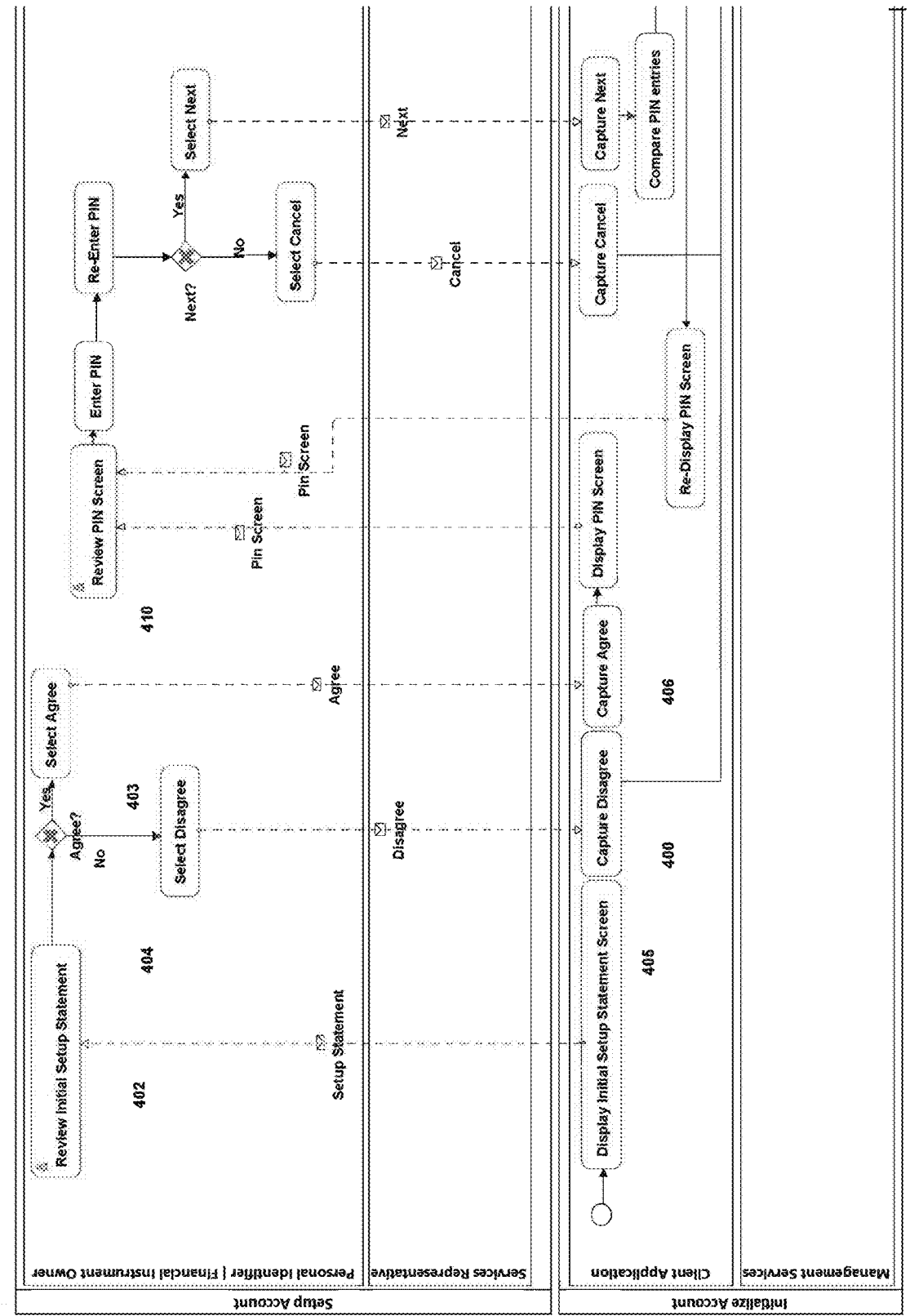
FIGS. 16A-16H are a diagram, titled "Initial Setup", of a subset of the process steps within the overall generic business process which documents the initial setup of the constraints on the process.
Figure 16B:
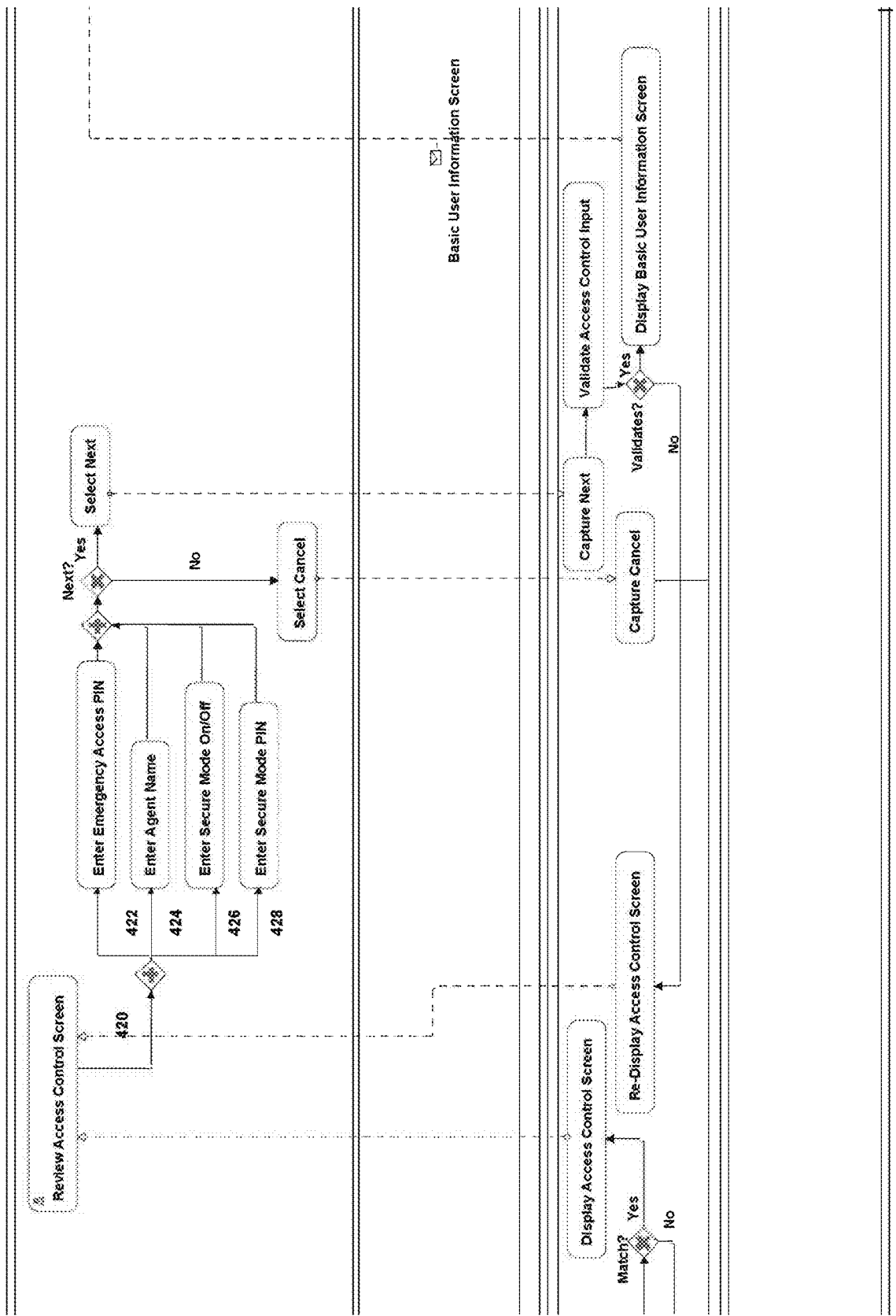
Figure 16C:
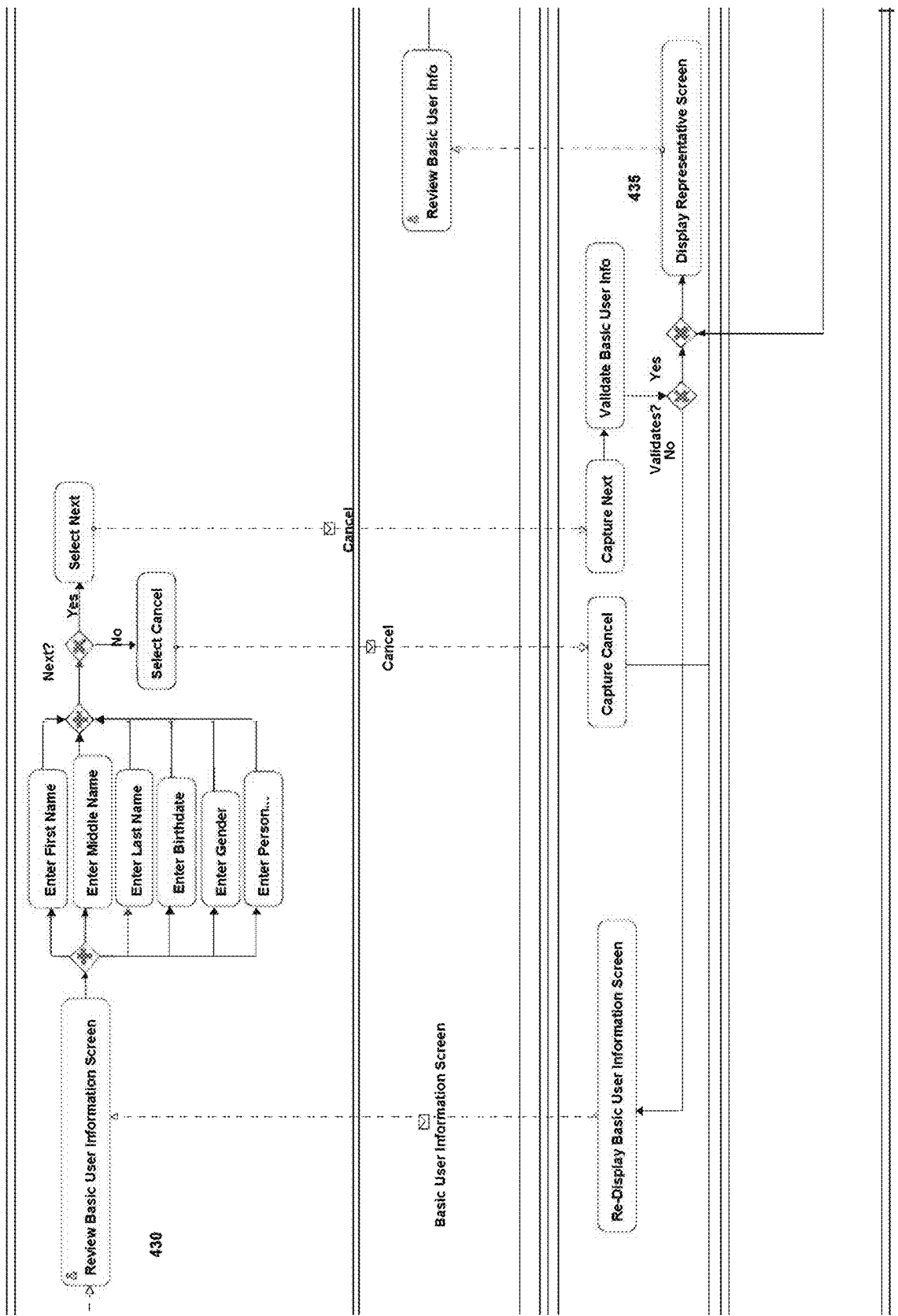
Figure 16D:
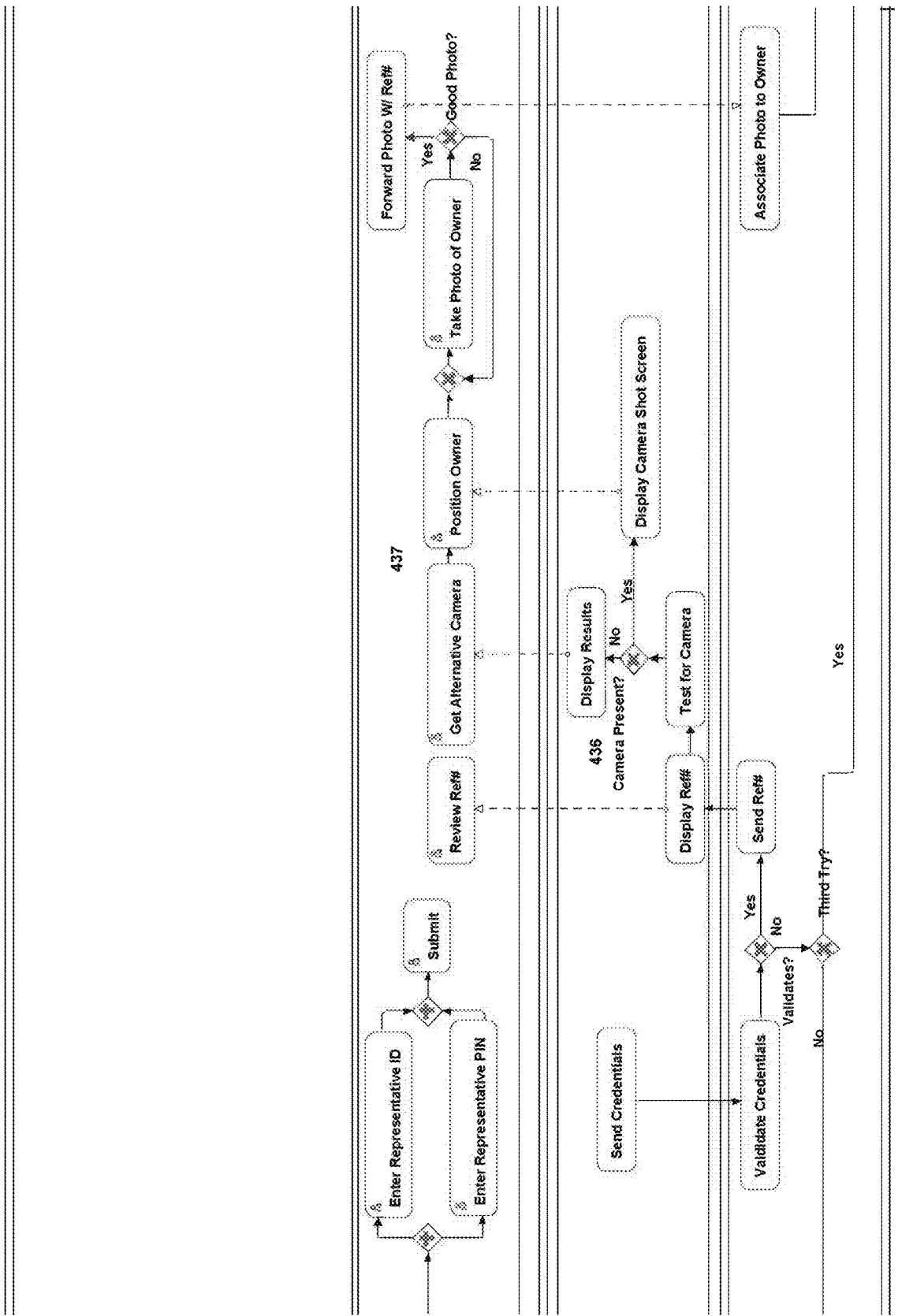
Figure 16E:
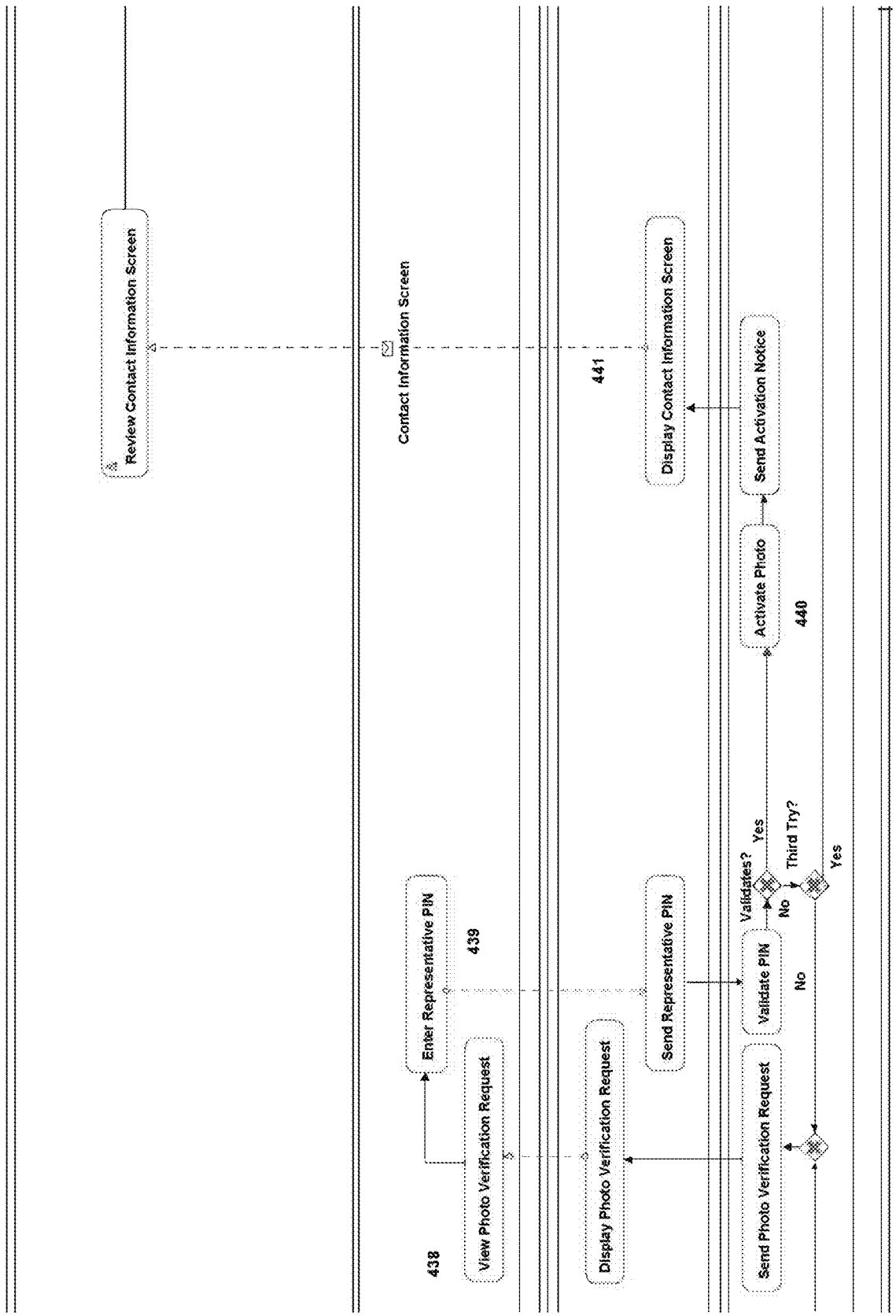
Figure 16F:
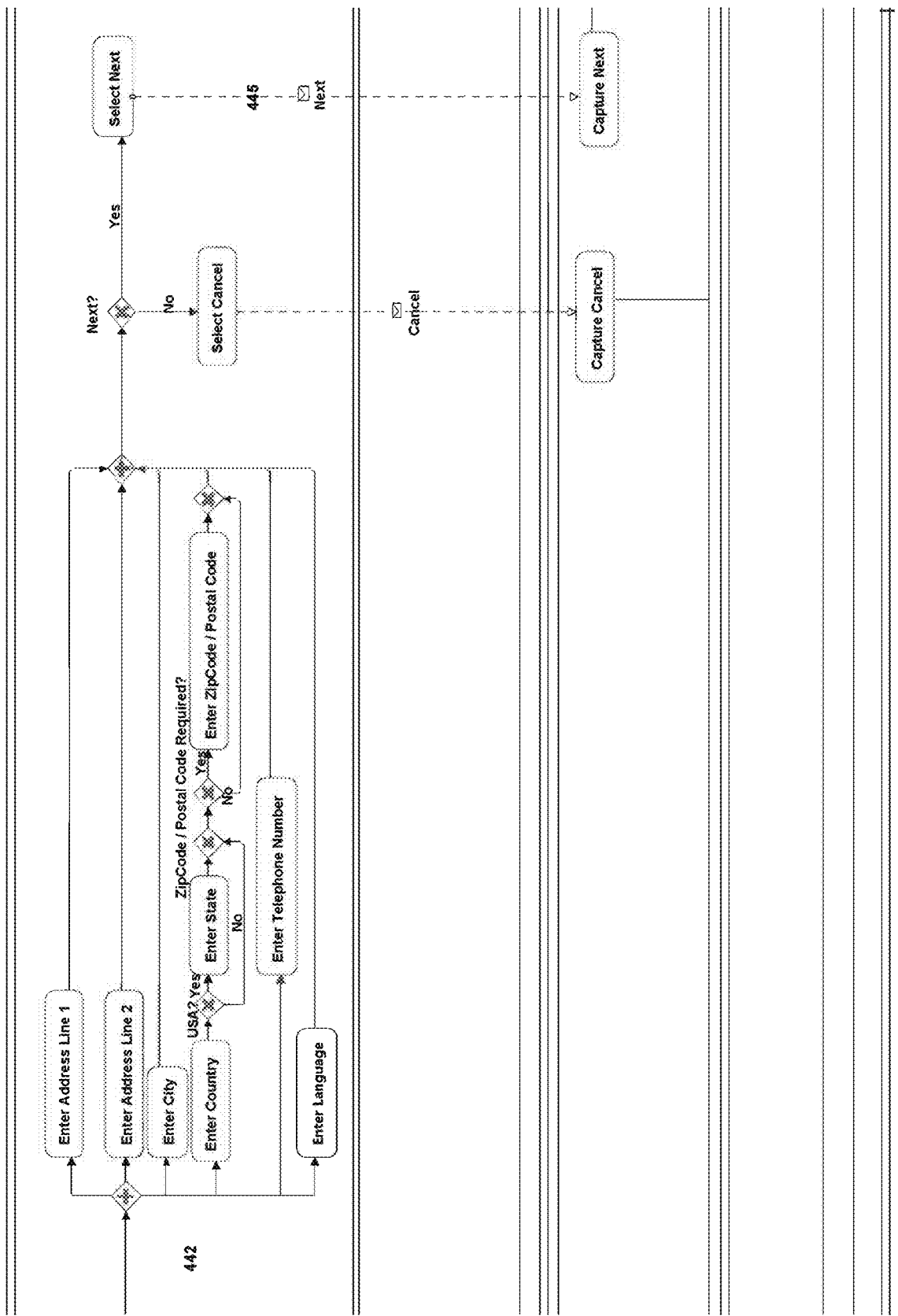
Figure 16G:
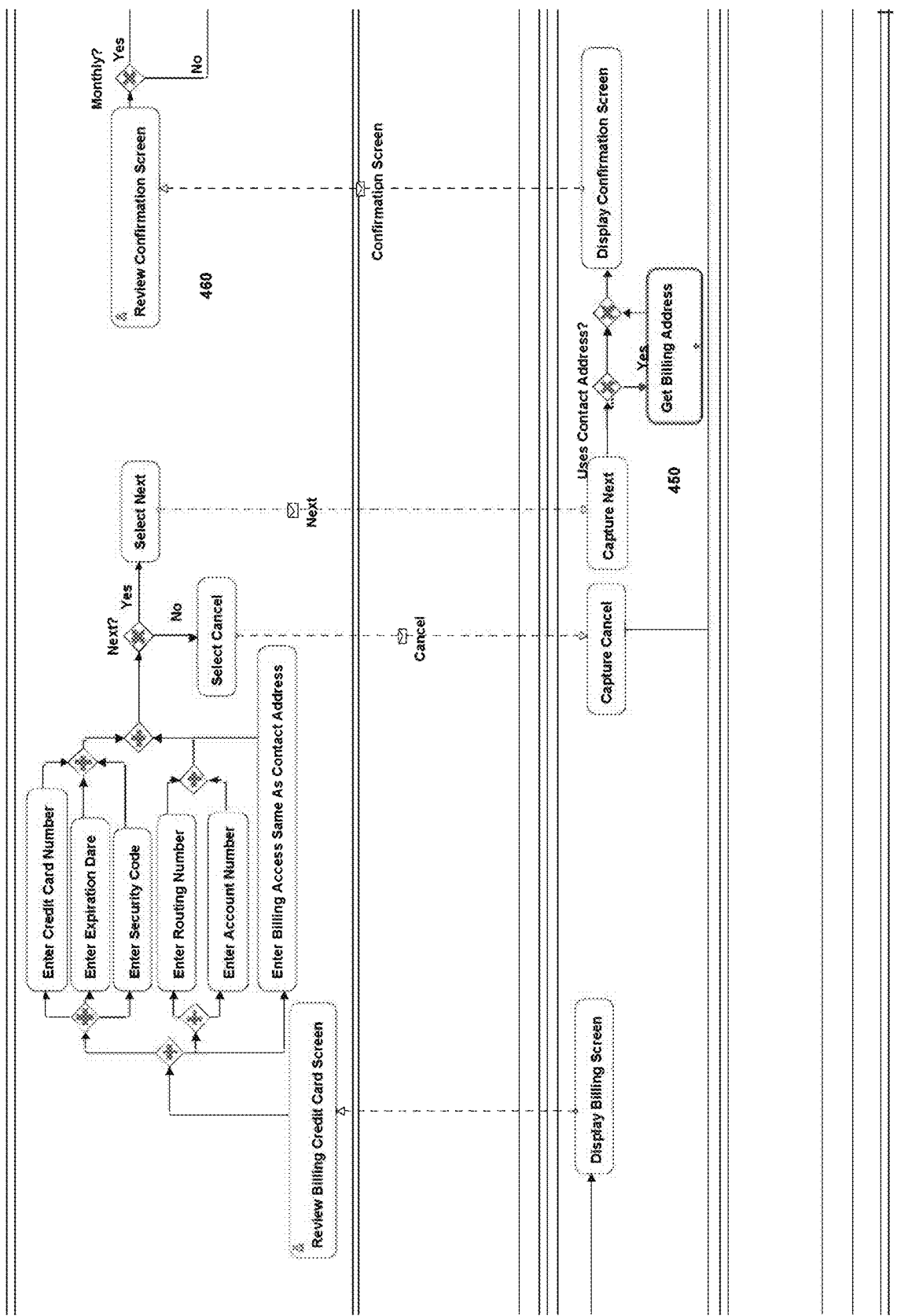
Figure 16H:
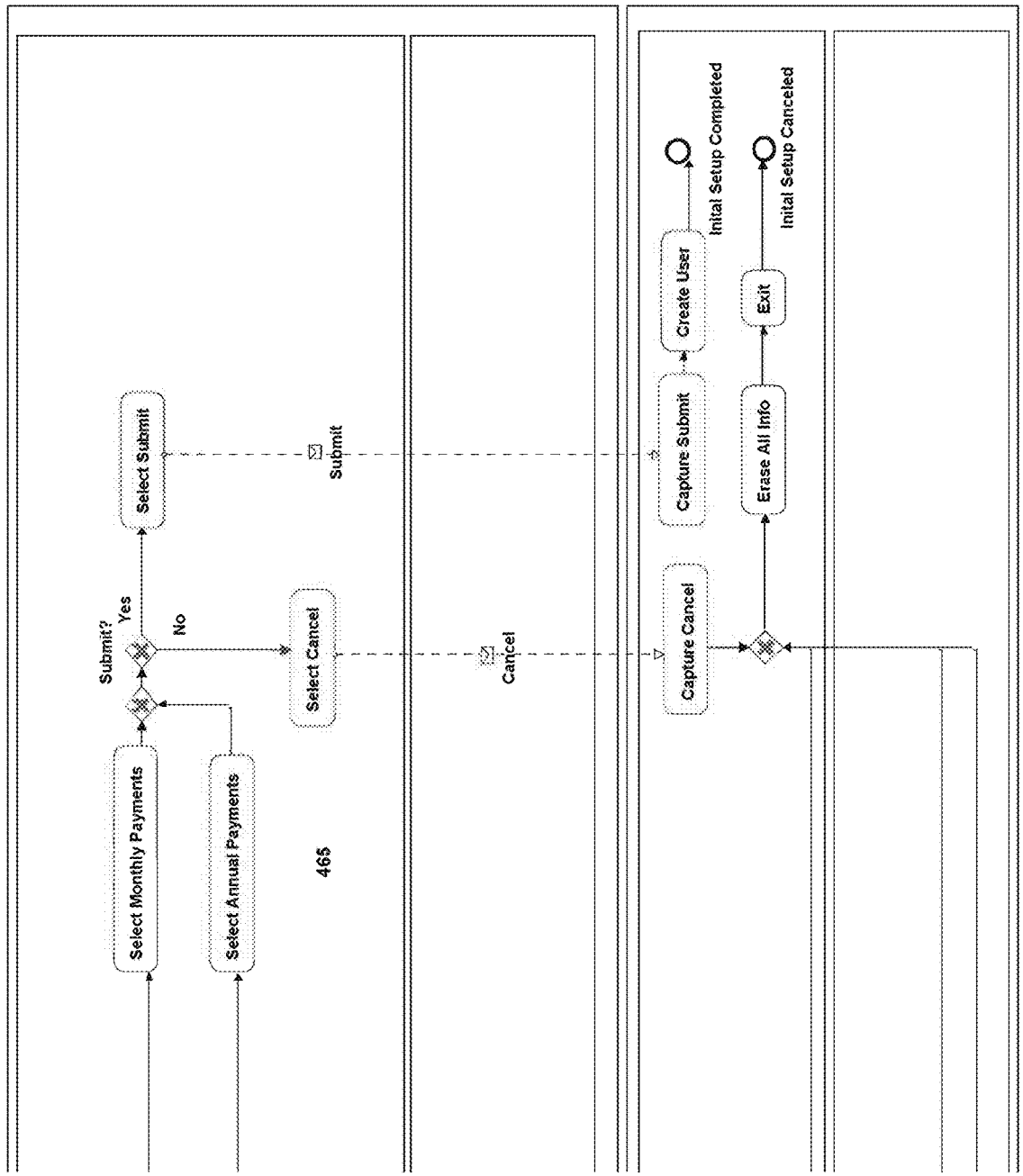
Figure 17A:
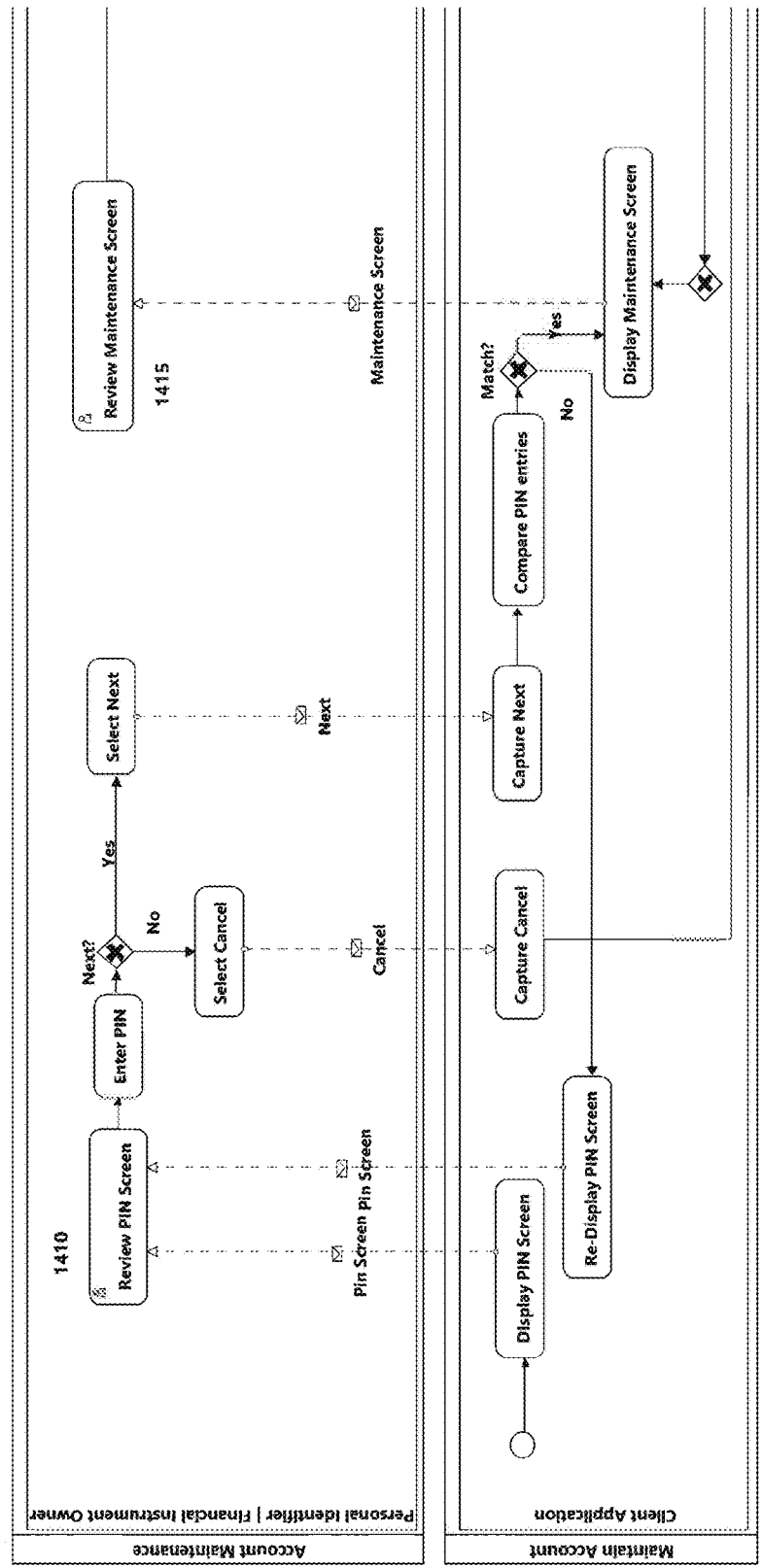
FIGS. 17A-17H are a diagram, titled "Setup", of a subset of the process steps within the overall generic business process which documents the maintenance of the constraints on the process.
Figure 17B:
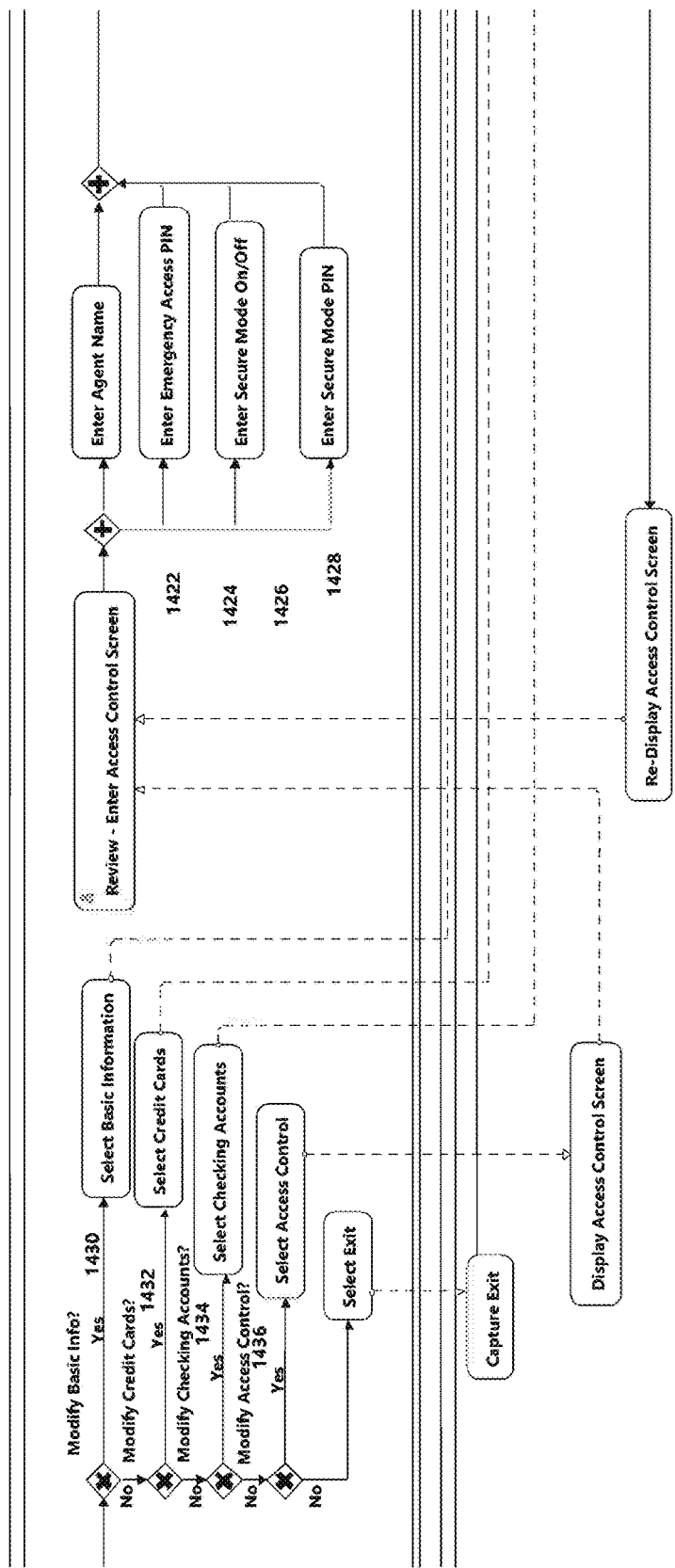
Figure 17C:
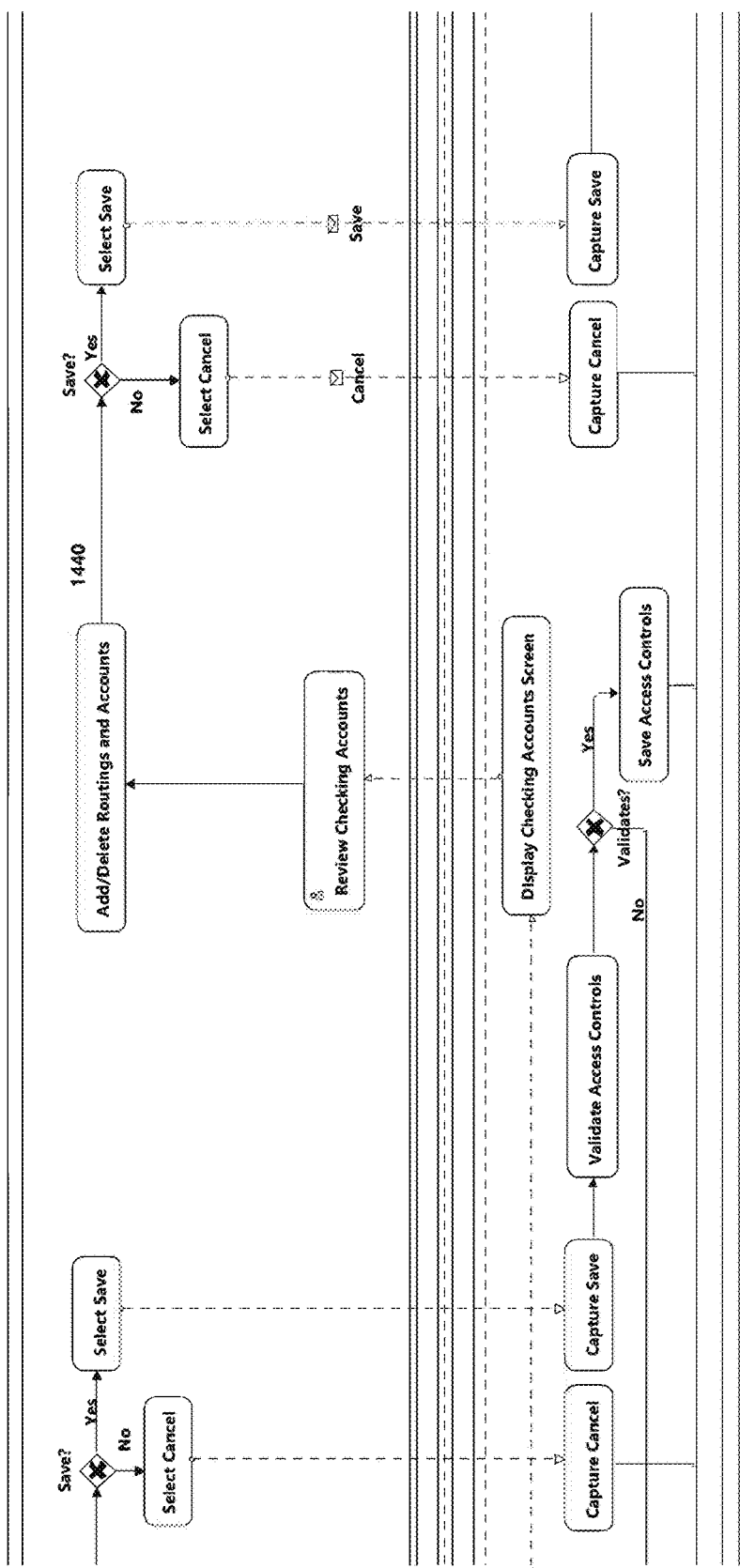
Figure 17D:
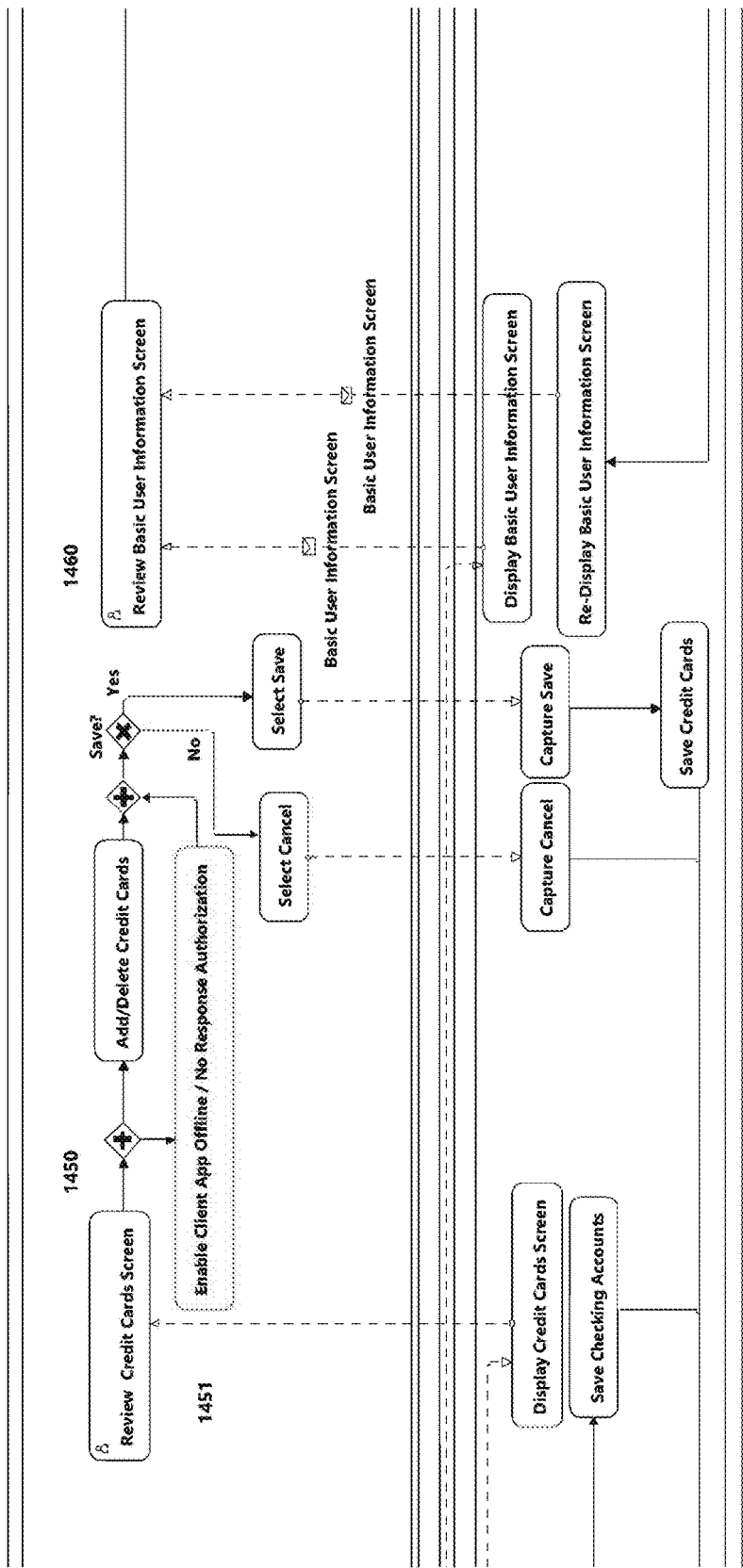
Figure 17E:
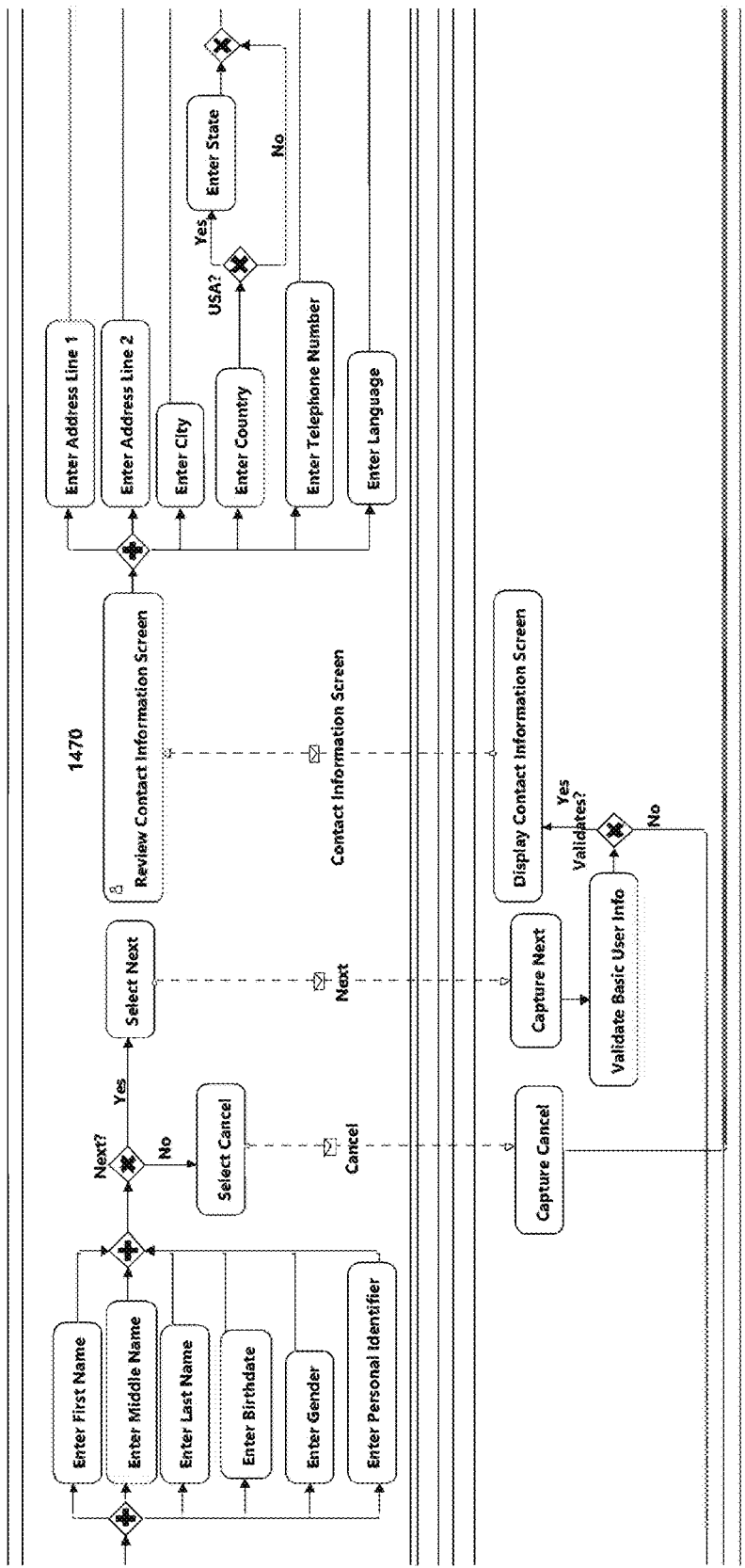
Figure 17F:
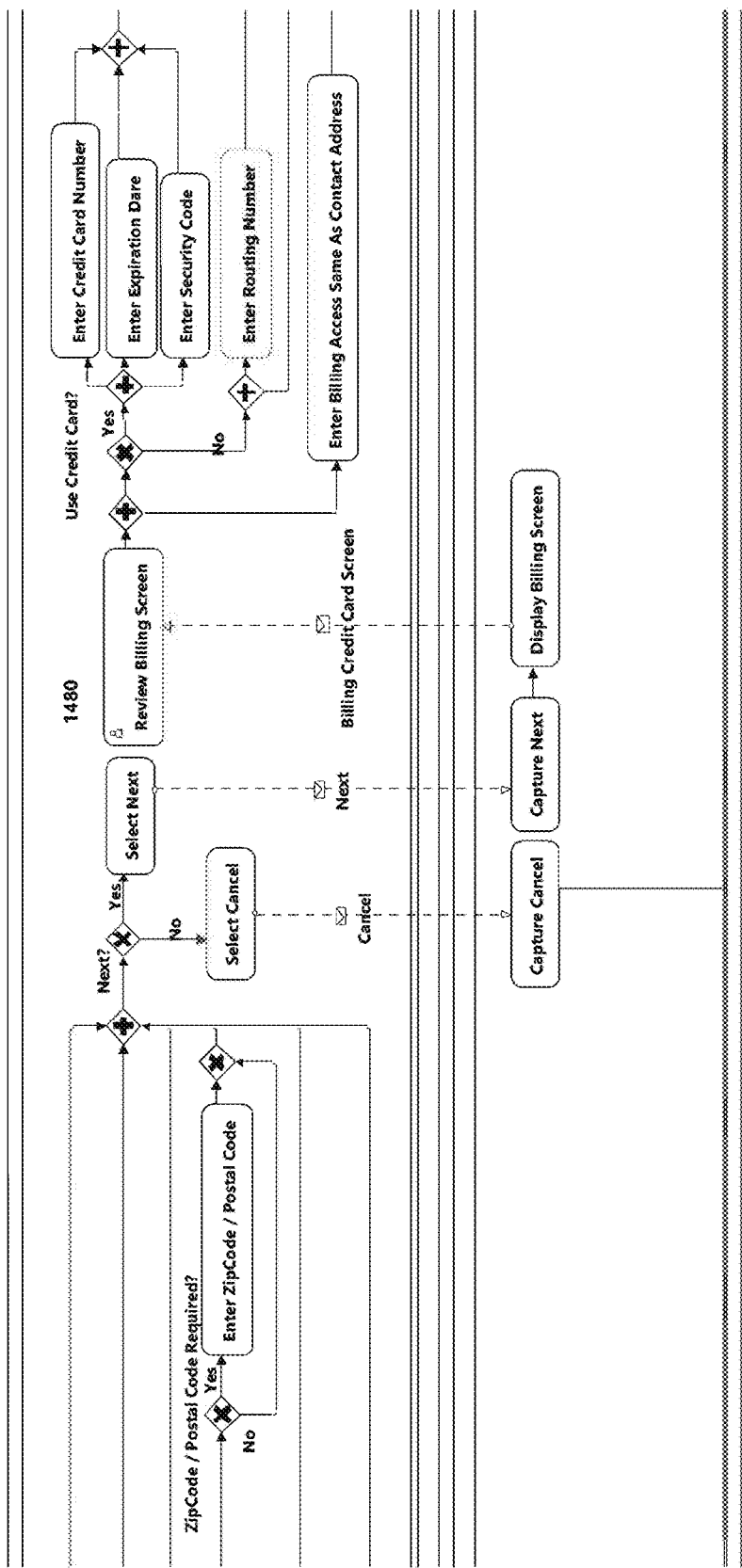
Figure 17G:
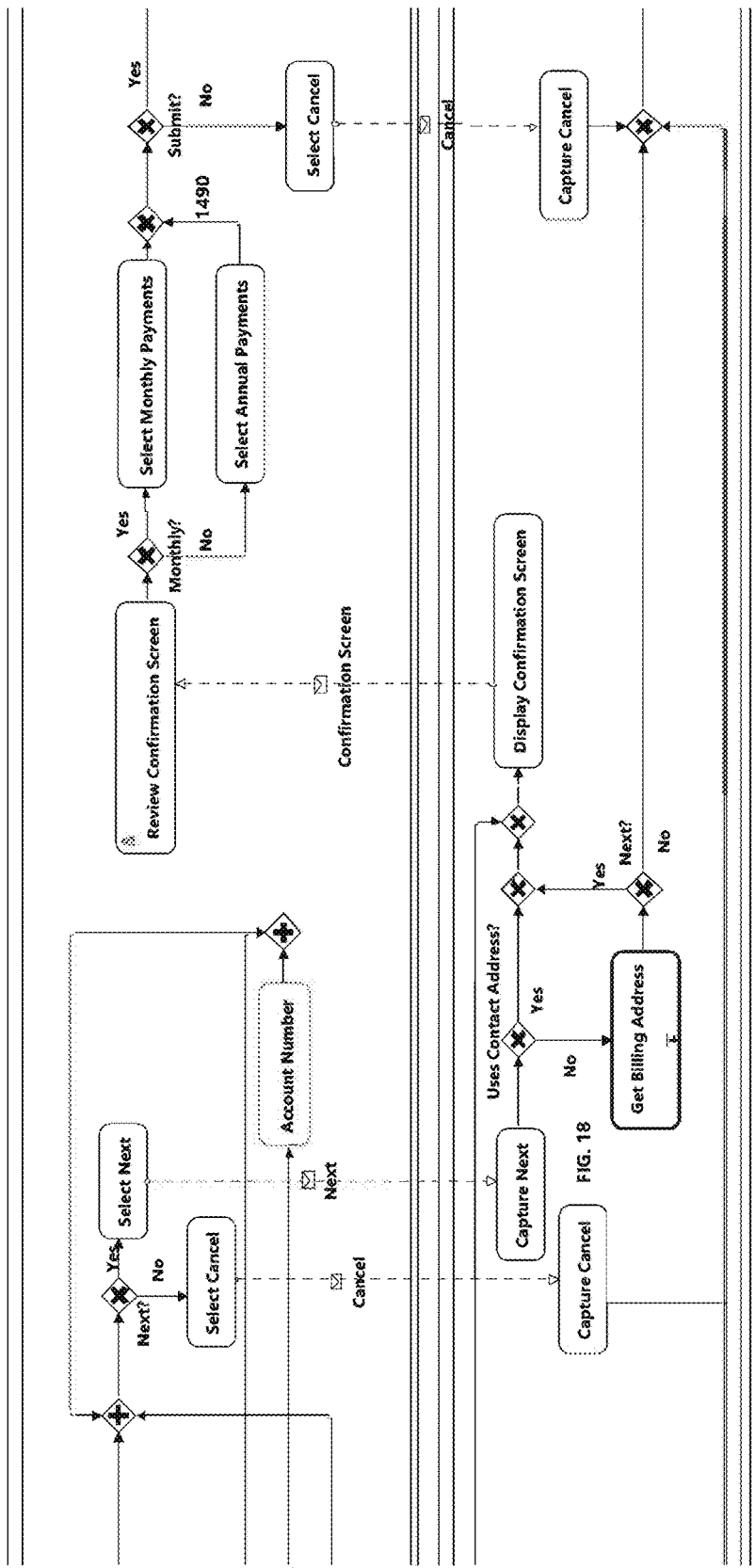
Figure 17H:
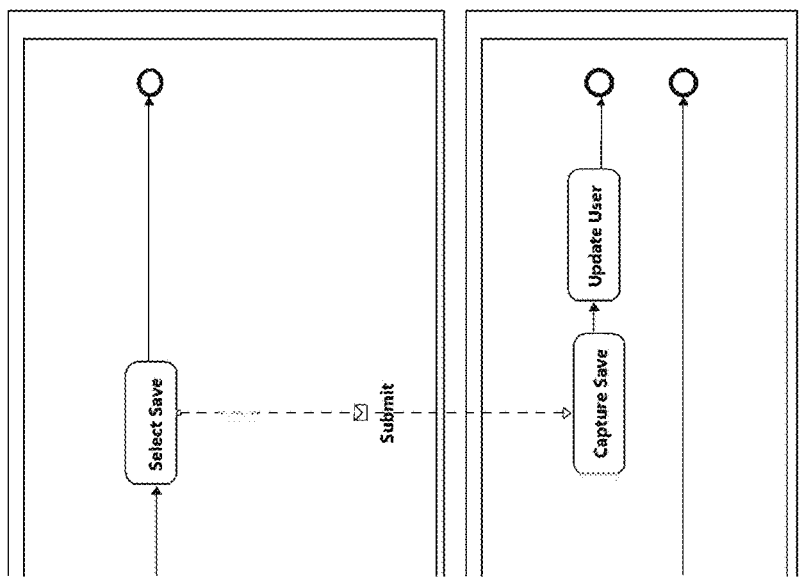

FIG. 15 is a detailed diagram of the Secure Mode access subroutine of step 1520 (FIG. 4). At step 1521 the client application determines whether the Owner has chosen to deploy the optional Secure Mode or not. If not, this subroutine is essentially skipped and flow proceeds to step 1531 where Owner access through their personal smart device is granted without a Secure Mode PIN. If the optional Secure Mode is on, then at step 1523 the Owner is presented with a Secure Mode entry screen prompting for entry of the Secure Mode alphanumeric PIN. The Secure Mode alphanumeric PIN may be a simple one-character number or letter. The Owner enters the PIN at step 1524, it is validated by the client application at step 1525 and, if valid, Owner access through their smart device is granted at step 1531. If invalid, the Owner is given two additional entry attempts before access is denied at step 1530. This subroutine is employed as an additional security measure for Owner access to functionality via their smart device (to prevent unauthorized access when the device is lost or stolen). Optionally, if Biometrics is enabled, at step 1526 and a Biometric Recognition Screen is display explaining the steps of use for step 1428. In step 1529, the biometric data is validated. Three attempts are allowed at step 1530.

Referring back to FIG. 4, the foregoing Secure Mode subroutine is employed at step 1520. If the Secure Mode PIN is validated, flow proceeds to step 1530 where the client application displays the Owner Personal Identifier Display interface, and this interface is presented to the Owner on their smart device at step 1432. The Owner is given the option of selecting "Imminent Use", which, as described above, preauthorizes a one-time usage of a designated PIN which authorization stays in effect for a specified time period. The client application captures the imminent use authorization at step 1535 and at step 1536 arms the system to provide a one-time authorization of use of the designated PIN within the Owner-programmed parameters. Positive or negative confirmation of the Imminent Use authorization is provided to IMSP at step 1537, and to the Owner at step 1538. The Owner at step 1539 may choose to continue, cancel or retry. If the Secure Mode PIN is not validated at step 1520, the software returns to the main display at step 1540.

In order for the Owner to pre-authorize use of a credit card, FIG. 5 is a diagram of the Pre-Authorize Credit Card Use. As above, pre-authorization involves the Owner (using any smart device) communicating with the IMSP though the client application, and so these process steps are divided into three separate horizontal pathways running left-to-right with Owner at top, and the client application at bottom. At step 1621 the Owner chooses to pre-authorize a credit card via their smart device. The client application captures the selection at step 1622. At step 1520 the client application determines whether the Owner has chosen to deploy the optional Secure Mode or not. If in Secure Mode, the Secure Mode PIN access subroutine of step 1520 is repeated as described above with regard to FIG. 15. If not, this subroutine is skipped.

Flow proceeds to step 1630 where the client application displays the Owner Pre-authorize Credit Card display interface, and this interface is presented to the Owner on their smart device at step 1631. The Owner is given the option of selecting a particular credit card at step 1632, and this selection is captured by the client application at step 1633. The Owner is given a plurality of parameter options at step 1634. At step 1635 they may select "Imminent Use", which, as described above, preauthorizes a one-time usage of a designated credit card which authorization stays in effect for a specified time period. The client application captures the imminent use authorization at step 1638. At step 1636 the Owner may select "Previous Payee", which preauthorizes business or government entity charges by business or government entity with which the Owner has completed previous transactions. The client application captures the Previous Payee authorization at step 1636. At step 1637 the Owner may select a particular Payee, which preauthorizes business or government entity charges by that named business or government entity. The Owner enters the named Payee at step 1641 and the client application captures the particular Payee authorization at step 1640. At step 1650 the Owner may select an authorized amount, which preauthorizes business or government entity charges of the selected amount. The client application captures the amount authorized at step 1651. Finally, at step 1652 the Owner submits their preauthorization parameters, and they are captured by the IMSP at step 1653.

Given an imminent use authorization at step 1560 the IMSP arms the personal identity and financial instrument management system to provide a one-time authorization of use of a credit transaction within the Owner-programmed parameters. Positive or negative conformation of the Imminent Use authorization is provided to IMSP at step 1663. If no imminent use is authorized, the personal identity and financial instrument management system at step 1662 will authorize any other credit transaction within the Owner's preauthorization parameters. Such transactions are recorded at step 1663 and positive or negative conformation of the transaction is provided to the IMSP at step 1664. The Owner at step 1665 may choose to continue, cancel or retry. The client application returns to the main display at step 1629.

In order for the Owner to pre-authorize use of a check, FIG. 6 is a diagram of the Pre-Authorize Check Use. As above, initial Setup involves the Owner (using any smart device) communicating with the IMSP though the client application, and so these process steps are divided into three separate horizontal pathways running left-to-right with Owner at top, and the client application at bottom. At step 1721 the Owner chooses to pre-authorize a check via their smart device. The client application captures the selection at step 1722. At step 1520 the client application determines whether the Owner has chosen to deploy the optional Secure Mode or not. If in Secure Mode, the Secure Mode PIN access subroutine of step 1520 is repeated as described above with regard to FIG. 15. If not, this subroutine is skipped.

Flow proceeds to step 1730 where the client application displays the Owner Preauthorize Check Display interface, and this interface is presented to the Owner on their device at step 1732. The Owner is given the option of selecting a particular bank account at step 1733, and this selection is captured by the client application at step 1734. The Owner is given a plurality of parameter options. At step 1736 the Owner may select "Previous Payee", which preauthorizes business or government entity charges by business or government entity with which the Owner has completed previous transactions. The client application displays a listing of Previous Payees at step 1737 for selection. At step 1738 the Owner may select a particular Payee, which preauthorizes business or government entity charges by that named business or government entity. The Owner enters the named Payee at step 1741 and the client application captures the particular Payee authorization at step 1742. At step 1750 the Owner may select an authorized amount, which preauthorizes business or government entity charges up to the selected amount. The client application captures the amount authorized at step 1751. At step 1752 the Owner may select an authorized amount, which preauthorizes business or government entity charges of the selected amount. The client application captures the amount authorized at step 1753. Finally, at step 1754 the Owner submits their preauthorization parameters, and they are captured by the IMSP at step 1755. The client application at step 1756 will authorize any check transaction within the Owner's preauthorization parameters. Such transactions are recorded at step 1763 by the IMSP and positive or negative conformation of the transaction is provided to the Owner at step 1764. The Owner at step 1765 may choose to continue, cancel or retry. The software returns to the main display at step 1766.

Given Owner Initial Setup as per FIGS. 15-17 and authorization programming in accordance with FIGS. 4-6, the Owner may choose to use a Personal Identifier or Financial Instrument.

FIG. 1 is a detailed diagram illustrating the "Use Personal Identifier or Financial Instrument" process. At step 500 the system checks to see whether the Owner is a smart device (predominately a smartphone) user or not, and if not flow proceeds to step 501. In this case Owner authorization for use of a Personal Identifier or Financial Instrument is secured by the IMSP via standard telephone call to the Owner. However, if the Owner is a smart device user authorization can be acquired via Owner access through their personal smart device using the present client application. If the software authorization is selected at step 502, the Owner's smart device client application initializes at step 503. If necessary, the client application runs through Initial Setup as per FIGS. 15-17 plus Owner authorization programming in accordance with FIGS. 4-6. If not, the main GUI is displayed at step 504. The main GUI allows the Owner to select use of either a PI or FI at step 505. If a financial instrument is selected, the client application employs a "Use Financial Instrument" subroutine indicated generally as step 600 and in more detail in FIG. 3. If a PI is selected, the client application employs a "Use Personal Identifier" subroutine indicated generally as step 700 and in more detail in FIG. 2. The Owner may exit the client application at step 506.

Figure 2A:
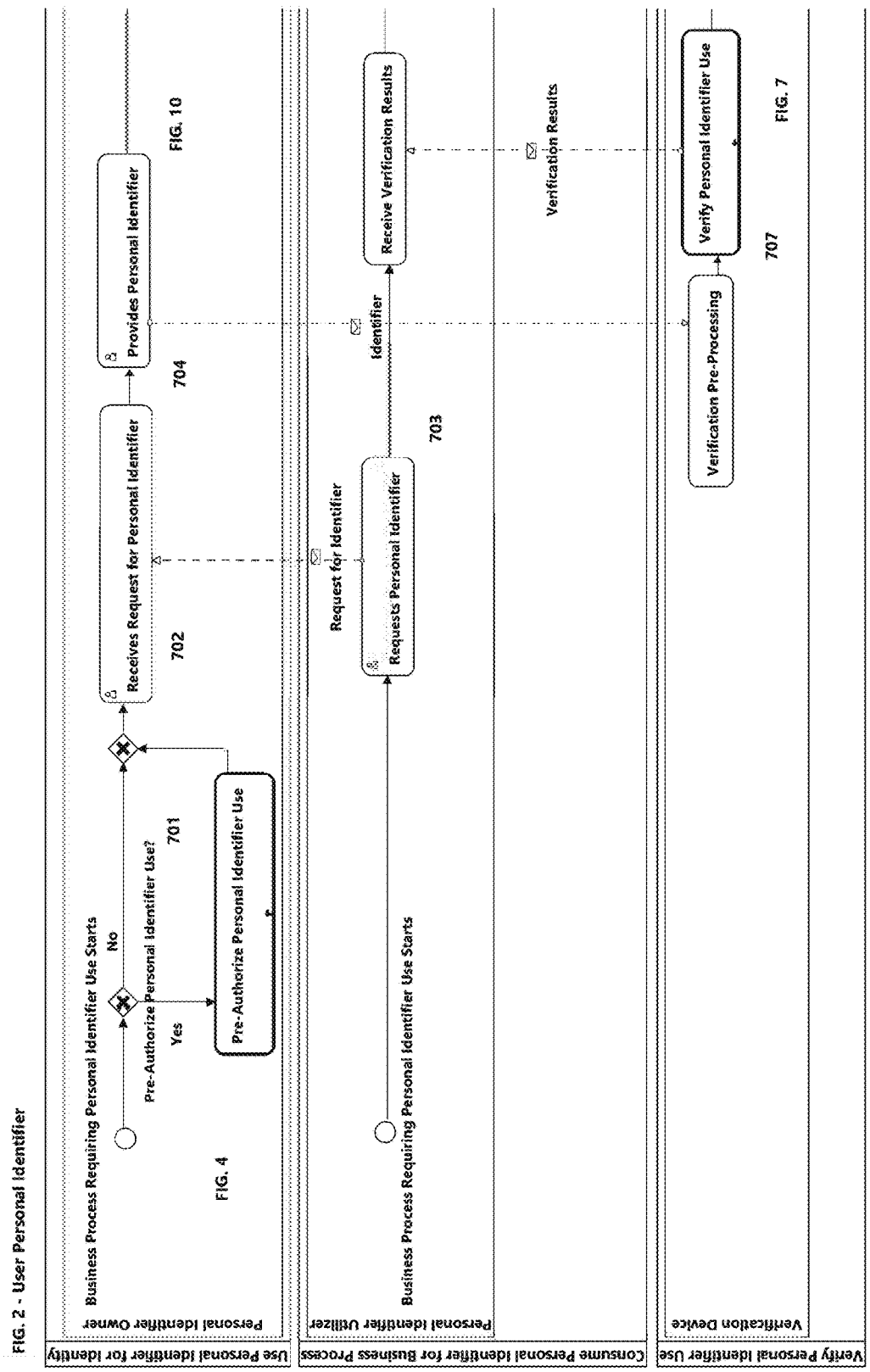
FIGS. 2A-2B are a diagram, titled "Use Personal Identifier", of a subset of the process steps within the overall generic business process which is split in FIG. 1 and documents the processes of using and authorizing a personal identify.
Figure 2B:
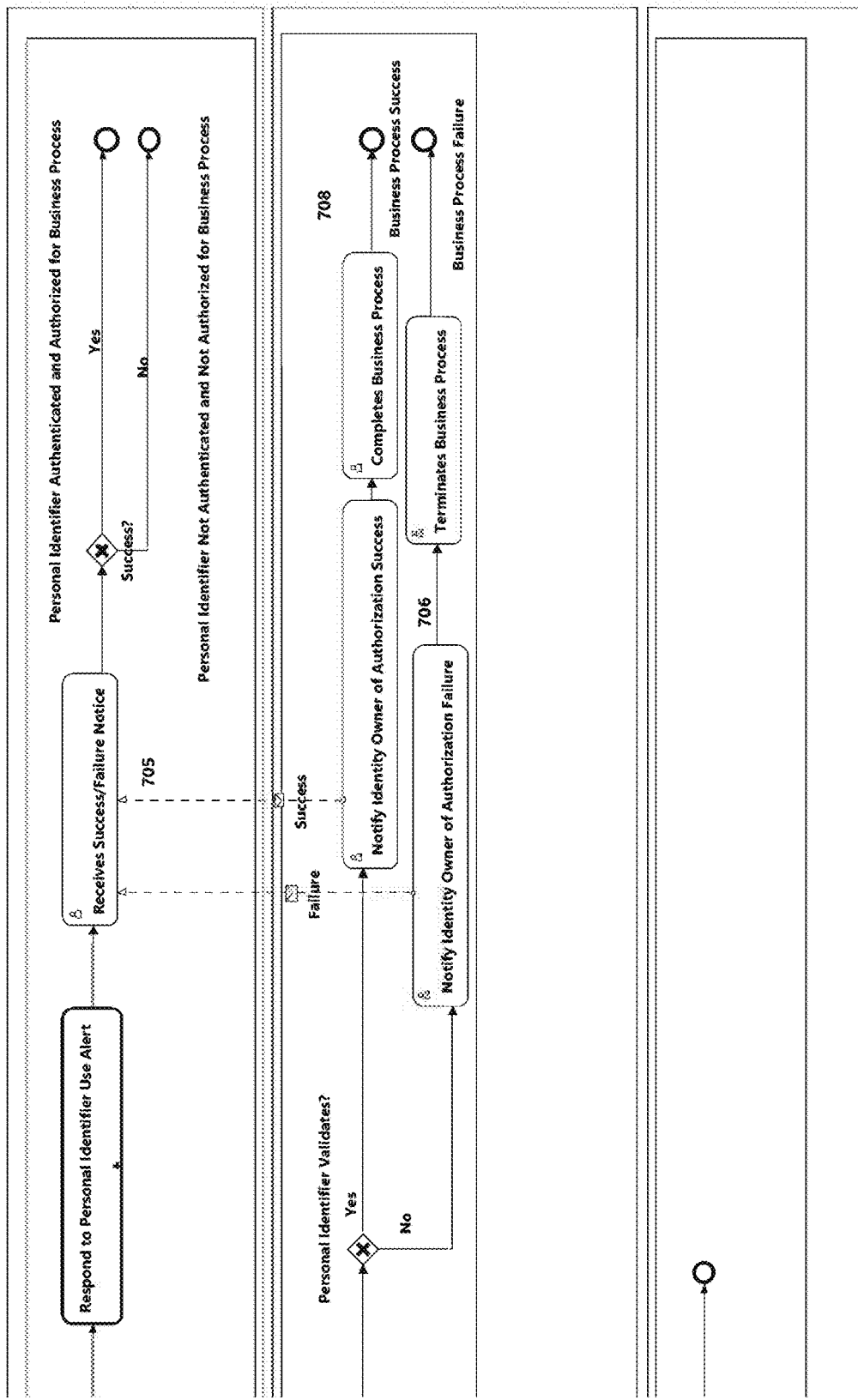
Figure 3A:
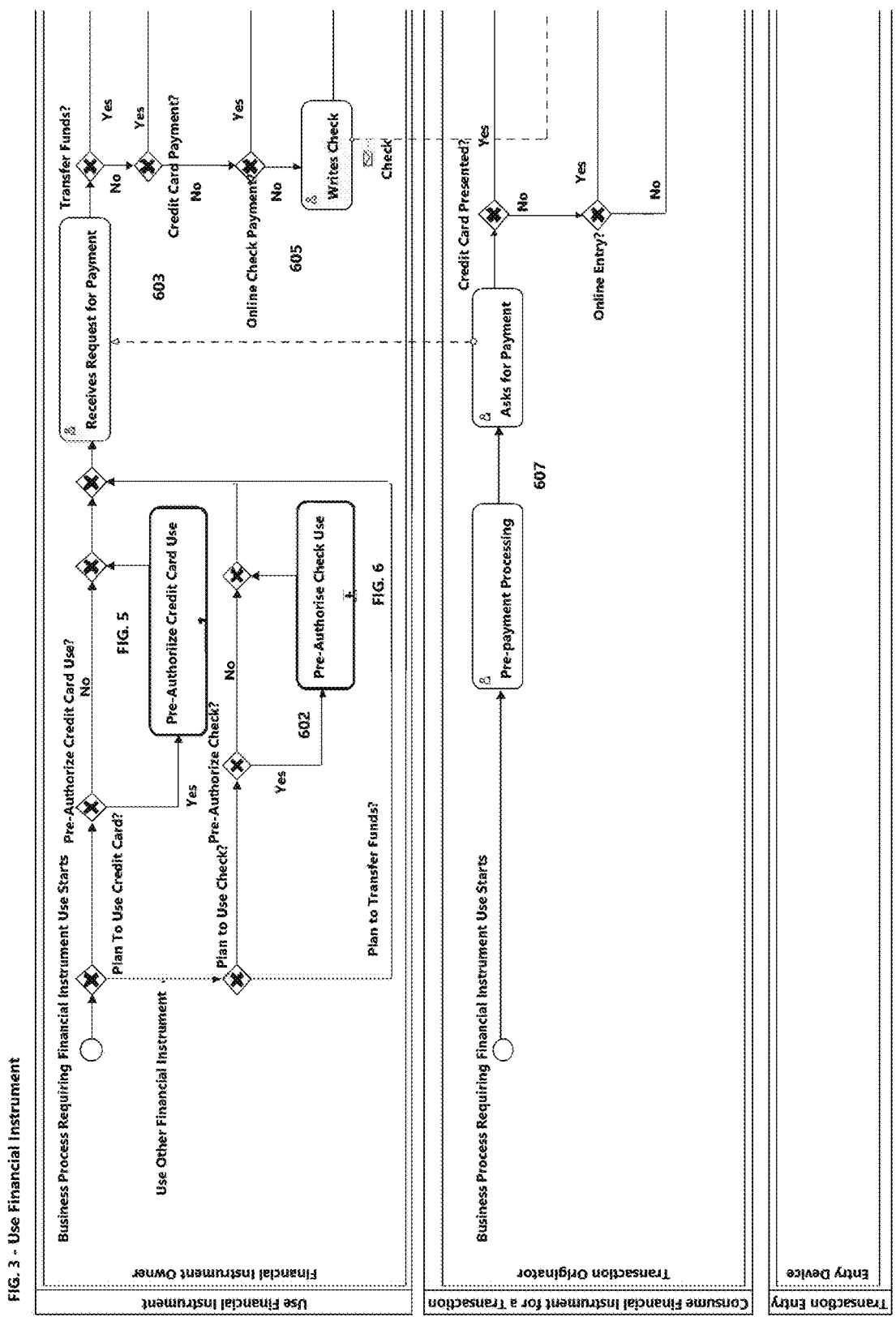
FIG. 3A-3D are a diagram, titled "Use Financial Instrument", of a subset of the process steps within the overall generic business process which is split in FIG. 1 and documents the processes of using and authorizing a financial instrument.
Figure 3B:
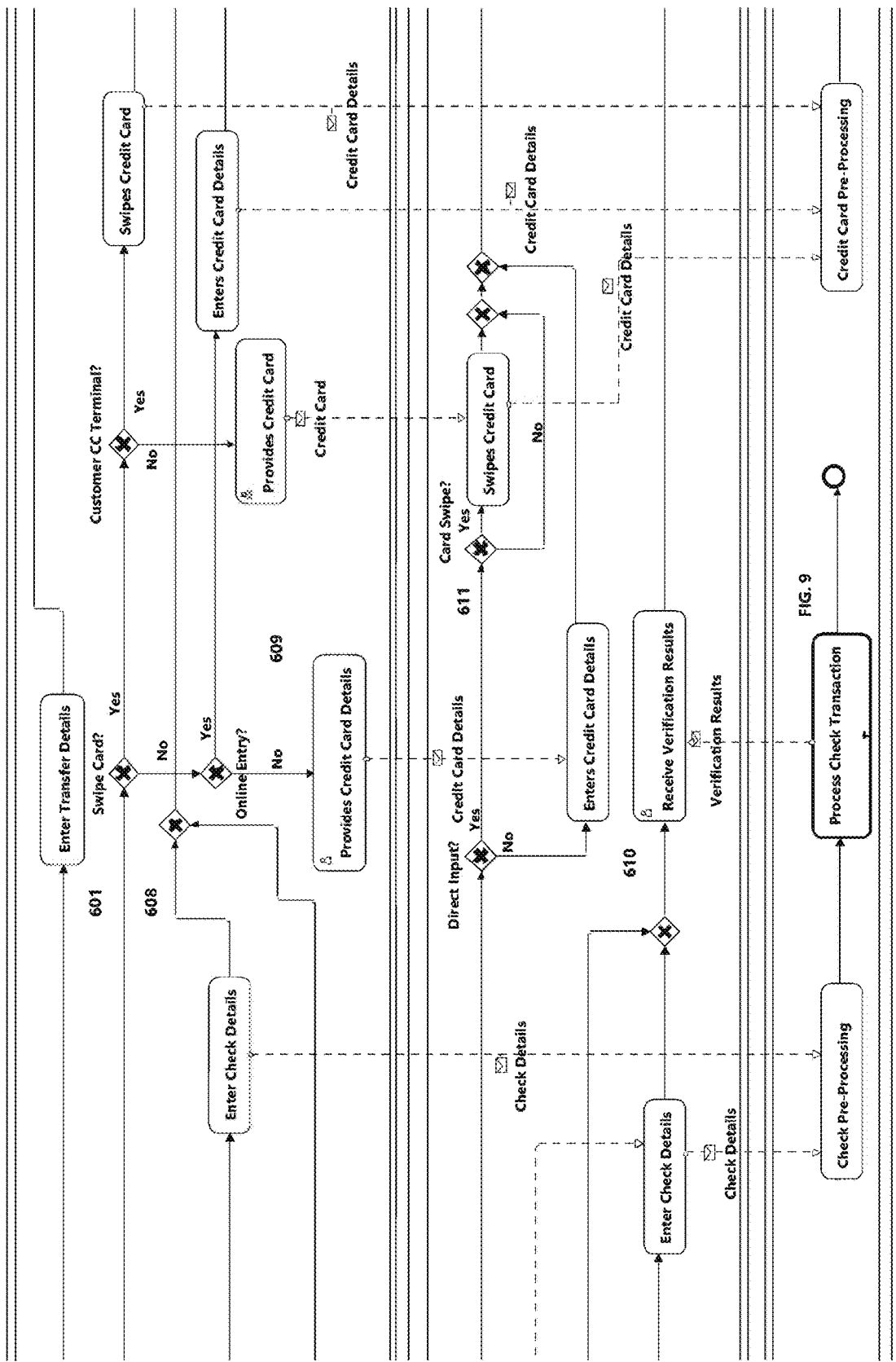
Figure 3C:
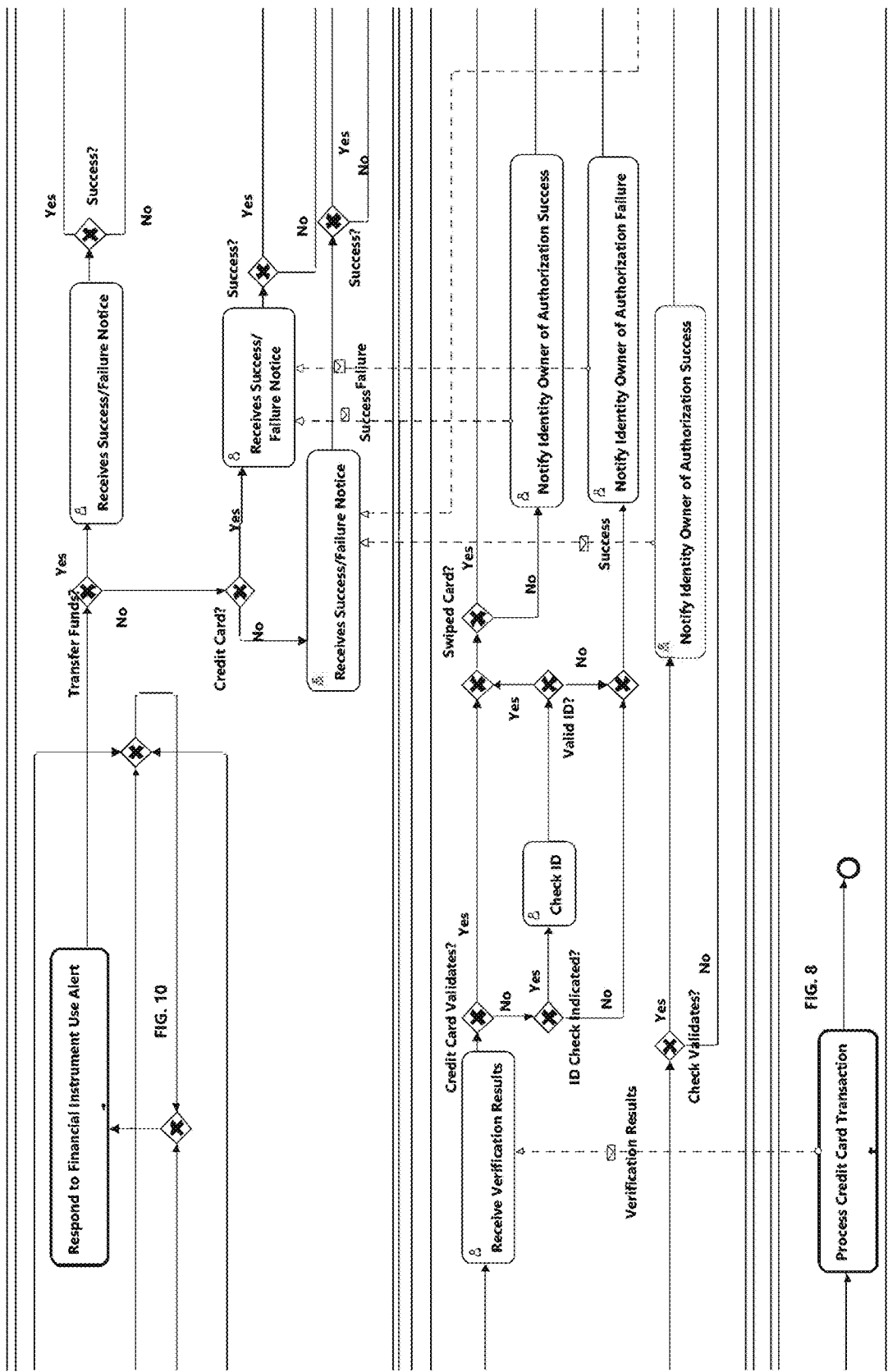
Figure 3D:
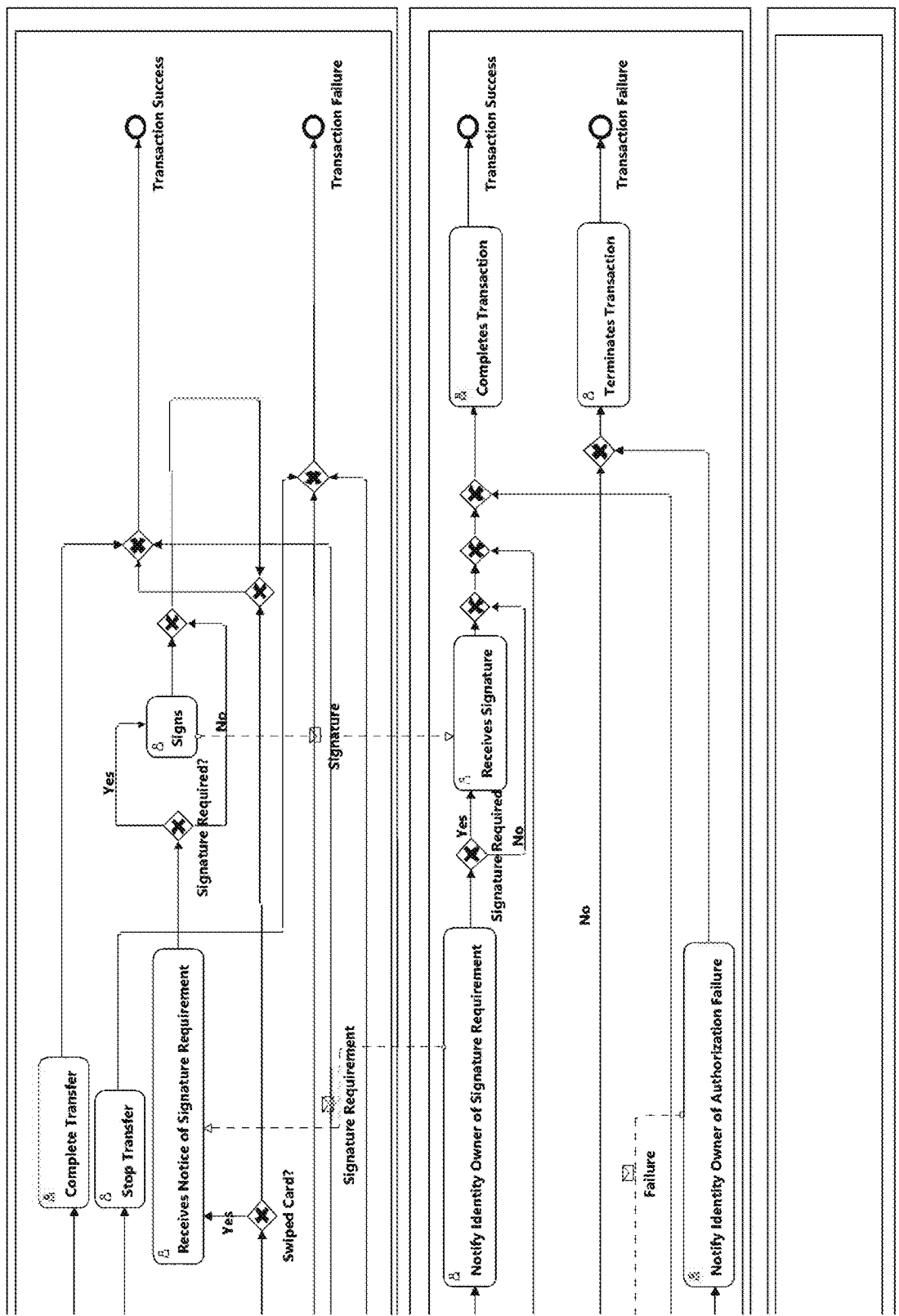

FIG. 2 is a more detailed diagram of the "Use Personal Identifier" subroutine indicated generally as step 700 in FIG. 1. If the Owner wishes to preauthorize use of a PI, they do so at step 701. Given preauthorization, then as seen at step 703 whenever any third party (business or government entity, bank, website or otherwise) seeks use of the Owner's PI, verification is coordinated through the IMSP who serves as a "personal identifier/financial instrument authorization" service provider. The verification process of personal identifier use described above in regard to FIG. 7 is conducted so the third party may "Verify Personal Identifier Use". Both a web service and a web site are available to the third party to either integrate with their current systems or access independently to obtain authorization of use, as well as a photograph of the personal identifier Owner. This verification involves a response from the Owner which may have been pre-authorized or interactively obtained as defined by FIG. 10, "Respond to Personal Identifier Use Alert". From the Owner's perspective in FIG. 2, at step 704 the PI is provided, the verification process of FIG. 7 is conducted, the Owner responds as per FIG. 10, the third party is given the verification results at step 707, an authorization success/failure notice is displayed at step 706, the notice is conveyed to the Owner at step 705, and the PI authorization process is completed at step 708.

FIG. 10 is a diagram illustrating the response to a Personal Identifier Usage. At step 801 the IMSP receives the PI request from a third party and polls the Owner's smart device at step 801 to determine whether it is active. If active, then at step 802 the IMSP sends a request to the Owner for manual authorization for the Personal Identifier use. The Owner receives the request at step 804. If not active, then at step 803 the IMSP may call the Owner on a traditional telephone or basic cell phone for manual authorization for the Personal Identifier use. At step 1520 the IMSP determines whether the Owner has chosen to deploy the optional Secure Mode or not. If in Secure Mode, the Secure Mode PIN access subroutine of step 1520 is repeated as described above with regard to FIG. 15. If not, this subroutine is skipped. Next, at step 805 the client application displays a Personal Identifier Use Alert Screen on the Owner's smart device. At step 806 the alert may be audible as well. At step 807 and 808 the Owner decides whether to allow the PIN access and responds to the request. At step 809 the request is authorized or at step 810 deauthorized. At step 811 and 812 the result is communicated to the parties. As an alternative for the hearing impaired, if "Use Text Enabled Phone?" has been enabled in the Owner's profile, step 820 will be executed. Text messages will be sent using "Respond with a Basic Phone with Text" process shown in FIG. 14.

FIG. 3 is a more detailed diagram of the "Use Financial Instrument" subroutine indicated generally as step 600 in FIG. 1. If the Owner wishes to preauthorize use of a credit card, they do so at step 601. If the Owner wishes to preauthorize use of a check, they do so at step 602. Given preauthorization, then as seen at step 607 whenever any third party (business or government entity, bank, website or otherwise) sends a request for payment, the request is received by the Owner at step 603. Again, verification is coordinated through the IMSP who serves as a "personal identifier/financial instrument authorization" service provider. The Owner will write a check at step 605 and/or if an online check entry is desired enter the check details at step 608. If a credit card is being used the Owner will swipe their card at step 611 or otherwise provide card information at step 609, and the payee will enter the information at step 610.

As with a Personal Identifier, the verification process of "Use Financial Instrument" subroutine described above in regard to FIG. 3 is conducted so the third party may verify a Financial Instrument. Both a web service and a web site are available to the third party to either integrate with their current systems or access independently to obtain authorization of use, as well as a photograph of the check/credit card Owner. This verification involves a response from the Owner which may have been pre-authorized as described above or interactively obtained as defined by FIG. 11, "Respond to Financial Instrument Use Alert".

FIG. 11 is a diagram illustrating the response to a Respond to Financial Instrument Use Alert subroutine. At step 901 the IMSP "personal identifier/financial instrument authorization" service provider receives the Financial Instrument request from a third party and polls the Owner's smart device to determine whether it is active. If active, then at step 902 the IMSP sends a request to the Owner for manual authorization for the Financial Instrument use. The Owner receives the request at step 904. If not active, then at step 903 the IMSP may call the Owner on a traditional telephone or basic cell phone for manual authorization for the Personal Identifier use. At step 1520 the IMSP determines whether the Owner has chosen to deploy the optional Secure Mode or not. If in Secure Mode, the Secure Mode PIN access subroutine of step 1520 is repeated as described above with regard to FIG. 15. If not, this subroutine is skipped. Next, at step 905 the IMSP displays a Financial Instrument Use Alert Screen on the Owner's smart device. At step 906 the alert may be audible as well. At step 907 and 908 the Owner decides whether to allow the Financial Instrument and responds to the request. At step 909 the request is authorized or at step 910 deauthorized. At step 911 and 912 the result is communicated to the parties. As an alternative for the hearing impaired, if "Use Text Enable Phone?" has been enabled in the Owner's profile, step 920 will be executed. Text messages will be sent using "Respond with a Basic Phone with Text" process shown in FIG. 14.

FIG. 12 is a BPMD diagram, titled "Pre-Authorize Emergency Usage with a Basic Phone" which enables the pre-authorization of the use of either a personal identifier or financial instrument when a device is not available to the Owner. The Owner simply dials an IMSP telephone number using a non-smart device, e.g. either a traditional telephone or basic cell phone.

FIG. 13 is a diagram, titled "Respond with a Basic Phone" which solicits authorization of the use of a financial instrument similar to FIG. 3, but using recorded voice message prompts to navigate the Owner's user-input obligations using a non-smart device, e.g. either a traditional telephone or basic cell phone.

It should now be apparent that the above-described system and process provides a turnkey solution for managing the use of personal identification and financial instruments with an array of options for proactive and/or interactive management by the Owner, trusted authentication to the third-party business or government entity, and secure communication of requisite transactional information there between.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. In a data processing system including a smart device operated by an individual user and configured with a client application, a communications-enabled device operated by a business or government entity and configured with a point of authorization application for transmitting a request for back-end authorization of an instance of use of said user's personal identifier to authorize an action, and a Software as a Service (SaaS) system operated by an Application Service Provider (ASP) and comprising at least one application server configured with ASP software for providing a back-end authorization of use of said user's personal identifier or financial instrument to said requesting business or government entity, all connected via a communications network, a method of verifying the authorization of use of a personal identifier or financial instrument belonging to said user of said smart device, the method comprising the steps of:

receiving by said ASP SaaS system a request for authorization of use of a personal identifier or financial instrument from said business or government;

determining by said ASP SaaS system that said personal identifier or financial instrument is registered with the ASP SaaS system, and transmitting a registration result to the requesting business or government entity;

determining by said ASP SaaS system whether said user previously provided one or more authorizations for use applicable to said request for authorization to said ASP;

producing by said ASP SaaS system one or more results indicating whether said user previously provided said one or more authorizations for use applicable to said request for authorization to said ASP;

determining by said ASP SaaS system at least in part from said one or more results that none of said one or more authorizations for use were provided and are applicable to said request for authorization to said ASP and executing the sub-steps of, identifying said user's smart device from said personal identifier or financial instrument, transmitting a request for authorization of use to the user's smart device client application for direct authorization of use by the user of said personal identifier or financial instrument, and producing by said ASP SaaS system a direct-authorization result indicating whether said user directly authorized use of said personal identifier or financial instrument in response to said transmitting sub-step;

said ASP SaaS system evaluating said direct-authorization result and transmitting a response to said requesting business or government entity.

2. The method according to claim 1, in which the step of determining by said ASP SaaS system whether said user previously provided one or more authorizations for use applicable to said request for authorization to said ASP, further comprises:

determining by said ASP SaaS system whether said user previously provided an imminent use authorization to said ASP comprising a one-time pre-authorization effective for a specified time period.

3. The method according to claim 1, in which the step of determining by said ASP SaaS system whether said user previously provided one or more authorizations for use applicable to said request for authorization to said ASP, further comprises:

determining by said ASP SaaS system whether said user previously provided an entity specific authorization to ASP.

4. The method according to claim 1, in which the step of determining by said ASP SaaS system whether said user previously provided one or more authorizations for use applicable to said request for authorization to said ASP, further comprises:

determining by said ASP SaaS system whether said user previously provided a location specific authorization to said ASP SaaS system and whether said smart device location service is enabled and within a defined geographic distance from said requesting business or government entity.

5. The method according to claim 1, further comprising a step of transmitting said direct-authorization result to the user's smart device for use by said client application.

6. The method according to claim 1, further comprising a step of said ASP SaaS system receiving authorization of use from the user's smart device client application.

7. The method according to claim 1, further comprising a step of calling said user's smart device for said direct authorization of use by the user of said personal identifier or financial instrument.

8. The method according to claim 1, further comprising a step of said ASP SaaS system receiving authorization of use from the user's smart device client application.

\* \* \* \* \*